(12) United States Patent
Hamasaki et al.

(10) Patent No.: US 8,434,885 B2
(45) Date of Patent: May 7, 2013

(54) REFLECTING SHEET

(75) Inventors: Shinya Hamasaki, Tokyo (JP); Kenji Takasa, Tokyo (JP); Yuuichi Arito, Tokyo (JP); Yusuke Shigemori, Tokyo (JP); Taku Suetomi, Tokyo (JP)

(73) Assignee: Asahi Kasei Kabushiki Kaisha, Osaka-Shi (JP)

( * ) Notice: Subject to any disclaimer, the term of this patent is extended or adjusted under 35 U.S.C. 154(b) by 329 days.

(21) Appl. No.: 12/934,211

(22) PCT Filed: Mar. 26, 2009

(86) PCT No.: PCT/JP2009/056145
§ 371 (c)(1),
(2), (4) Date: Sep. 23, 2010

(87) PCT Pub. No.: WO2009/119749
PCT Pub. Date: Oct. 1, 2009

(65) Prior Publication Data
US 2011/0019390 A1    Jan. 27, 2011

(30) Foreign Application Priority Data

| Mar. 26, 2008 | (JP) | 2008-081890 |
| Mar. 26, 2008 | (JP) | 2008-081891 |
| Mar. 26, 2008 | (JP) | 2008-081930 |
| Mar. 26, 2008 | (JP) | 2008-081931 |
| Mar. 26, 2008 | (JP) | 2008-081932 |
| Dec. 4, 2008 | (JP) | 2008-310184 |
| Dec. 4, 2008 | (JP) | 2008-310185 |
| Mar. 3, 2009 | (JP) | 2009-049670 |
| Mar. 4, 2009 | (JP) | 2009-050604 |

(51) Int. Cl.
*F21V 7/22* (2006.01)
*G02B 5/20* (2006.01)
*G09F 13/04* (2006.01)
*B29D 11/00* (2006.01)

(52) U.S. Cl.
USPC ........... 362/97.1; 362/623; 362/629; 264/1.1; 359/359

(58) Field of Classification Search ................. 362/97.1, 362/623, 629; 264/1.1; 359/359
See application file for complete search history.

(56) References Cited

U.S. PATENT DOCUMENTS 5,844,731 A    12/1998 Kabumoto et al.
6,661,486 B1 *  12/2003 Faris et al. .................... 349/115

(Continued)

FOREIGN PATENT DOCUMENTS

EP    2 018 962 A1    1/2009
JP    6-89160 B2    11/1994

(Continued)

OTHER PUBLICATIONS

International Search Report, dated Jul. 7, 2009 and issued in PCT/JP2009/056145.

*Primary Examiner* — Stephen F Husar
*Assistant Examiner* — James Cranson, Jr.
(74) *Attorney, Agent, or Firm* — Birch, Stewart, Kolasch & Birch, LLP

(57) ABSTRACT

A reflecting sheet of the invention is comprised of at least two, a surface layer portion and an inner layer portion, or more layers, and is characterized in that the surface layer portion contains at least a thermoplastic resin (C), the inner layer portion contains a thermoplastic resin (A), and at least one kind of thermoplastic resin (B) incompatible with the thermoplastic resin (A), reflected light intensity in a vertical direction has anisotropy by an incident direction when light is incident at an incident angle of 60 degrees with respect to the vertical direction of a plane of the reflecting sheet in the entire reflecting sheet including the surface layer portion and the inner layer portion, and that a ratio L1/L2, which is a ratio of reflected light intensity L1 in the vertical direction in an incident direction A1 where the reflected light intensity in the vertical direction is the highest to reflected light intensity L2 in the vertical direction in an incident direction A2 orthogonal to the incident direction A1, is 1.2 or more.

49 Claims, 62 Drawing Sheets

U.S. PATENT DOCUMENTS

2006/0071231 A1* 4/2006 Han et al. .................. 257/103
2010/0165472 A1* 7/2010 Hamasaki et al. ............ 359/627

FOREIGN PATENT DOCUMENTS

| | | |
|---|---|---|
| JP | 2925745 B2 | 7/1999 |
| JP | 2001-13880 A | 1/2001 |
| JP | 2002-40214 A | 2/2002 |
| JP | 2004-127643 A | 4/2004 |
| JP | 2007-298963 A | 11/2007 |
| WO | WO 2007/132826 A1 | 11/2007 |

* cited by examiner

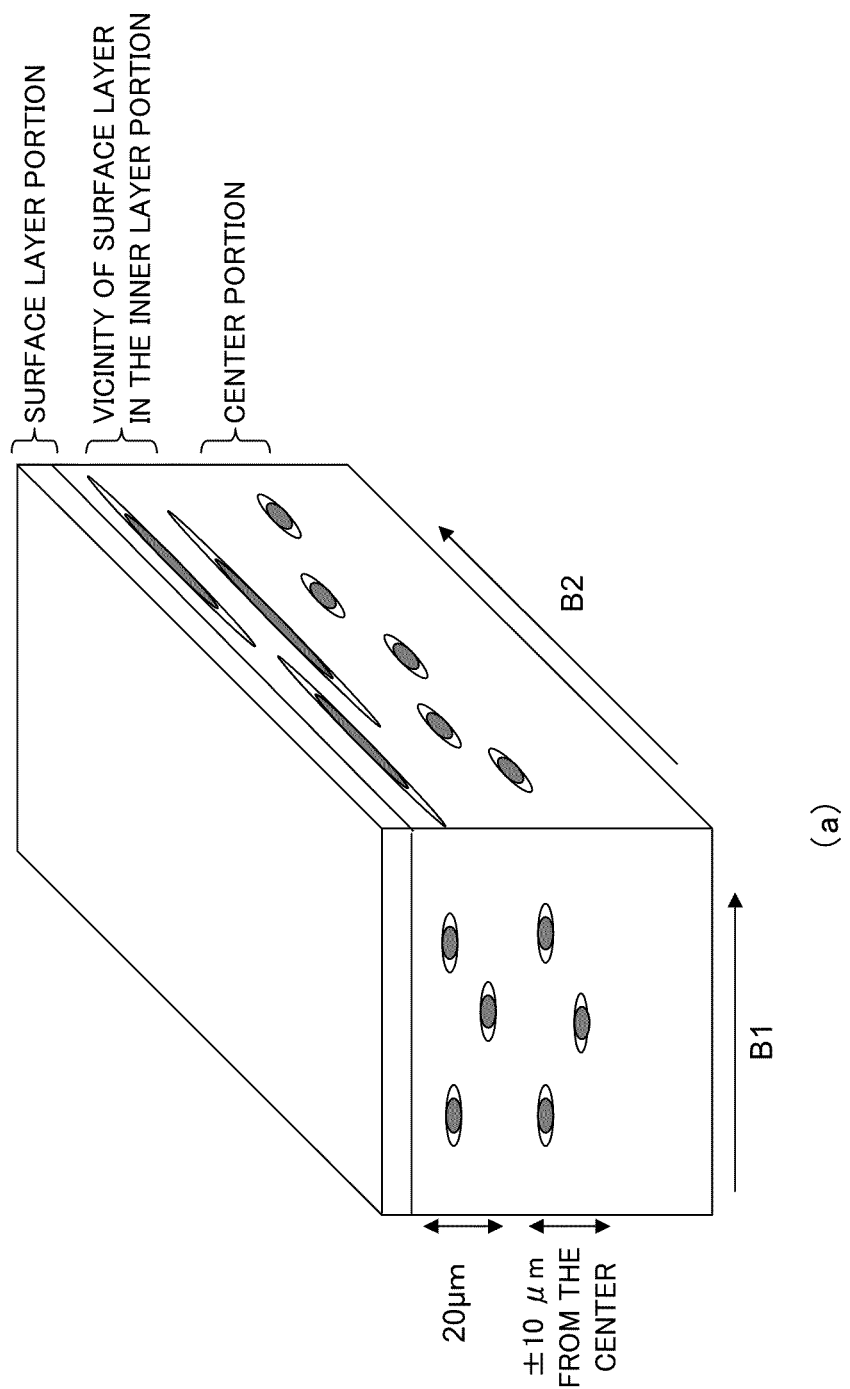

MD PARALLEL CROSS SECTION OF EXAMPLE 19

ME PERPENDICULAR CROSS SECTION OF EXAMPLE 19

MD PARALLEL CROSS SECTION IN THE VICINITY OF SURFACE LAYER IN THE INNER LAYER PORTION OF EXAMPLE 19

MD PERPENDICULAR CROSS SECTION IN THE VICINITY OF SURFACE LAYER IN THE INNER LAYER PORTION OF EXAMPLE 19

MD PARALLEL CROSS SECTION IN THE CENTER PORTION
IN THE INNER LAYER PORTION OF EXAMPLE 19

MD PERPENDICULAR CROSS SECTION IN THE CENTER
PORTION IN THE INNER LAYER PORTION OF EXAMPLE 19

MD PARALLEL CROSS SECTION IN THE VICINITY OF SURFACE LAYER IN THE INNER LAYER PORTION OF COMPARATIVE EXAMPLE 24

MD PERPENDICULAR CROSS SECTION IN THE VICINITY OF SURFACE LAYER IN THE INNER LAYER PORTION OF COMPARATIVE EXAMPLE 24

MD PARALLEL CROSS SECTION IN THE CENTER PORTION IN THE INNER LAYER PORTION OF COMPARATIVE EXAMPLE 24

MD PERPENDICULAR CROSS SECTION IN THE CENTER PORTION IN THE INNER LAYER PORTION OF COMPARATIVE EXAMPLE 24

REFLECTING SHEET

TECHNICAL FIELD

The present invention relates to a reflecting sheet of a resin composition containing voids inside thereof, and more particularly, to a reflecting sheet suitable for a reflector used in a backlight of a liquid crystal display device and the like.

BACKGROUND ART

Reflecting sheets are used as reflectors for reflecting light of a point-like or linear light source, such as LEDs and cold-cathode tubes, in plane form to thereby obtain a uniform plane-like light source in liquid crystal display devices, and particularly, used as reflectors of direct backlights of large-size liquid crystal display devices of liquid crystal televisions and the like. Conventionally, as the reflecting sheet, used are sheets containing fine voids inside thereof and sheets with a metal reflecting layer of silver or the like provided on their surface.

In the large-size liquid crystal display device of the large-size liquid crystal television or the like, a plurality of cold-cathode tubes that are linear light sources is arranged in parallel and used to lighten the display screen. In this case, streak-shaped lamp images derived from the cold-cathode tubes tend to occur, and therefore, by using a reflecting sheet that causes diffuse reflection among the reflecting sheets, it is intended to reduce the lamp images.

As the reflecting sheet that causes diffuse reflection, sheets containing fine voids inside thereof are generally used, and for example, include reflecting sheets obtained by stretching a sheet such that inorganic powder is added to a polyester resin or polypropylene resin and thereby forming fine voids originating from the inorganic powder, and sheets obtained by impregnating a sheet made of a polyester resin with a nitrogen gas or carbon dioxide gas to foam.

The light which is emitted from linear light sources such as cold-cathode tubes and reflected by these reflecting sheets tends to cause streak-shaped fluctuations in the level of brightness i.e. lamp images. This is because areas immediately above the cold-cathode tubes are bright while areas between the cold-cathode tubes are dark. In the large-size liquid crystal television and the like, to evenly reflect the incident light, it is generally performed that a diffuser is used before the reflected light enters the liquid crystal panel to uniformize the luminance of the light entering the liquid crystal panel. At this point, by setting a long distance (>20 mm) between the reflecting sheet and the diffuser, a distance is put in between the cold-cathode tubes and the reflecting sheet, and the lamp images are reduced. Further, by installing various optical sheets above the diffuser, it is intended to reduce lamp images.

However, at present, with attention directed toward further super-slim TVs, it is strongly desired to make the direct type ultra-thin. As the backlight is ultra-thinned, there is a tendency that the lamp images derived from the cold-cathode tubes increases, and reductions in the lamp image are a significant issue in super-slim TV development.

Meanwhile, in parallel with the super-slimming, at present, with attention directed toward reductions in the cost and increases in energy saving in the liquid crystal TV, it is strongly desired to decrease the cold-cathode tubes of the direct type backlight i.e. save the lamp. As the cold-cathode tubes of the backlight are decreased, the spacing between the cold-cathode tubes increases, the lamp images derived from the cold-cathode tubes tend to increase, and reductions in the lamp image are a significant issue in saving the lamp.

[Patent Document 1] Japanese Examined Patent Publication No. H06-89160
[Patent Document 2] Japanese Patent Gazette No. 2925745

DISCLOSURE OF INVENTION

The present invention was made in view of the above-mentioned respects, and it is an object of the invention to provide a reflecting sheet enabling reductions in lamp images tending to occur in an ultra-thin direct type backlight and lamp-saving direct type backlight. Further, it is another object to provide a method of manufacturing the reflecting sheet with efficiency.

A reflecting sheet of the invention is a reflecting sheet comprised of at least two, a surface layer portion and an inner layer portion, or more layers, and is characterized in that the surface layer portion contains at least a thermoplastic resin (C), the inner layer portion contains a thermoplastic resin (A), and at least one kind of thermoplastic resin (B) incompatible with the thermoplastic resin (A), reflected light intensity in a vertical direction has anisotropy by an incident direction when light is incident at an incident angle of 60 degrees with respect to the vertical direction of a plane of the reflecting sheet in the entire reflecting sheet including the surface layer portion and the inner layer portion, and that a ratio L1/L2, which is a ratio of reflected light intensity L1 in the vertical direction in an incident direction A1 where the reflected light intensity in the vertical direction is the highest to reflected light intensity L2 in the vertical direction in an incident direction A2 orthogonal to the incident direction A1, is 1.2 or more.

The reflecting sheet of the invention is comprised of two or more layers including a surface layer portion and an inner layer portion, where the surface layer portion contains at least a thermoplastic resin (C), the inner layer portion contains a thermoplastic resin (A), and at least one kind of thermoplastic resin (B) incompatible with the thermoplastic resin (A), and the ratio L1/L2, which is the ratio of reflected light intensity L1 in the incident direction A1 such that the reflected light intensity in the 0-degree direction is the highest to reflected light intensity L2 in the incident direction A2 orthogonal to the incident direction A1, is 1.2 or more, and therefore, has the effect of reducing lamp images of ultra-thin backlights among direct type backlights using linear light sources including cold-cathode tubes. Further, the reflecting sheet has the effect of reducing lamp images in lamp-saving backlights. A reflecting sheet manufacturing method of the invention has high ease of stretching, and enables the reflecting sheet to be manufactured in high yield. Further, the reflecting sheet obtained by the reflecting sheet manufacturing method of the invention has diffusion anisotropy such that the reflected light intensity in the 0-degree direction varies with the incident direction when light is incident at an incident angle of 60 degrees, and therefore, has the effect of reducing lamp images of direct type backlights using linear light sources including cold-cathode tubes.

BRIEF DESCRIPTION OF DRAWINGS

FIG. 1(a) is a schematic diagram to explain a form of a resin B of a reflecting sheet according to the invention;

BEST MODE FOR CARRYING OUT THE INVENTION

Figures 1B, 1C:
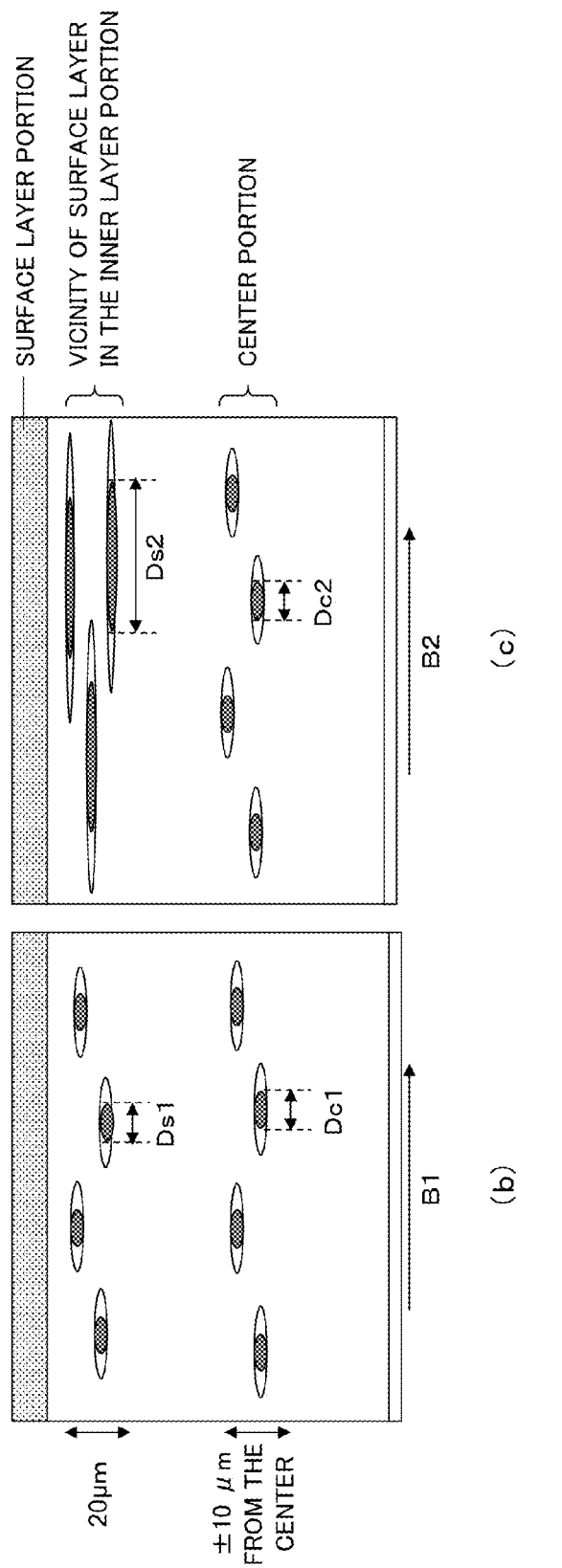
FIGS. 1(b) and 1(c) are cross-sectional schematic views to explain the form of the resin B of the reflecting sheet according to the invention.

Embodiments of the invention will specifically be described below with reference to accompanying drawings. In addition, there are cases of distinguishing a film with a thickness of 200 μm or less from a sheet with a thickness exceeding 200 μm and thus using different terms, but in this description, the aforementioned film and sheet are both referred to as sheets. Further, in this description, in descriptions of the backlight, the screen side is described as upper, while the backside of the screen is described as lower.

(Composition Constituting a Reflecting Sheet Inner Layer Portion)

A reflecting sheet of the invention is comprised of at least two layers of a surface layer portion and an inner layer portion, and the inner layer portion contains a thermoplastic resin (A), and at least one kind of thermoplastic resin (B) incompatible with the thermoplastic resin (A).

The thermoplastic resin (A) forming the inner layer portion of the reflecting sheet of the invention is not limited particularly, and examples thereof include olefin resins such as low-density polyethylene, polypropylene, polymethyl pentene and norbornene resins; polyamide resins such as 6 nylon and 66 nylon; polyester resins such as polyethylene terephthalate, polyethylene naphthalate, polytrimethylene terephthalate and polybutylene terephthalate; acrylic resins such as polymethylene methacrylate; styrene resins such as polystyrene and polystyrene-methyl methacrylate copolymers; and polycarbonate resins. Among the resins, in terms of high heat resistance and ease of obtaining high reflectance, polypropylene resins are more preferable. Herein, when using a polypropylene resin, at least one kind of resin (B) incompatible with the polypropylene resin is contained as a void forming agent.

The polypropylene resins mean polypropylene resins formed of polymers of propylene alone or copolymers with monomers such as ethylene copolymerizable with propylene. The polypropylene resin (A) is preferably polypropylene resins such that the melt flow rate, which is measured with a load of 21.2 N at a temperature of 230° C. by the method of JIS K7210, ranges from 0.1 g/min. to 10 g/min. The melt flow rate is preferably 0.1 g/min. or more from the viewpoint of discoloration by load of an extruder and heat of the resin composition when the polypropylene resin is melted and formed, and is preferably 10 g/min. or less from the viewpoint of viscosity and formability of the resin.

As the resin (B) (hereinafter, also referred to as simply "resin (B)") incompatible with the thermoplastic resin (A), resins are preferable such that the modulus of elasticity of the resins is higher than that of the thermoplastic resin (A) at temperatures enabling stretching of the thermoplastic resin (A). Examples of the resins include polycarbonate resins, polymethyl pentene resins, polycyclo olefin resins such as polynorbornene resins, polyester resins and polyamide resins. Particularly, when the polypropylene resin is used as the thermoplastic resin (A), among preferable resins as the resin (B) are polycarbonate resins, polymethyl pentene resins, polycyclo olefin resins such as polynorbornene resins, polyester resins and polyamide resins. It is preferable to use one kind of resin among the resins by melting and mixing with the polypropylene resin, and using polycarbonate resins is the most preferable. In addition, herein, "incompatible" means a state in which resins are not intermingled with each other, and isolated from each other. Particularly, in the invention, it is preferable that the resin (B) is dispersed in the thermoplastic resin (A), and isolation can be confirmed by a scanning electron microscope (SEM). Since the resin (B) is incompatible with the thermoplastic resin (A), the resin B is capable of exhibiting the effect as a void forming agent with excellence.

As the polycarbonate resins that are of preferable example of the resin (B), it is possible to use aromatic polycarbonate, straight chain polycarbonate and branched chain polycarbonate alone or in combination thereof. The polycarbonate resins are preferably polycarbonate resins such that the melt flow rate, which is measured with a load of 11.8 N at a temperature of 300° C. by the method of JIS K7210, ranges from 0.1 g/10 min. to 50 g/10 min. From the viewpoint of making a mixture with the polypropylene resin uniform, the melt flow rate of the polycarbonate resin is preferably 0.1 g/10 min. or more, and from the viewpoint of ease of forming voids in stretching, the melt flow rate is preferably 50 g/10 min. or less.

In the invention, it is preferable that the thermoplastic resin (A) is in an amount of from 30 percent to 80 percent by weight relative to the total resin composition. From the viewpoint of tension and extensibility in stretching the resin, the ratio of the thermoplastic resin (A) to the total inner layer portion resin composition is preferably 30 percent by weight or more, and more preferably, 40 percent by weight or more. Meanwhile, to obtain reflecting sheets with high average total reflection index of 90% or more by stretching the sheet of extruded inner layer portion resin composition and forming voids inside the sheet, the ratio of the thermoplastic resin (A) is preferably 80 percent by weight or less relative to the total inner layer portion resin composition, and more preferably 70 percent by weight or less. The average total reflection index referred to herein is the average value in both directions when the total reflection index is measured for the light with a wavelength of 550 nm incident in each of the MD direction and the TD direction of the sheet. From the viewpoint of decreasing the stretching tension, the content of the resin (B) is preferably 70 percent by weight or less relative to the total resin composition. From the viewpoint of increasing the number of voids and void volume of the sheets to obtain a high average total reflection index of 90% or more, the resin (B) is preferably in an amount of from 20 percent by weight or more relative to the total resin composition, and more preferably in an amount of from 30 percent to 60 percent by weight. When the resin composition is formulated, the conversion between percent by weight and percent by volume can be calculated from the density of basic properties of each resin. For example, the density of the polypropylene resin ranges from 0.89 g/cm$^3$ to 0.91 g/cm$^3$, the density of the polycarbonate resin is 1.2 g/cm$^3$, and the conversion can be calculated from the values with ease when necessary.

In the invention, a void forming agent, UV absorbing agent, and other inorganic powder as required may be added further to the resin composition.

(Composition Constituting a Reflecting Sheet Surface Layer Portion)

The reflecting sheet of the invention is formed of at least two, surface layer portion and inner layer portion, or more layers, where the surface layer portion contains a thermoplastic resin (C).

The thermoplastic resin (C) may be the same resin as the thermoplastic resin (A) of the inner layer portion, or a different kind of thermoplastic resin may be used. Preferable kinds in the thermoplastic resin (C) are the same resin as in the thermoplastic resin (A).

It is preferable that the reflecting sheet of the invention contains a UV absorbing agent in the surface layer portion. As the UV absorbing agent, inorganic powder such as titanium oxide and zinc oxide is preferable, because the fear of bleed out is low. Further, organic UV absorbing agents are also preferable, in terms of assuring transparency of the surface layer portion. As the organic UV absorbing agent, it is possible to use UV absorbing agents of benzotriazole series, benzophenone series, triazine series, benzoate series, hindered phenol series, hindered amine series and the like. Among the agents, benzotriazolic UV absorbing agents are suitably used, in terms of UV resistance and compatibility with the resin. An example of the organic UV absorbing agents is T234 produced by Ciba Specialty Chemicals K.K. The concentration of the UV absorbing agent in the surface layer portion is determined from balance between the bleed-out property and transparency, is preferably in the range of 0.1 percent to 10 percent by weight, and particularly preferably in the range of 0.15 percent to 8 percent by weight.

Further, when inorganic powder such as titanium oxide and zinc oxide is used as the UV absorbing agent, the inorganic powder may undergo surface modification as necessary. Particularly, zinc oxide and titanium oxide are generally beforehand given surface modification using alumina, silica, etc. and may be used, or a surface modifying agent such as stearic acid and zinc stearate may be added separately.

As a particle size of the inorganic powder used as a UV absorbing agent, the average particle size is preferably in the range of 1 nm to 1000 nm. When the average particle size is 1 nm or more, increases in the size due to coagulation of inorganic particles are hard to occur, and when the average particle size is 1000 nm or less, it is possible to assure sufficient transparency of the surface layer portion. The average particle size ranges more preferably from 5 nm to 500 nm, and particularly preferably from 5 nm to 400 nm.

The content of the UV absorbing agent in the invention is preferably in the range of 0.01 g/m$^2$ to 5/m$^2$ in the surface layer portion. When the content of the UV absorbing agent is 0.01 g/m$^2$ or more, excellent UV absorbing performance appears. When the content is 5 g/m$^2$ or less, the fear of bleed out is a few, and it is possible to assure sufficient transparency of the surface layer portion. The range is more preferably from 0.05 g/m$^2$ to 4 g/m$^2$, and particularly preferably from 0.1 g/m$^2$ to 4 g/m$^2$.

The surface layer portion of the reflecting sheet is capable of containing inorganic powder when necessary, as well as the inorganic powder having the UV absorbing action. As the inorganic powder, preferable are substances such that light scattering property is low and that the total reflection index of the surface layer portion can be controlled to within 50% or less and thus to be low. For example, barium sulfate, calcium carbonate and silica are preferable. These inorganic powders may be used alone, or two or more powders may be combined and used. At this point, when the inorganic powder is added, from the viewpoint of assuring transparency, it is preferable to add to the surface layer portion in an amount of from 0.01 g/m$^2$ to 5 g/m$^2$.

In the surface layer portion of the reflecting sheet in the invention, it is preferable that the total reflection index of the surface layer portion is 50% or less. By making the total reflection index of the surface layer portion 50% or less, without canceling incident-direction anisotropy in the reflected light intensity derived from the inner layer portion and reflectivity anisotropy, as a result, it is possible to exploit the lamp image reducing performance of the reflecting sheet. The total reflection index of the surface layer portion is more preferably 40% or less, particularly preferably 30% or less, and most preferably 20% or less. The total reflection index of the surface layer portion can be measured with ease by removing the surface layer portion and measuring even in an integral-type sheet such as a co-extruded sheet.

(Structure of the Reflecting Sheet)

The reflecting sheet of the invention is formed of at least the surface layer portion and inner layer portion, and thus two layers, and for example, may have a three-layer structure of surface layer portion/inner layer portion/surface layer portion, or may further have another layer such as a light resistant layer on the surface of the surface layer portion. In addition, when the sheet is comprised of two layers i.e. the surface layer portion and inner layer portion, a layer used on the light source side of the reflecting sheet is defined as the surface layer portion, and a layer used on the opposite side to the light source is defined as the inner layer portion. Further, when the sheet is comprised of three or more layers, the sheet is only required to have the surface layer portion and inner layer portion among three or more layers. For example, when the light resistant layer is provided on the topmost layer, the structure may be topmost layer portion (light resistant layer)/surface layer portion/inner layer portion.

The inner layer portion of the reflecting sheet of the invention preferably has a structure having voids inside thereof, and due to the void structure, is capable of exhibiting the reflective performance effectively. The void referred to herein is the so-called hole and void, and can adopt any form such as continuous void and independent void. It is considered that the reflecting sheet has voids therein, the light is thereby reflected in the interfaces between the void and the thermoplastic resin (A) and between the void and the resin (B), and that high reflective performance appears. In addition, in the reflecting sheet of the invention, the void structure may not exist in the inner layer portion.

The thickness of the inner layer portion preferably ranges from 60 μm to 900 μm. When the thickness of the inner layer portion is 60 μm or more, it is possible to develop excellent reflective performance. When the thickness of the inner layer portion is 900 μm or less, it is possible to assure satisfactory lightweight. Further, the thickness ranges more preferably from 70 μm to 700 μm, and particularly preferably from 70 μm to 600 μm.

The thickness of the surface layer portion in the invention preferably ranges from 2 μm to 90 μm. When the thickness of the surface layer portion is 2 μm or more, it is possible to obtain excel lent forming facility. When the thickness of the surface layer portion is 90 μm or less, it is possible to assure satisfactory lightweight. Further, the thickness ranges more preferably from 2 μm to 70 μm, and particularly preferably from 3 μm to 50 μm.

The thickness of the entire reflecting sheet in the invention preferably ranges from 70 μm to 1000 μm. When the thickness of the entire reflecting sheet is 70 μm or more, it is possible to exhibit excellent reflective performance. When the thickness is 1000 μm or less, it is possible to assure satisfactory lightweight. Further, the thickness is preferably in the range of 80 μm to 800 μm, and more preferably in the range of 80 μm to 700 μm.

The weighing of the entire reflecting sheet of the invention preferably ranges from 10 g/m$^2$ to 500 g/m$^2$. When the weighing of the entire reflecting sheet is 10 g/m$^2$ or more, it is possible to develop excellent reflective performance. When the weighing is 500 g/m$^2$ or less, it is possible to assure satisfactory lightweight. Further, the weighing ranges more preferably from 20 g/m$^2$ to 400 g/m$^2$, and particularly preferably from 40 g/m$^2$ to 300 g/m$^2$.

In the reflecting sheet in the invention, the entire density including the surface layer portion and inner layer portion ranges preferably from 0.1 g/cm$^3$ to 0.75 g/cm$^3$. When the entire density is 0.1 g/cm$^3$ or more, it is possible to hold the sufficient strength as the reflecting sheet. Meanwhile, when the density is 0.75 g/cm$^3$ or less, it is possible to form the structure with many fine voids and obtain high reflectance, while assuring excellent lightweight. The density ranges more preferably from 0.2 g/cm$^3$ to 0.5 g/cm$^3$, and particularly preferably from 0.2 g/cm$^3$ to 0.45 g/cm$^3$.

The reflecting sheet of the invention is characterized by being comprised of at least the surface layer portion and inner layer portion, and thus two layers. By adding the surface layer portion, it is possible to increase a regular reflection component, and thus increase the lamp image reducing effect. As a method of fabricating the reflecting sheets of two or more layers, for example, there are a fabricating method of extruding the surface layer portion and inner layer portion separately to form sheets and laminating the sheets, another fabricating method of fabricating the inner layer portion and then forming the surface layer portion by coating, and still another fabricating method of forming the surface layer portion and inner layer portion integrally by co-extrusion and then stretching and making voids. More preferable is the fabricating method of forming the surface layer portion and inner layer portion integrally by co-extrusion and then stretching and making voids. Particularly, by forming the surface layer portion and inner layer portion integrally by co-extrusion, it is possible to orient the resin (B) in the vicinity of the surface layer portion inside the inner layer portion with excellence, and as a result, it is possible to significantly increase anisotropy of the reflected light intensity by the incident direction as described later.

In the reflecting sheet of the invention, it is preferable that the average total reflection index is 90% or more when the light with a wavelength of 550 nm is applied. This is because when the average total reflection index is 90% or more in applying the light with a wavelength of 550 nm is applied, it is possible to obtain sufficient luminance when the sheet is installed in a liquid crystal backlight. The average total reflection index is more preferably 95% or more.

In the reflecting sheet of the invention, it is preferable that the regular reflectance is 5% or more. By making the regular reflectance in the surface 5% or more, it is possible to effectively reduce the lightness immediately above the cold-cathode tube. The regular reflectance is particularly preferably 5.5% or more. Measurement of the regular reflectance is generally performed by measuring the total reflectance and diffuse reflectance using a spectrophotometer (Konica Minolta Holdings, Inc., CM-2600d, etc.), and the regular reflectance is obtained by subtracting the diffuse reflectance from the total reflectance.

The reflecting sheet of the invention is formed of at least two layers, the surface layer portion and inner layer portion, where the resin (B) in the vicinity of the surface layer portion in the inner layer portion is oriented in one direction in form of the shape of a rod, and in the length Ds2 in the direction B2 (hereinafter, simply referred to as B2 direction) where the length of the resin (B) is the maximum and the length Ds1 in the direction B1 (hereinafter, simply referred to as B1 direction) orthogonal to B2 inside the reflecting sheet plane, it is preferable that the ratio Ds2/Ds1 is 3 or more. In addition, "the shape of a rod" herein does need to always extend linearly, and includes all the shapes extending to orient in one direction.

The vicinity of the surface layer portion in the inner layer portion, B1 direction and B2 direction are shown in FIG. 1(a) to FIGS. 1(b), (c). As shown in FIG. 1(a) to FIGS. 1(b), (c), the vicinity of the surface layer portion in the inner layer portion indicates the range from the interface between the inner layer portion and the surface layer portion to 20 μm toward the center in the thickness direction. Thus, when the resins (B) in the vicinity of the surface layer portion in the inner layer portion are oriented in one direction and the ratio of Ds2/Ds1 is 3 or more, in applying light to the reflecting sheet in the direction of 60 degrees from the vertical direction (hereinafter, also referred to as simply 0-degree direction) of the reflecting sheet plane, the reflected light intensity in the 0-degree direction in such application has anisotropy by the incident direction, and it is possible to reduce the lamp images in incorporating the reflecting sheet into the backlight. The ratio Ds2/Ds1 is more preferably 6 or more, and particularly preferably 10 or more.

In the reflecting sheet of the invention, it is preferable that the resin (B) in the center portion in the inner layer portion has a shape close to spherical shape, and that the ratio Dc2/Dc1 of the length Dc2 in the direction B2 to the length Dc1 in the direction B1 ranges from 0.4 to 2.5. Herein, as shown in FIG. 1(a) to FIGS. 1(b), (c), the center portion of the inner layer portion indicates the range from the center in the thickness direction portion to ±10 μm toward the surface layer portion. When the shape of the resin (B) is such that Dc2/Dc1 ranges from 0.4 to 2.5 in the center portion of the inner layer portion, fine voids made in stretching are formed evenly around, and it is possible to increase the total reflection index and luminance. More specifically, Dc2/Dc1 ranges from 0.5 to 2.0.

The length of the resin (B) inside the inner layer portion of the reflecting sheet of the invention is observed by cross-sectional photograph enlarged using the scanning electron microscope (SEM). The microsection is obtained by cutting the sheet using a cryomicrotome while varying the direction at 15° intervals, and coating each cut surface with Os. For Ds2 and Ds1, in the photograph of cross section cut in each direction, lengths of the resin (B) in the range of 100 μm (cut direction)×20 μm (thickness in the vicinity of the surface layer in the inner layer portion) are measured, and the average value is made the length of the resin (B) in the vicinity of the surface layer portion in the inner layer portion. From the photograph of cross section cut in each direction, the length of the resin (B) in each direction is obtained, and it is defined that the direction in which the length of the resin (B) in the vicinity of the surface layer portion in the inner layer portion is the maximum is B2, the length in B2 is Ds2, the direction orthogonal to B2 is B1, and that the length of the resin (B) in B1 is Ds1. Further, for Dc2 and Dc1, from photographs of cross section cut in the B2 or B1 direction, the lengths of the resin (B) in the range of 20 μm (cut direction)×20 μm (thickness in the center portion in the inner layer portion) are measured, the average value is made the length of the resin (B) in the center portion, and it is defined that the length in the B2 direction is Dc2, and that the length in the B1 direction is Dc1.

In the reflecting sheet of the invention, it is preferable that the resin (B) in the vicinity of the surface layer portion in the inner layer portion is oriented in one direction in form of the shape of a rod, and by this means, the reflecting sheet has the effect that the reflected light intensity in the 0-degree direction in applying the light at an incident angle of 60 degrees with respect to the vertical direction has anisotropy by the incident direction.

The reflecting sheet of the invention is characterized in that the reflected light intensity in the vertical direction has anisotropy by the incident direction when light is incident at an incident angle of 60 degrees with respect to the vertical direction, and that the ratio L1/L2, which is a ratio of reflected light intensity L1 in the vertical direction in the incident direction A1 such that the reflected light intensity in the vertical direction is the highest to reflected light intensity L2 in the vertical direction in the incident direction A2 orthogonal to the incident direction A1, is 1.2 or more. By suitably using the reflecting sheet such that the reflected light intensity has anisotropy by the incident direction, it is possible to reduce lamp images of the direct type backlight. The ratio L1/L2 of the reflected light intensity in the vertical direction is more preferably 1.4 or more, and particularly preferably 1.6 or more. In addition, the reflecting sheet having anisotropy in the reflected light intensity by the incident direction as described above can be used usefully in the sidelight type backlight, as well as the direct type backlight.

The reflecting sheet of the invention is characterized by being comprised of at least two, surface layer portion and inner layer portion, and more layers. By having the surface layer portion, it is possible to increase the regular reflection component, and to increase the lamp image reducing effect. Further, by forming the surface layer portion and inner layer portion integrally by co-extrusion, it is possible to orient the resin (B) in the vicinity of the surface layer portion in the inner layer portion with excellence, and as a result, it is possible to significantly increase anisotropy (L1/L2) of the reflected light intensity by the incident direction as described previously.

Measurement of the reflected light intensities L1 and L2 in the invention is performed using a varied-angle luminance meter (EZ Contrast XL88) produced by ELDIM. In this apparatus, a luminance meter with a concave lens is set above the stage on which a sample is mounted. A D65 white point light source originating from a Xenon lamp is applied to the sample at a desired incident angle through the luminance meter lens, and it is possible to measure the reflected direction distribution of reflected light and luminance in each direction. In the invention, the point light source is applied in the direction of 60 degrees with respect to the vertical direction of the sample, the luminance in the 0-degree direction i.e. the vertical direction is obtained, and it is thereby possible to measure the reflected light intensity. In the invention, to obtain the incident direction A1 with the highest reflected light intensity, the intensity is measured while rotating the sample by 15 degrees, and the direction in which the reflected light intensity is the highest is defined as A1. A2 is the direction orthogonal to A1.

Described below is the above-mentioned reduction in the lamp image of the backlight using the reflecting sheet such that the reflected light intensity has anisotropy by the incident direction.

In the thin direct type backlight where the distance between the reflecting sheet upper surface and the diffuser lower surface is 20 mm or less, it is preferable that the reflecting sheet is incorporated into the thin backlight so that the A2 direction is orthogonal to the cold-cathode tubes. In the thin direct type backlight where the distance between the reflecting sheet upper surface and the diffuser lower surface is 20 mm or less, areas immediately above the cold-cathode tubes are very bright even in using the diffuser and optical sheets, and it is significantly difficult to resolve lamp images. In the reflecting sheet of the invention, the reflected light intensity in the vertical direction is different between the A1 direction and A2 direction, diffusion of the light incident in the A2 direction is low, and the reflected light intensity in the vertical direction is lower than in the case that the light is incident in the A1 direction. By incorporating the reflecting sheet into the thin backlight so that the A2 direction is orthogonal to the cold-cathode tubes, brightness immediately above the cold cathode-tubes is reduced, and as a result, it is possible to remarkably dissolve the lamp images.

The development mechanism of the lamp image reducing effect is not clarified, but by orthogonalizing the A2 direction with low diffusion to the cold-cathode tubes, diffusion reflection in the orthogonal direction of the cold-cathode tubes is reduced, and the light from the cold-cathode tube striking the reflecting sheet immediately below the cold cathode-tube is disturbed by the cold-cathode tube itself, and does not reach the diffuser. As a result, it is considered that the light amount reaching immediately above the cold-cathode tube decreases and contributes to reductions in the lamp image.

As described above, it is preferable that the reflecting sheet of the invention is installed in the backlight unit so that the A2 direction is orthogonal to the cold-tube tubes. In the backlight such that the distance between the reflecting sheet upper surface and the diffuser lower surface is less than 20 mm, it is particularly preferable that the reflecting sheet is arranged so that the A2 direction and cold-cathode tubes are orthogonal to each other. By thus installing, it is possible to decrease brightness immediately above the cold-cathode tubes, and reduce the lamp images.

Figure 2:
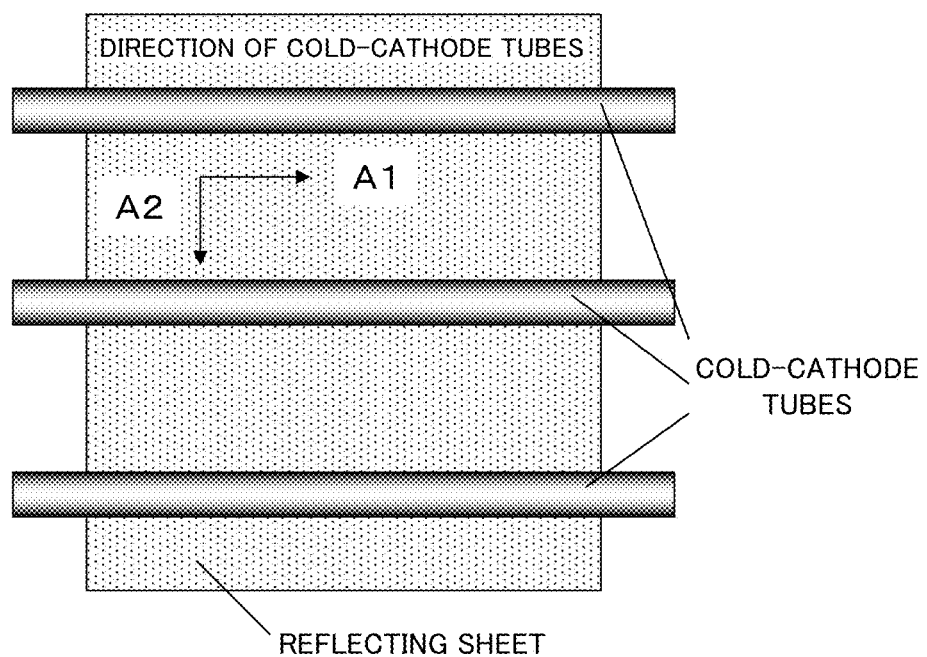
FIG. 2 is a plan view illustrating a backlight unit provided with the reflecting sheet according to an Embodiment of the invention.
Figure 3:
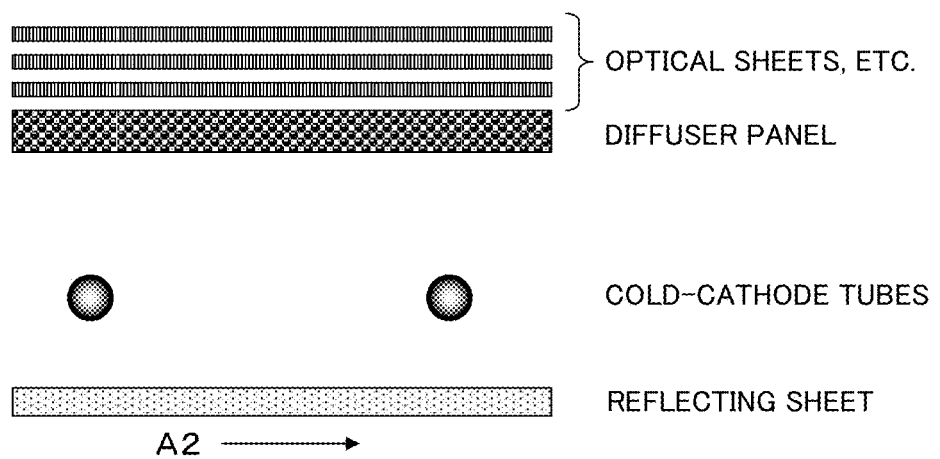
FIG. 3 is a side elevational view illustrating the backlight unit provided with the reflecting sheet according to the Embodiment of the invention.

The installation diagrams of the reflecting sheet in the backlight are shown in FIGS. 2 and 3. As shown in FIG. 2 (plan view), the reflecting sheet is installed so that the incident direction A2 with the lowest reflected light intensity in the vertical direction is orthogonal to the cold-cathode tubes. Further, in this backlight unit, as shown in FIG. 3, the cold-cathode tubes are provided above the reflecting sheet, and the diffuser and optical sheets are provided above the cold-cathode tubes. Herein, when the reflecting sheet of the invention is installed in the backlight unit so that the A2 direction and cold-cathode tubes are orthogonal to each other, it is preferable that the distance between the reflecting sheet upper surface and the diffuser lower surface is 20 mm or less.

The effect of lamp image reduction, obtained by installing the reflecting sheet of the invention in the backlight unit so that the A2 direction and the cold-cathode tubes are orthogonal to each other, is developed more effectively under the thin condition of the backlight unit, and it is possible to reduce the lamp images effectively by setting the distance between reflecting sheet upper surface and the diffuser lower surface at 20 mm or less in the backlight. The distance is more preferably 19 mm or less, and particularly preferably 18 mm or less.

In direct type backlights where the distance between the reflecting sheet upper surface and the diffuser lower surface is more than 20 mm, it is preferable that the reflecting sheet is incorporated into the backlight so that the A1 direction is orthogonal to the cold-cathode tubes. In the direct type backlight where the distance between the reflecting sheet upper surface and the diffuser lower surface is more than 20 mm, it is desirable that the reflecting sheet efficiently reflects the light from the light source toward the front of the screen i.e. in the vertical direction of the reflecting sheet, from the viewpoint of enhancing luminance and reducing the lamp images. Herein, in the direct type backlight where the distance between the reflecting sheet upper surface and the diffuser lower surface is more than 20 mm, cold-cathode tubes that are line light sources are used, the reflecting sheet does not scatter the light from all the directions evenly in the vertical direction, and it is considered preferable that the light from the cold-cathode tubes in the direction orthogonal to the cold-cathode tubes is efficiently scattered in the vertical direction.

Figure 4:
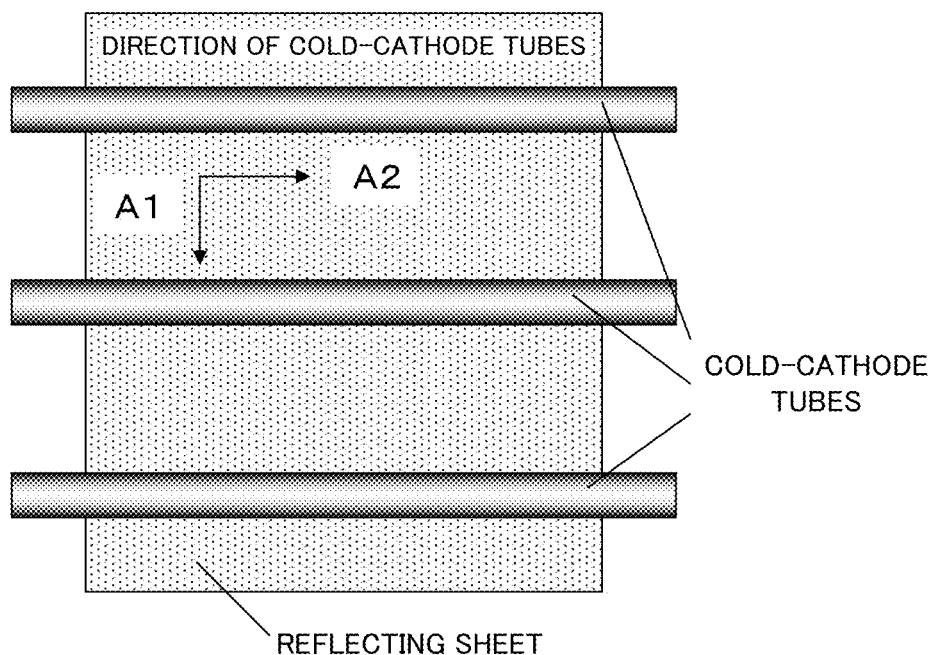
FIG. 4 is a plan view illustrating a backlight unit provided with the reflecting sheet according to an Embodiment of the invention.
Figure 5:
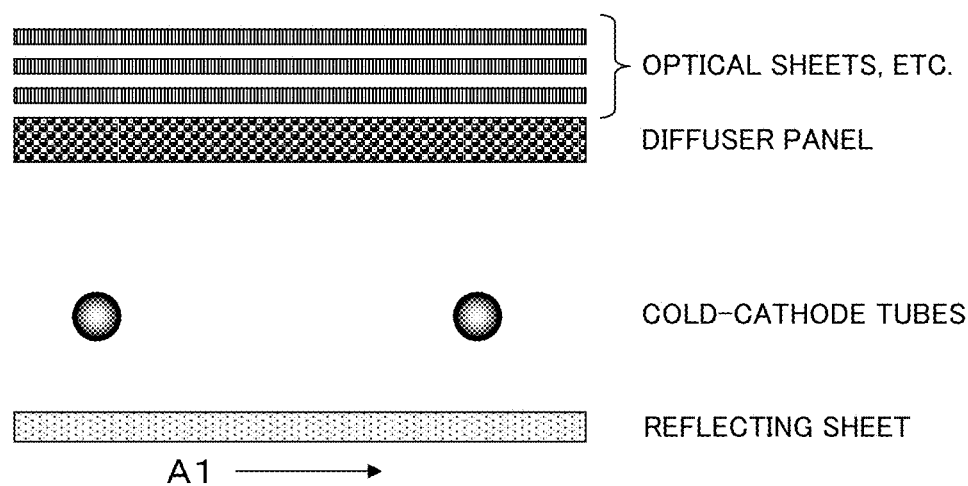
FIG. 5 is a side elevational view illustrating the backlight unit provided with the reflecting sheet according to the Embodiment of the invention.

In the direct type backlight where the distance between the reflecting sheet upper surface and the diffuser lower surface is more than 20 mm, it is preferable to install the reflecting sheet of the invention with the reflected light intensity in the vertical direction varying with the incident direction in the backlight unit so that the incident direction A1 with the highest reflected light intensity in the vertical direction is orthogonal to the cold-cathode tubes, in terms of reflecting the light from the cold-cathode tubes efficiently in the screen direction and reducing the lamp images. The installation diagrams of the reflecting sheet in the backlight are shown in FIGS. 4 and 5. As shown in FIG. 4 (plan view), the reflecting sheet is installed so that the incident direction A1 with the highest reflected light intensity in the vertical direction of the reflecting sheet surface is orthogonal to the cold-cathode tubes. Further, in this backlight unit, as shown in FIG. 5, the cold-cathode tubes are provided above the reflecting sheet, and the diffuser and optical sheets are provided above the cold-cathode tubes.

Particularly, in the configuration that the light sources such as the cold-cathode tubes are held between the reflecting sheet and the diffuser, in the lamp-saving direct type backlight where the shortest distance (distance between the reflecting sheet upper surface and the diffuser lower surface) between the reflecting sheet and the diffuser ranges from 20 mm to 60 mm, and the spacing between the cold-cathode tubes is 25 mm or more, even when the diffuser and optical sheets are used, areas between the cold-cathode tubes are very dark, and it is significantly difficult to resolve the lamp images. By incorporating the reflecting sheet into the lamp-saving direct type backlight so that the incident direction A1 with the highest reflected light intensity in the vertical direction is orthogonal to the cold-cathode tubes, it is possible to increase brightness between adjacent cold-cathode tubes, and as a result, it is possible to remarkably dissolve the lamp images.

When the reflecting sheet is incorporated into the lamp-saving direct type backlight so that the incident direction A1 with the highest reflected light intensity in the vertical direction is orthogonal to the cold-cathode tubes, it is preferable that the distance between the reflecting sheet upper surface and the diffuser lower surface is 20 mm or more. In the lamp-saving backlight where the distance between adjacent cold-cathode tubes is 25 mm or more, the lamp images tend to occur, and when the distance between the reflecting sheet upper surface and the diffuser lower surface is 20 mm or more, by the effect of lamp image reduction of the reflecting sheet of the invention, it is possible to provide liquid crystal panels with excellent uniform light sources with lamp images reduced. Further, as product design of liquid crystal TV, the distance between the reflecting sheet upper surface and the diffuser lower surface is preferably 60 mm or less, and more preferably in the range of 21 mm to 50 mm.

Further, the spacing between adjacent cold-cathode tubes is preferably in the range of 25 mm to 80 mm. When the spacing is 25 mm or more, it is possible to obtain low cost and energy-saving performance by lamp saving, and when the spacing is 80 mm or less, by using the reflecting sheet so that the incident direction A1 with the highest reflected light intensity in the 0-degree direction is orthogonal to the cold-cathode tubes, it is possible to provide liquid crystal panels with excellent uniform light sources with lamp images reduced. The spacing is more preferably in the range of 28 mm to 70 mm.

In the reflecting sheet of the invention, it is preferable that anisotropy of the total reflection index by the incident direction is 2% or more when the light with a wavelength of 550 nm is applied. This means that the reflecting sheet diffuse-reflects the light incident upon the reflecting surface, and that when the light incident upon the incident surface from two directions is diffuse-reflected, the total reflection index in each incident direction is different from one another by 2% or more. The anisotropy is preferably 3% or more, particularly preferably 5% or more, and most preferably 7% or more.

The total reflection index of the reflecting material causing diffusion reflection is measured by attaching a measurement sample to an apparatus generally called the integrating sphere sample base. The light is applied to the reflecting surface of the measurement sample attached to the integrating sphere sample base, the light subjected to diffusion reflection is collected, and the light amount is measured. The measured light amount is converted into a relative value relative to the light amount of 100% measured by attaching the reference sample, instead of the measurement sample, and defined as the total reflection index. In the invention, the total reflection index is measured by varying the direction of the light incident upon the reflecting plane of the reflecting sheet. More specifically, the direction of the incident light of the integrating sphere sample base is fixed, while the direction of the reflecting surface is varied when the measurement sample is attached to the integrating sphere sample base, and it is thereby possible to measure the total reflection index in each incident direction while varying the direction of the light applied to the reflecting surface to two directions. When the reflecting sheet, where anisotropy of the total reflection index by the incident direction is 2% or more when the light with a wavelength of 550 nm is applied, is used as a reflector of the thin backlight such as the backlight of the liquid crystal television using linear light sources, the reflecting sheet has the effect of reducing the lamp images and is preferable.

The development mechanism of the anisotropy of reflectance is not clarified, but it is preferable that the incident direction with the high total reflection index of the reflecting sheet is coincident with the A2 direction. In this case, the direction in which the total reflection index of the reflecting sheet is low is coincident with the A1 direction.

The mechanisms of the anisotropy of reflectance and lamp image resolution are not clarified, but particularly, in the thin direct type backlight where linear light sources such as clod-cathode tubes are used and the distance between the reflecting sheet upper surface and diffuser lower surface is 20 mm or less, when the reflecting sheet is installed so that the incident direction with the high total reflection index of the reflecting sheet is orthogonal to the cold-cathode tubes, it is possible to reduce brightness immediately above the cold-cathode tubes, and as a result, to greatly resolve the lamp images of the backlight unit. Meanwhile, in the direct type backlight where linear light sources such as clod-cathode tubes are used and the distance between the reflecting sheet upper surface and diffuser lower surface is more than 20 mm, when the reflecting sheet is installed so that the incident direction with the low total reflection index of the reflecting sheet is orthogonal to the cold-cathode tubes, it is possible to lighten areas between the cold-cathode tubes, and as a result, to resolve the lamp images of the backlight unit.

The reflecting sheet of the invention is characterized by having the incident direction such that the reflected light relative intensity (L'2) in the vertical direction ranges from 20% to 75% when the light is applied at an incident angle of 60 degrees with respect to the vertical direction of the reflecting sheet. Herein, the reflected light relative strength is a value obtained by dividing a value of the reflected light intensity in the vertical direction when the light is applied at an incident angle of 60 degrees with respect to the vertical direction of the reflecting sheet by a value of the reflected light intensity in the vertical direction when the light is applied to a standard white plate at an incident angle of 60 degrees. By setting the reflected light relative intensity in the vertical direction from some incident direction at 20% or more, it is possible to provide the light source with sufficient diffusion in the backlight. By setting such intensity at 75% or less, it is possible to darken areas immediately above the cold-cathode tubes and to adequately reduce the lamp images. Further, the reflected light relative intensity is more preferably in the range of 30% to 75%, and particularly preferably in the range of 40% to 72%.

Herein, the reflected light relative intensity (L'2) in the vertical direction of 20% to 75% does not need to be satisfied in the light of the incident angle of 60 degrees from all the incident directions, and is only required to be satisfied in the light of the incident angle of 60 degrees from some particular incident direction. For example, in the reflecting sheet having the anisotropy in the reflected diffusion light intensity by the incident direction, it is sufficient that the reflected light relative intensity (L'2) in the vertical direction ranges from 20% to 75% in the light of the incident angle of 60 degrees from some particular incident direction, and it is not necessary that the reflected light relative intensity (L'2) in the vertical direction ranges from 20% to 75% in the light of the incident angle of 60 degrees from other directions.

In the thin direct type backlight where the shortest distance (distance between the reflecting sheet upper surface and the diffuser lower surface) between the reflecting sheet and the diffuser is 20 mm or less, even when the diffuser and optical sheets are used, areas immediately above the cold-cathode tubes are very bright, and it is significantly difficult to resolve the lamp images. By incorporating the reflecting sheet with the reflected light relative intensity (L'2) in the vertical direction controlled to 20% to 75% and thus low into the thin backlight, it is possible to decrease brightness immediately above the cold-cathode tubes, and as a result, it is possible to remarkably dissolve the lamp images. Further, in the case of the reflecting sheet having the anisotropy in the reflected diffusion light intensity by the incident direction where the reflected light relative intensity (L'2) in the vertical direction ranges from 20% to 75% in the light from some particular direction (A'2), by incorporating the reflecting sheet into the thin backlight so that the particular incident direction (A'2) is orthogonal to the cold-cathode tubes, as in the foregoing, it is possible to decrease brightness immediately above the cold-cathode tubes, and as a result, it is possible to remarkably dissolve the lamp images.

The development mechanism of the lamp image reducing effect is not clarified, but since the reflected light relative intensity (L'2) in the vertical direction of the reflecting sheet is controlled to 20% to 75% and thus low, diffusion reflection in the orthogonal direction of the cold-cathode tube is reduced, and the light from the cold-cathode tube striking the reflecting sheet immediately below the cold cathode-tube is disturbed by the cold-cathode tube itself, and does not reach the diffuser. As a result, it is considered that the light amount reaching immediately above the cold-cathode tube decreases and contributes to reductions in the lamp images.

The reflecting sheet of the invention has the surface layer portion, thereby increases the regular reflection component, and is capable of increasing the lamp image reducing effect.

Further, it is possible to control the reflected light relative intensity (L'2) in the vertical direction of the reflecting sheet to be lower.

In the reflecting sheet of the invention where the reflected light relative intensity (L'2) in the vertical direction ranges from 20% to 75%, it is preferable that the regular reflectance is 5% or more. As described above, by setting the reflected light intensity in the vertical direction of the light incident at the incident angle of 60 degrees of the reflecting sheet at 20% to 75% relative to that of the standard white plate, when the reflecting sheet is installed in the thin backlight, brightness immediately above the cold-cathode tubes can be reduced, and further, by setting the regular reflectance of the plane of the reflecting sheet at 5% or more, it is possible to more effectively reduce brightness immediately above the cold-cathode tubes. The regular reflectance is particularly preferably 5.5% or more.

The reflecting sheet of the invention is characterized by having an incident direction where the reflected light relative intensity (L'1) in the vertical direction when the light is applied to the reflecting sheet at an incident angle of 60 degrees with respect to the vertical direction ranges from 110% to 200%. By setting the reflected light relative intensity in the vertical direction from some incident direction at 110% or more, it is possible to provide the light source with sufficient diffusion even in the backlight with the spacing between cold-cathode tubes increased, and by setting such intensity at 200% or less, it is possible to assure adequate luminance. Further, the relative intensity is more preferably in the range of 110% to 170%, and particularly preferably in the range of 120% to 160%.

Herein, the reflected light relative intensity (L'1) in the vertical direction of 110% to 200% does not need to be satisfied in the light of the incident angle of 60 degrees from all the incident directions, and is only required to be satisfied in the light of the incident angle of 60 degrees from some particular incident direction. For example, in the reflecting sheet having the anisotropy in the reflected diffusion light intensity by the incident direction, it is sufficient that the reflected light relative intensity in the vertical direction ranges from 110% to 200% in the light of the incident angle of 60 degrees from some particular incident direction, and it is not necessary that the reflected light relative intensity in the vertical direction ranges from 110% to 200% in the light of the incident angle of 60 degrees from other directions.

In the configuration that the light sources such as the cold-cathode tubes are held between the reflecting sheet and the diffuser, in the lamp-saving direct type backlight where the shortest distance (distance between the reflecting sheet upper surface and the diffuser lower surface) between the reflecting sheet and the diffuser ranges from 20 mm to 60 mm, and the spacing between the cold-cathode tubes is 25 mm or more, even when the diffuser and optical sheets are used, areas between the cold-cathode tubes are very dark, and it is significantly difficult to resolve the lamp images. By incorporating the reflecting sheet where the reflected light relative intensity (L'1) in the vertical direction ranges from 110% to 200% and is thus of high diffusion into the lamp-saving direct type backlight, it is possible to increase brightness between adjacent cold-cathode tubes, and as a result, it is possible to remarkably dissolve the lamp images. Further, in the case of the reflecting sheet having the anisotropy in the reflected diffusion light intensity by the incident direction where the reflected light relative intensity (L'1) in the vertical direction ranges from 110% to 200% in the light of the incident angle of 60 degrees from some particular incident direction (A'1), by incorporating the reflecting sheet so that the particular incident direction (A'1) is orthogonal to the cold-cathode tubes, as in the foregoing, it is possible to increase areas between adjacent cold-cathode tubes, and as a result, it is possible to remarkably dissolve the lamp images.

When the reflecting sheet where the reflected light relative intensity (L'1) in the vertical direction ranges from 110% to 200% and is thus of high diffusion is incorporated into the lamp-saving direct type backlight, it is preferable that the distance between the reflecting sheet upper surface and the diffuser lower surface is 20 mm or more. In the lamp-saving backlight where the distance between adjacent cold-cathode tubes is 25 mm or more, the lamp images tend to occur, and when the distance between the reflecting sheet upper surface and the diffuser lower surface is 20 mm or more, by the effect of lamp image reduction of the reflecting sheet of the invention, it is possible to provide liquid crystal panels with excellent uniform light sources with lamp images reduced. Further, as product design of liquid crystal TV, the distance between the reflecting sheet upper surface and the diffuser lower surface is preferably 60 mm or less, and more preferably in the range of 21 mm to 50 mm.

Further, the spacing between adjacent cold-cathode tubes is preferably in the range of 25 mm to 80 mm. When the spacing is 25 mm or more, it is possible to obtain low cost and energy-saving performance by light saving, and when the spacing is 80 mm or less, by using the reflecting sheet where the reflected light relative intensity (L'1) in the vertical direction ranges from 110% to 200% and is thus of high diffusion, it is possible to provide liquid crystal panels with excellent uniform light sources with lamp images reduced. The spacing is more preferably in the range of 28 mm to 70 mm.

In the reflecting sheet of the invention, as a ratio in the reflected light relative intensity in the vertical direction, i.e. a ratio of the reflected light relative intensity L'1 in the vertical direction to the reflected light relative intensity L'2 in the vertical direction, the ratio L'1/L'2 is preferably 1.2 or more, more preferably 1.4 or more, and particularly preferably 1.6 or more. In addition, in the reflecting sheet having the anisotropy by the incident direction in the reflected light relative intensity such that the ratio L'1/L'2 in the reflected light relative intensity is 1.2 or more, the directions A'1 and A'2 obtained from measurement of the reflected light relative intensities L'1 and L'2 are generally coincident with the A1 and A2 directions obtained from measurement of the reflected light intensities L1 and L2.

In the reflecting sheet of the invention, it is preferable that the regular reflectance is 5% or more. By setting the regular reflectance at 5% or more, it is possible to decrease brightness immediately above the cold-cathode tubes appropriately, and it is effective to reduce the lamp images. The regular reflectance is particularly preferably 5.5% or more. Measurement of the regular reflectance is generally performed by measuring the total reflectance and diffuse reflectance using a spectrophotometer (Konica Minolta Holdings, Inc., CM-2600d, etc.), and the regular reflectance is obtained by subtracting the diffuse reflectance from the total reflectance.

In the reflecting sheet of the invention, the yellowing factor is preferably 10 or less in a high pressure mercury lamp light resistance test. Herein, the high pressure mercury lamp light resistance test is obtained from the yellowing factor of the sheet before and after irradiation when the sheet is exposed to an irradiation amount of 100 mW/cm$^2$ for 500 seconds. The yellowing factor is more preferably 8 or less, and particularly preferably 6 or less.

Measurement of the reflected light relative intensities L'1 and L'2 in the invention can be performed using a Goniophotometer (Nippon Denshoku Industries Co., LTD. GC5000L).

The reflected light relative intensities L'1 and L'2 are indicators to measure the reflected light intensity of the reflecting sheet, and further relative intensities compared with the standard white plate, and therefore, each value of L'1 and L'2 alone is an indicator to confirm high diffusion and low diffusion of the reflected light. Further, L'1/L'2 is an indicator of anisotropy, and is an indicator corresponding to above-mentioned L1/L2.

The Goniophotometer (Nippon Denshoku Industries Co., LTD. GC5000L) has a configuration having a stage to mount a specimen, halogen lamp as a point light source, and light receiving portion, and enables measurement of the reflection angle distribution of the reflected light by applying the light to the specimen from a desirable incident angle, and shifting the light receiving portion at 1° intervals. In the invention, the point light source is applied to the specimen from 60-degree direction, luminance in the 0-degree direction i.e. vertical direction is obtained, and it is thus possible to measure the reflected light intensity. A value obtained by dividing the obtained reflected light intensity in the 0-degree direction by the reflected light intensity in the vertical direction obtained by measuring the standard white plate is defined as the reflected light relative intensity in the vertical direction. Further, the measurement is performed by rotating the reflecting sheet at 5° intervals, and it is defined that the direction in which the reflected light relative intensity in the vertical direction is the highest is A'1, the reflected light relative intensity in the vertical direction in this direction is L'1, the direction in which the reflected light relative intensity in the vertical direction is the lowest is A'2, and that the reflected light relative intensity in the vertical direction in this direction is L'2. Herein, whether or not the reflecting sheet has the incident direction such that a value of L'2 is in the range of 20% to 75% can be confirmed by performing measurement while varying the reflecting sheet at 5° intervals in the above-mentioned measurement, and checking whether there is the incident direction such that L'2 is in the range of 20% to 75%. Further, whether or not the reflecting sheet has the incident direction such that a value of L'1 is in the range of 110% to 200% can be confirmed by performing measurement while varying the reflecting sheet at 5° intervals in the above-mentioned measurement, and checking whether there is the incident direction such that L'1 is in the range of 110% to 200%. Further, a value of L'1/L'2 can be an indicator of the anisotropy of the reflected light intensity. In addition, the standard white plate is the standard plate attached to GC5000L Goniophotometer produced by Nippon Denshoku Industries Co., LTD.

The reflecting sheet of the invention preferably has two or more maximum values of luminance in between adjacent cold-cathode tubes when the luminance is measured with the reflecting sheet, cold-cathode tubes and diffuser without a lens arranged. In the case of using the conventional reflecting sheet, even when the diffuser without a lens is used, the lamp images originating from the cold-cathode tubes do not disappear, areas immediately above the cold-cathode tubes are bright, and areas between cold-cathode tubes are dark. As a result, lamp images of bright (immediately above)/dark (between)/bright (immediately above) are formed from the cold-cathode tube to adjacent cold-cathode tube. In contrast thereto, in the reflecting sheet of the invention, areas immediately above the cold-cathode tubes are not bright, and lamp images of dark (immediately above)/bright (between)/dark (between)/bright (between)/dark (immediately above) are formed from the cold-cathode tube to adjacent cold-cathode tube. By this effect, the same effect is obtained as that in increasing the number of installed cold-cathode tubes, and even when all the optical sheets are arranged, the great lamp image reducing effect is produced. Herein, as the cold-cathode tubes, cold-cathode tubes with the tube diameter of from 3.0 mm to 4.0 mm for use in normal backlights are used. Further, as the diffuser, the normal diffuser is used which is not provided with a lens shape on its surface.

Figure 6:
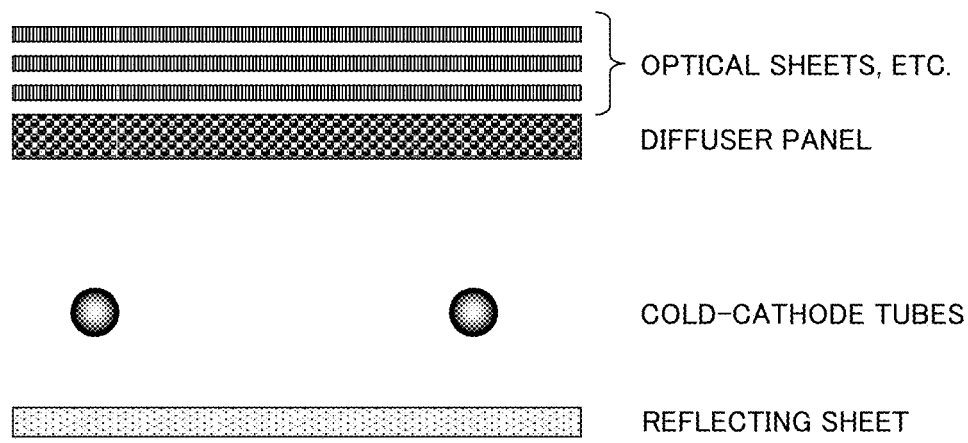
FIG. 6 is a side elevational view illustrating a general direct type backlight unit using cold-cathode tubes.
Figure 7:
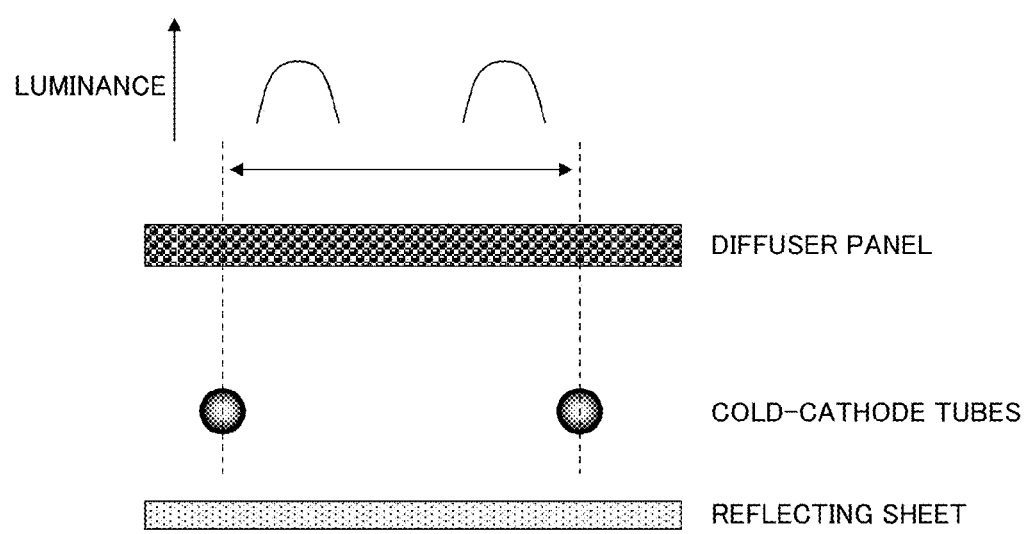
FIG. 7 is a side elevational view illustrating the backlight unit provided with the reflecting sheet according to the Embodiment of the invention.

FIG. 6 shows an arrangement diagram of the sheet in the general backlight. Further, FIG. 7 shows an arrangement diagram of the sheet in the backlight according to the invention using only the diffuser. In the backlight unit as shown in FIG. 6, cold-cathode tubes are provided above the reflecting sheet, and the diffuser and optical sheets are provided above the cold-cathode tubes. Meanwhile, as shown in FIG. 7, in the backlight unit according to the invention, cold-cathode tubes are provided above the reflecting sheet, and only the diffuser is provided above the cold-cathode tubes.

The reflecting sheet of the invention preferably has two or more maximum values of luminance in between adjacent cold-cathode tubes when the luminance is measured with the reflecting sheet, cold-cathode tubes and diffuser without a lens arranged. Further, the reflecting sheet of the invention preferably has a minimum value of luminance immediately above the cold-cathode tube. By darkening areas immediately above the cold-cathode tubes where are conventionally bright, and providing the minimum value, the significant lamp image reducing effect is produced even when all the optical sheets are arranged.

The backlight unit of the invention is the direct type backlight unit using cold-cathode tubes, where the reflecting sheet is provided below (the side opposite to the screen) the cold-cathode tubes, and the diffuser and optical sheets as required are provided above (screen side) the cold-cathode tubes, and provides the liquid crystal screen with the uniform plane-shaped light source.

In the reflecting sheet of the invention, it is preferable that the anisotropy of the total reflection index by the incident direction is 2% or more when the light with a wavelength of 550 nm is applied. Any directions can be the incident direction where the total reflection index is high when the light with a wavelength of 550 nm is applied and the direction orthogonal to such a direction, but from the viewpoint of stably expressing the anisotropy in manufacturing, it is preferable that the incident direction where the total reflection index is high when the light with a wavelength of 550 nm is applied is the extrusion transverse direction (TD) of the reflecting sheet, and that the incident direction where the total reflection index is low when the light with a wavelength of 550 nm is applied is the extrusion direction (MD).

In the reflecting sheet of the invention, any directions can be the direction B1 in which the length of the resin (B) is the minimum, and the direction B2 orthogonal to the direction B1, in the vicinity of the surface layer of the inner layer portion, and from the viewpoint of orienting the resin (B) on one direction stably in manufacturing, it is preferable that the direction B1 in which the length of the resin (B) is the minimum is the extrusion transverse direction (TD) of the reflecting sheet, and that B2 is the extrusion direction (MD).

As an example of fabricating such a reflecting sheet, it is possible to fabricate the reflecting sheet by extruding a mixture of a polypropylene resin and a resin incompatible with the polypropylene resin from a die while applying high shear and thereby orienting in the extrusion MD direction. In this case, in the vicinity of the surface layer of the inner layer portion, the resin (B) is oriented in the shape of a rod in the extrusion direction (MD) of the reflecting sheet. In the obtained reflecting sheet, the reflected light intensity in the 0-degree direction when the light is incident at an incident angle of 60 degrees has the anisotropy by the incident direction, the incident direction A1 in which the reflected light intensity in the 0-degree direction is the highest is coincident with B1 (TD direction), and the direction A2 orthogonal to A1 is coincident with B2 (MD direction). As a specific example of the fabricating method of such a reflecting sheet having incident direction anisotropy of the reflected light intensity, descried below is a fabricating method of a two-kind/three-layer reflecting sheet of surface layer portion/inner layer portion/surface layer portion by co-extrusion.

As an example of the fabricating method by co-extrusion, the surface layer portion raw material (thermoplastic resin (C)) and the inner layer portion raw material (thermoplastic resin (A) and resin (B)) are melted and blended using different extruders, and are extruded from a laminate die attached to the front ends of the extruders in sheet form. Herein, to stabilize the amount of the extruded resin composition, a gear pump may be used between the extruders and die. When the resin composition is extruded from the die, the resin (B) of the inner layer portion is oriented in the MD direction by the shear with the die. By the resin (B) being oriented, the reflected light intensity in the 0-degree direction of the light incident from the TD direction is increased, and the reflected light intensity in the 0-degree direction of the light incident from the MD direction is lowered. In other words, diffusion decreases, but the mechanism is not clear. Herein, by the presence of the surface layer portion, the resin (B) is oriented in the MD direction with excellence, and as a result, the reflected light intensity in the 0-degree of the light incident from the TD direction is increased, and the reflected light intensity in the 0-degree direction of the light incident from the MD direction is lowered.

The obtained laminate sheet is cooled and solidified by a cooling roller or the like, and stretched by a stretching machine. In the stretching step, the interface between the thermoplastic resin (A) and the resin (B) in the inner layer portion is cleaved to form voids inside the sheet, and at the same time, it is possible to thin the thickness of the sheet to a desired thickness. Herein, in the stretching step, it is possible to adopt general two-way stretching methods. In other words, it is possible to perform longitudinal-transverse successive two-way stretching, transverse-longitudinal successive two-way stretching, and concurrent two-way stretching, and subsequently to the two-way stretching, it is possible to further perform re-stretching in either or both of the longitudinal and transverse directions. Preferable is the most universal longitudinal-transverse successive two-way stretching. As the stretching, it is possible to perform a longitudinal stretching step of passing the sheet through a plurality of rollers with different speeds to stretch the sheet in the MD direction, and a transverse stretching step of stretching the sheet in the TD direction using a clip tenter or the like, alone or in combination thereof. Alternately, it is possible to concurrently stretch in the MD direction and TD direction using a concurrent two-way stretching machine such as a pantograph stretching machine. As the stretch ratio in two-way stretching, it is preferable that the ratio is 1.5 time or more in each of the MD direction and the TD direction, while the area stretch ratio ranges from 3 times to 50 times. Further, heat shrinkage treatment may be performed after stretching when necessary.

(Manufacturing Method of the Reflecting Sheet)

The intermediate sheet (c) obtained in the manufacturing method of the reflecting sheet according to the invention is comprised of at least two, the inner layer portion and the surface layer portion, or more layers, and a resin composition (a) as the inner layer portion and a resin composition (b) as the surface layer portion are co-extruded and manufactured, where the resin composition (a) contains the thermoplastic resin (A) and at least one kind of resin (B) incompatible with the thermoplastic resin (A) at the extrusion temperature of the thermoplastic resin (A), and the resin composition (b) contains the thermoplastic resin (C). Further, a ratio (hereinafter, viscosity ratio) $v2/v1$ of the viscosity $v2$ of the resin (B) to the viscosity $v1$ of the thermoplastic resin (A) at the extrusion temperature ranges from 3 to 20. In addition, in the case of two layers, it is defined that the layer of the intermediate sheet used on the light source side is the surface layer portion, and that the layer used on the side opposite to the light source side is the inner layer portion.

(Composition Constituting a Co-Extruded Sheet Inner Layer Portion)

In the manufacturing method of the reflecting sheet according to the invention, the resin composition (a) constituting the inner layer portion of the obtained intermediate sheet (c) uses the thermoplastic resin (A) and at least one kind of resin (B) incompatible with the thermoplastic resin (A) at the extrusion temperature of the thermoplastic resin (A).

The thermoplastic resin (A) constituting an inner layer portion raw material of the reflecting sheet obtained in the manufacturing method of the reflecting sheet according to the invention is not limited particularly, and includes olefin resins such as low-density polyethylene, polypropylene, polymethyl pentene and norbornene resin, polyamide resins such as 6 nylon and 66 nylon, polyester resins such as polyethylene terephthalate, polyethylene naphthalate, polytrimethylene terephthalate and polybutylene terephthalate, acrylic resins such as polymethylene methacrylate, styrene resins such as polystyrene and polystyrene-methyl methacrylate copolymers, and polycarbonate resins. Among the resins, in terms of high heat resistance and ease of obtaining high reflectance, polypropylene resins are more preferable.

The polypropylene resins mean polypropylene resins formed of polymers of propylene alone or copolymers with monomers such as ethylene copolymerizable with propylene. The polypropylene resin is preferably polypropylene resins such that the melt flow rate, which is measured with a load of 21.2 N at a temperature of 230° C. by the method of JIS K7210, ranges from 0.1 g/min. to 10 g/min. The melt flow rate is preferably 0.1 g/min. or more from the viewpoint of discoloration by load of an extruder and heat of the resin composition when the polypropylene resin is melted and formed, and is preferably 10 g/min. or less from the viewpoint of viscosity and formability of the resin.

As the resin (B) (hereinafter, also referred to as simply "resin (B)") incompatible with the thermoplastic resin (A), examples thereof include polycarbonate resins, polymethyl pentene resins, polycyclo olefin resins such as polynorbornene resins, polyester resins and polyamide resins. Among the resins, since the modulus of elasticity is higher than that of the polypropylene resin at temperatures enabling stretching of the polypropylene resin, polycarbonate resins are the most preferable.

In the manufacturing method of the reflecting sheet according to the invention, as the polycarbonate resins that are of preferable example of the resin (B) constituting the inner layer portion raw material of the obtained reflecting sheet, it is possible to use aromatic polycarbonate, straight chain polycarbonate and branched chain polycarbonate alone or in combination thereof. The polycarbonate resins are preferably polycarbonate resins such that the melt flow rate, which is measured with a load of 11.8 N at a temperature of 300° C. by the method of JIS K7210, ranges from 0.1 g/10 min. to 50 g/10 min. From the viewpoint of making a mixture with the polypropylene resin uniform, the melt flow rate of the polycarbonate resin is preferably 0.1 g/10 min. or more, and from the viewpoint of ease of forming voids in stretching, the melt flow rate is preferably 50 g/10 min. or less.

In the invention, it is preferable that the viscosity ratio v2/v1 of the viscosity v2 of the resin (B) to the viscosity v1 of the thermoplastic resin (A) at the extrusion temperature ranges from 3 to 20. From the viewpoint of orienting the resin (B) in the MD direction when co-extruding the intermediate sheet (c) and providing the sheet with diffusion anisotropy, the viscosity ratio v2/v1 is preferably 3 or more. From the viewpoint of dispersing the resin (B) in the thermoplastic resin (A) with excellence when extruding and blending in the extruder, and providing the obtained reflecting sheet with high reflectance, the viscosity ratio v2/v1 is preferably 20 or less. The ratio v2/v1 ranges particularly preferably from 6 to 15.

As the measurement of the melting viscosity v1 of the thermoplastic resin (A) and the melting viscosity v2 of the resin (B) used herein in the invention, it is possible to measure the viscosities using a viscoelasticity measurement apparatus (Rheometric Scientific FE, RMS800). As the measurement conditions, the temperature at which co-extrusion is performed in manufacturing is the measurement temperature, and the melting viscosity is obtained at an angular velocity of 10 rad/sec.

In the invention, it is preferable that the thermoplastic resin (A) is in an amount of from 30 percent to 80 percent by weight relative to the total resin composition. From the viewpoint of tension and extensibility in stretching the resin, the ratio of the thermoplastic resin (A) to the total resin composition is preferably 30 percent by weight or more, and more preferably, 40 percent by weight or more. Meanwhile, to obtain reflecting sheets with high average total reflection index of 90% or more by stretching the sheet of extruded resin composition and forming voids inside the sheet, the ratio of the thermoplastic resin (A) is preferably 80 percent by weight or less relative to the total resin composition, and more preferably 70 percent by weight or less.

The average total reflection index referred to herein is the average value in both directions when the total reflection index is measured for the light with a wavelength of 550 nm incident in each of the MD direction and the TD direction of the sheet. From the viewpoint of decreasing the stretching tension, the content of the resin (B) is preferably 70 percent by weight or less relative to the total resin composition. From the viewpoint of increasing the number of voids and void volume of the sheet to obtain a high average total reflection index of 90% or more, the resin (B) is preferably in an amount of from 20 percent by weight or more relative to the total resin composition, and more preferably in an amount of from 30 percent to 60 percent by weight. When the resin composition is formulated, the conversion between percent by weight and percent by volume can be calculated from the density of basic properties of each resin. For example, the density of the polypropylene resin ranges from 0.89 $g/cm^3$ to 0.91 $g/cm^3$, the density of the polycarbonate resin is 1.2 $g/cm^3$, and the conversion can be calculated from the values with ease when necessary.

In the reflecting sheet according to the invention, avoid forming agent, UV absorbing agent, and other inorganic powder as required may be added further to the resin composition.

(Composition Constituting a Co-Extruded Sheet Surface Layer Portion)

In the manufacturing method of the reflecting sheet according to the invention, the intermediate sheet (c) is formed of at least two, surface layer portion and inner layer portion, or more layers, where the surface layer portion contains the thermoplastic resin (C).

The thermoplastic resin (C) for use in the surface layer portion raw material may be the same resin as the thermoplastic resin (A) of the inner layer portion, or a different kind of thermoplastic resin may be used. Preferable kinds in the thermoplastic resin (C) are the same resin as in the thermoplastic resin (A).

It is preferable that the reflecting sheet obtained in the manufacturing method of the reflecting sheet according to the invention contains a UV absorbing agent in the surface layer portion. As the UV absorbing agent, inorganic powder such as titanium oxide and zinc oxide is preferable, because the fear of bleed out is low. Further, also organic UV absorbing agents are preferable, in terms of assuring transparency of the surface layer portion. As the organic UV absorbing agent, it is possible to use UV absorbing agents of benzotriazole series, benzophenone series, triazine series, benzoate series, hindered phenol series, hindered amine series and the like. Among the agents, benzotriazolic UV absorbing agents are suitably used, in terms of UV resistance and compatibility with the resin. An example of the organic UV absorbing agents is T234 produced by Ciba Specialty Chemicals K.K. The concentration of the UV absorbing agent in the surface layer portion is determined from balance between the bleed-out property and transparency, is preferably in the range of 0.1 percent to 10 percent by weight, and particularly preferably in the range of 0.15 percent to 8 percent by weight.

Further, when inorganic powder such as titanium oxide and zinc oxide is used as the UV absorbing agent, the inorganic powder may undergo surface modification as necessary. Particularly, zinc oxide and titanium oxide are generally beforehand given surface modification using alumina, silica, etc. and may be used, or a surface modifying agent such as stearic acid and zinc stearate may be added separately. As a particle size of the inorganic powder used as a UV absorbing agent, the average particle size is preferably in the range of 1 nm to 1000 nm. When the average particle size is 1 nm or more, increases in the size due to coagulation of inorganic particles are hard to occur, and when the average particle size is 1000 nm or less, it is possible to assure sufficient transparency of the surface layer portion. The particle size of the inorganic powder ranges more preferably from 5 nm to 500 nm, and particularly preferably from 5 nm to 400 nm.

In the manufacturing method of the reflecting sheet according to the invention, it is preferable to manufacture the sheet so that the content of the UV absorbing agent in the obtained reflecting sheet is in the range of 0.01 $g/m^2$ to 5/$m^2$ in the surface layer portion. When the content of the UV absorbing agent is 0.01 $g/m^2$ or more, excellent UV absorbing performance appears. When the content is 5 $g/m^2$ or less, the fear of bleed out is a few, and it is possible to assure sufficient transparency of the surface layer portion. The range is more preferably from 0.05 $g/m^2$ to 4 $g/m^2$, and particularly preferably from 0.1 $g/m^2$ to 4 $g/m^2$.

Herein, the content of the UV absorbing agent in the reflecting sheet obtained in the manufacturing method of the invention can be obtained by the inverse operation from the surface layer thickness of the intermediate sheet (c), longitudinal stretch ratio, transverse stretch ratio, and surface layer thickness of the reflecting sheet. For example, when the content of the UV absorbing agent in the reflecting sheet is 1 $g/m^2$, since the surface layer thickness is about 20 μm in the reflecting sheet obtained by performing co-extrusion so that the surface layer thickness of the intermediate sheet (c) is about 180 μm with the longitudinal stretch ratio of 3 times and the transverse stretch ratio of 3 times, the concentration of the UV absorbing agent used in the surface layer raw material is 5 percent by weight. To obtain the content of the UV absorbing agent in the obtained reflecting sheet ranging from 0.05 g/m² to 4 g/m² in the surface layer portion, the concentration ranges from 0.25 percent to 20 percent by weight. To obtain the content ranging from 0.1 g/m² to 4 g/m², the concentration ranges from 0.05 percent to 20 percent by weight.

In the manufacturing method of the reflecting sheet according to the invention, in the obtained reflecting sheet, the surface layer portion is capable of containing inorganic powder when necessary, as well as the inorganic powder having the UV absorbing action. As the inorganic powder, preferable are substances such that light scattering property is low and that the reflectance of the surface layer portion can be controlled to within 50% or less and thus to be low. For example, barium sulfate and calcium carbonate are preferable. These inorganic powders may be used alone, or two or more powders may be combined and used. At this point, when the inorganic powder is added, from the viewpoint of assuring transparency of the surface layer portion, it is preferable to add to the surface layer portion raw material in an amount of from 0.05 percent to 25 percent by weight.

(Manufacturing Method of the Intermediate Sheet (c))

In the manufacturing method of the invention, it is a feature that the above-mentioned materials of the surface layer portion and inner layer portion are co-extruded. As an example of the manufacturing method by co-extrusion, the surface layer portion raw material (thermoplastic resin (C)) and the inner layer portion raw material (thermoplastic resin (A) and resin (B)) are melted and blended using different extruders, and are extruded from a laminate die attached to the front ends of the extruders in sheet form. Herein, to stabilize the amount of the extruded resin composition, a gear pump may be used between the extruders and die. For extrusion of the inner layer portion, a twin screw extruder is preferable in terms of kneading property and dispersing property of the resin. In the invention, it is preferable to use a co-extrusion method using a main extruder for the inner layer portion, and a sub-extruder for the surface layer portion. Used as an extrusion die are laminate dies such as a T die and finish tail die for sheet forming. Herein, as the laminate die, it is possible to use common laminate dies such as a multi-manifold die. The inner layer portion and surface layer portion are laminated inside the die and extruded. The sub-extruder may be either a single screw extruder or a two screw extruder, and is selected in consideration of the composition of the surface layer portion, extrusion suitability and the like. Herein, by adjusting the temperature of the cylinder properly, it is possible to provide the inner layer portion with the sea-island structure that the resin (B) is dispersed in the shape of an island in the sea of the thermoplastic resin (A).

In the invention, the clearance of the die lip in performing co-extrusion preferably ranges from 170 μm to 5000 μm. When the clearance of the die lip is 170 μm or more, it is possible to provide the co-extruded sheet with excellent flatness. When the clearance of the die lip is 5000 μm or less, it is possible to perform co-extrusion excellent in stability.

In the invention, the extrusion temperature (hereinafter, extrusion temperature) from the die in performing co-extrusion is preferably in the range of 150° C. to 290° C. When the extrusion temperature is 150° C. or more, it is possible to fabricate the sheet with excellent surface state, and to stably extrude. When the extrusion temperature is 290° C. or less, the thermoplastic resin (A) and resin (B) hold the incompatibility, and it is possible to manufacture the sheet having the sea-island structure. The temperature more preferably ranges from 170° C. to 250° C. Among the temperatures, the extrusion temperature is adjusted so that the viscosity ratio $v2/v1$ of the viscosity $v1$ of the resin (B) to the viscosity $v2$ of the thermoplastic resin (A) is in the range of 3 to 20 at the extrusion temperature as described previously.

In the invention, in co-extruding, the extrusion speed $s1$ preferably ranges from 0.3 m/min. to 20 m/min. When the extrusion speed $s1$ is 0.3 m/min. or more, the productivity is excellent. When the extrusion speed is 20 m/min. or less, it is possible to obtain sufficient melting blending time, and to finely disperse the resin (B) in the thermoplastic resin (A).

Figure 8:
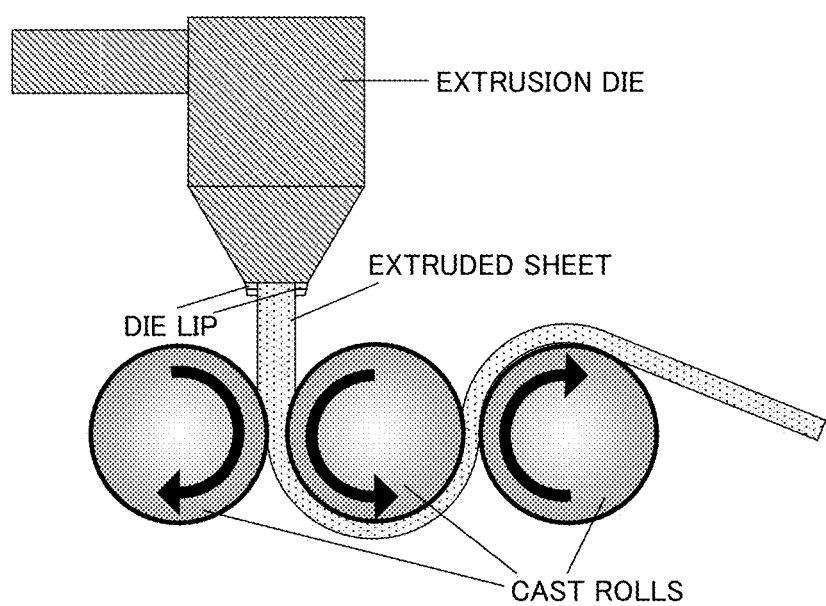
FIG. 8 is a view to explain an extrusion part of a method of manufacturing the reflecting sheet according to the Embodiment of the invention.

After co-extrusion, in cooling and solidifying with cast rolls, the receiving speed $s2$ can be varied, and the draw ratio $s2/s1$ is preferably in the range of 1 to 5. When the draw ratio $s2/s1$ is 1 or more, it is possible to fabricate the intermediate sheet with stability without the resin remaining in the cast rolls. When the draw ratio $s2/s1$ is 5 or less, the resin (B) in the inner layer portion is not oriented in the MD direction in the center in the thickness direction, and can be oriented in the MD direction selectively only in the vicinity of the surface layer. By this means, the sheet becomes hard to break in stretching, and stable stretching is made possible, while the reflective performance of the obtained reflecting sheet is also improved. The draw ratio more preferably ranges from 1 to 3. Herein, FIG. 8 shows an arrangement diagram of the die of the extruder and cast rolls viewed from the side. As shown in FIG. 8, the arrangement is made so that the receiving portion of the cast roll is located immediately below the die lip.

(Configuration of the Intermediate Sheet (c))

In the manufacturing method of the reflecting sheet according to the invention, the thickness of the surface layer portion of the intermediate sheet (c) is preferably in the range of 10 μm to 400 μm. Herein, the thickness of the surface layer portion is the thickness of one side in the case of three layers of surface layer portion/inner layer portion/surface layer portion. When the thickness of the surface layer portion is 10 μm or more, it is possible to perform co-extrusion with stability irrespective of the thickness of the inner layer portion. When the thickness of the surface layer portion is 400 μm or less, it is possible to obtain the reflecting sheet with lightweight. The thickness is more preferably in the range of 10 μm to 300 μm, and particularly preferably in the range of 20 μm to 300 μm. Further, in the case of three layers, the thicknesses of the surface layer portions may be the same as or different from each other as required.

In the manufacturing method of the reflecting sheet according to the invention, the thickness of the inner layer portion of the intermediate sheet (c) is preferably in the range of 150 μm to 4000 μm. When the thickness of the inner layer portion is 150 μm or more, it is possible to fabricate the reflecting sheet with higher reflective performance by subsequent two-way stretching. When the thickness of the inner layer portion is 4000 μm or less, it is possible to assure uniform temperature control and extensibility of the sheet in subsequent two-way stretching. The thickness is more preferably in the range of 150 μm to 3000 μm, and particularly preferably in the range of 160 μm to 3000 μm.

In the vicinity of the surface layer portion in the inner layer portion of the intermediate sheet (c), the resin (B) is oriented in the extrusion direction, the ratio kMD1/kTD1 of the length kMD1 in the extrusion direction of the resin (B) to the length kTD1 of the resin (B) in the extrusion transverse direction is preferably 3 or more, it is possible to provide the reflecting sheet with diffusion anisotropy when the ratio is 3 or more, and as a result, the lamp images are reduced. The ratio is more preferably 5 or more, and particularly preferably 10 or more.

Herein, in the manufacturing method of the reflecting sheet of the invention, it is possible to observe the shape of the resin (B) contained in the inner layer portion of the intermediate sheet (c) using a scanning electron microscope (SEM) (Hitachi, Ltd. S-4700). The intermediate sheet (c) is cut in cross section in each of the MD direction and TD direction using a cryomicrotome, and cross-sectional photographs are collected. In the cross-sectional photograph, as the length in the extrusion direction of the resin (B) in the vicinity of the surface layer portion in the inner layer portion, it is defined that kMD1 is an average value of all lengths in the extrusion direction of the resin (B) measured in the range with 50 μm in the thickness direction from the interface between the surface layer portion and the inner layer portion and with 200 μm in the MD direction in the MD-direction cross section. As the length in the extrusion transverse direction (TD) of the resin (B), it is defined that kTD1 is an average value of all lengths in the extrusion transverse direction of the resin (B) measured in the range with 50 μm in the thickness direction from the interface between the surface layer portion and the inner layer portion and with 200 μm in the TD direction in the TD-direction cross section.

In the center portion in the thickness direction of the inner layer portion of the intermediate sheet (c), the ratio kMD2/kTD2 is preferably in the range of 0.1 to 3, where kMD2 is the length in the extrusion direction of the resin (B), and kTD2 is the length in the extrusion transverse direction of the resin (B). When kMD2/kTD2 ranges from 0.1 to 3, it is possible to provide the sheet with ease of stretching, and the sheet is stretched and causes cleavage with excellence, and further is capable of having high reflective performance.

Herein, as the length in the extrusion direction of the resin (B) in the center portion in the thickness direction of the inner layer portion, it is defined that kMD2 is an average value of all lengths in the extrusion direction of the resin (B) measured in the range with ±20 μm vertically from the center in the thickness direction and with 200 μm in the MD direction in the MD-direction cross section. As the length in the extrusion transverse direction of the resin (B), it is defined that kTD2 is an average value of all lengths in the extrusion transverse direction of the resin (B) measured in the range with ±20 μm vertically from the center in the thickness direction and with 200 μm in the TD direction in the TD-direction cross section.

(Stretching of the Intermediate Sheet (c))

In the manufacturing method of the reflecting sheet according to the invention, in the stretching step, the interface between the thermoplastic resin (A) and the resin (B) is cleaved to form voids inside the sheet, and at the same time, it is possible to thin the thickness of the sheet to a desired thickness. Herein, in the stretching step, it is possible to adopt general two-way stretching methods. In other words, it is possible to perform longitudinal-transverse successive two-way stretching, transverse-longitudinal successive two-way stretching, and concurrent two-way stretching, and subsequently to the two-way stretching, it is possible to further perform re-stretching in either or both of the longitudinal and transverse directions. Preferable is the most universal longitudinal-transverse successive two-way stretching. As the stretching, it is possible to perform a longitudinal stretching step of passing the sheet through a plurality of rollers with different speeds to stretch the sheet in the MD direction, and a transverse stretching step of stretching the sheet in the TD direction using a clip tenter or the like, alone or in combination thereof. Alternately, it is possible to concurrently stretch in the MD direction and TD direction using a concurrent two-way stretching machine such as a pantograph stretching machine. As the stretch ratio in two-way stretching, it is preferable that the ratio is 1.5 time or more in each of the MD direction and the TD direction, while the area stretch ratio ranges from 3 times to 50 times. Further, heat shrinkage treatment may be performed after stretching when necessary.

(Structure of the Reflecting Sheet)

In the manufacturing method of the reflecting sheet according to the invention, the obtained reflecting sheet is preferably formed of at least the surface layer portion and inner layer portion, and thus two or more layers, and for example, may have a three-layer structure of surface layer portion/inner layer portion/surface layer portion, or may further have another layer such as a light resistant layer on the surface of the surface layer portion. In addition, when the sheet is comprised of two layers i.e. the surface layer portion and inner layer portion, a layer used on the light source side of the reflecting sheet is defined as the surface layer portion, and a layer used on the opposite side to the light source is defined as the inner layer portion. Further, when the sheet is comprised of three or more layers, the sheet is only required to have the surface layer portion and inner layer portion among three or more layers, and for example, when the light resistant layer is provided on the topmost layer, the structure may be topmost layer portion (light resistant layer)/surface layer portion/inner layer portion.

In the manufacturing method of the reflecting sheet according to the invention, the inner layer portion of the obtained reflecting sheet has the structure containing voids inside thereof, and exhibits reflective performance by the void structure. The thickness of the inner layer portion preferably ranges from 60 μm to 900 μm. When the thickness of the inner layer portion is 60 μm or more, it is possible to develop excellent reflective performance. When thickness of the inner layer portion is 900 μm or less, it is possible to assure satisfactory lightweight. Further, the thickness ranges more preferably from 70 μm to 700 μm, and particularly preferably from 70 μm to 600 μm.

In the manufacturing method of the reflecting sheet according to the invention, the thickness of the surface layer portion of the obtained reflecting sheet preferably ranges from 2 μm to 90 μm. When the thickness of the surface layer portion is 2 μm or more, it is possible to obtain excellent ease of forming. When the thickness of the surface layer portion is 90 μm or less, it is possible to assure satisfactory lightweight. Further, the thickness ranges more preferably from 2 μm to 70 μm, and particularly preferably from 3 μm to 50 μm.

In the manufacturing method of the reflecting sheet according to the invention, the weighing of the obtained entire reflecting sheet preferably ranges from 10 $g/m^2$ to 500 $g/m^2$. When the weighing of the entire reflecting sheet is 10 $g/m^2$ or more, it is possible to develop excellent reflective performance. When the weighing of the entire reflecting sheet is 500 $g/m^2$ or less, it is possible to assure satisfactory lightweight. Further, the weighing ranges more preferably from 20 $g/m^2$ to 400 $g/m^2$, and particularly preferably from 40 $g/m^2$ to 300 $g/m^2$.

In the manufacturing method of the reflecting sheet according to the invention, in the obtained reflecting sheet, the entire density including the surface layer portion and inner layer portion ranges preferably from 0.1 $g/cm^3$ to 0.75 $g/cm^3$. When the density of the entire reflecting sheet is 0.1 $g/cm^3$ or more, it is possible to hold the sufficient strength as the reflecting sheet. Further, when the density is 0.75 $g/cm^3$ or less, it is possible to form the structure with many fine voids and obtain high reflectance, while assuring excellent lightweight. The density ranges more preferably from 0.2 $g/cm^3$ to 0.5 $g/cm^3$, and particularly preferably from 0.2 $g/cm^3$ to 0.45 $g/cm^3$.

(Performance of the Obtained Reflecting Sheet)

In the reflecting sheet obtained in the manufacturing method of the reflecting sheet according to the invention, the average total reflection index is preferably 90% or more when the light with a wavelength of 550 nm is applied. This is because the average total reflection index of 90% or more enables sufficient luminance to be obtained when the reflecting sheet is installed in the liquid crystal backlight. The average total reflection index is more preferably 95% or more.

In the reflecting sheet obtained in the manufacturing method of the reflecting sheet according to the invention, the regular reflectance is preferably 5% or more. By making the regular reflectance of the surface 5% or more, it is possible to more effectively reduce brightness immediately above the cold-cathode tubes. The regular reflectance is particularly preferably 5.5% or more.

In the reflecting sheet obtained in the manufacturing method of the reflecting sheet according to the invention, the total reflection index of the surface layer portion is preferably 50% or less. By making the total reflection index of the surface layer portion 50% or less, without canceling anisotropy of the inner layer portion, the performance of the reflecting sheet is exerted. The total reflection index of the surface layer portion is more preferably 45% or less.

In the reflecting sheet obtained in the manufacturing method of the reflecting sheet according to the invention, it is preferable that the resin (B) of the inner layer portion is oriented in the MD direction selectively in the vicinity of the surface layer. By this means, the reflecting sheet obtained in the manufacturing method of the reflecting sheet according to the invention has diffusion anisotropy such that the reflected light intensity in the 0-degree direction (vertical direction) varies with the incident direction when the light is incident at an incident angle of 60 degrees from the vertical direction (hereinafter, referred to as simply "0-degree direction) with respect to the reflecting sheet surface.

In the reflecting sheet obtained in the manufacturing method of the reflecting sheet according to the invention, it is preferable that the reflected light relative intensity L'1 in the vertical direction from the TD direction ranges from 110% to 200%. When the reflected light relative intensity L'1 from the TD direction is 110% or more, it is possible to provide sufficient diffusion of the light source even in the backlight with the spacing between cold-cathode tubes increased, and when the reflected light relative intensity L'1 is 200% or less, it is possible to assure adequate luminance. Further, the reflected light relative intensity L'1 is more preferably in the range of 110% to 170%, and particularly preferably in the range of 120% to 160%.

In the reflecting sheet obtained in the manufacturing method of the reflecting sheet according to the invention, it is preferable that the reflected light relative intensity L'2 in the vertical direction ranges from 20% to 75%. When the reflected light relative intensity L'2 from the MD direction is 20% or more, it is possible to provide sufficient diffusion of the light source in the backlight, and when the reflected light relative intensity L'2 is 75% or less, it is possible to darken areas immediately above the cold-cathode tubes to sufficiently reduce the lamp images. Further, the reflected light relative intensity L'2 is more preferably in the range of 30% to 75%, and particularly preferably in the range of 40% to 72%.

In the ratio of the reflected light relative intensities in the vertical direction of the reflecting sheet of the invention, the ratio L'1/L'2 of the reflected light relative intensity L'1 in the vertical direction to the reflected light relative intensity L'2 in the vertical direction is preferably 1.2 or more. By suitably using the reflecting sheet having such anisotropy in the reflected light intensity, it is possible to reduce the lamp images of the thin direct type backlight. L'1/L'2 is more preferably 1.4 or more, and particularly preferably 1.6 or more.

Described next are Examples that were carried out to clarify the effects of the invention.

<Evaluation Method>

Described first are items of physical properties to evaluate for the reflecting sheet and their evaluation methods.

(1) Thickness

Thicknesses of reflecting sheets were measured using a thickness gauge (made by PEACOCK). Further, the thickness of each layer of the intermediate sheet and the reflecting sheet was measured by cross-section observation using a digital microscope (made by Keyence Corporation).

(2) Total Reflection Index/Average Total Reflection Index

The total reflection indexes of reflecting sheets were measured with an incident angle of 8 degrees using the spectrophotometer (Shimadzu Corporation, UV-3150) and an integrating sphere sample mount (Shimadzu Corporation, MPC2200). The relative reflectance was measured in the range of wavelengths from 400 nm to 700 nm with the reflectance of a standard white plate (Labsphere, Inc. Spectralon) of polytetrafluoroethylene being 100%. The total reflection index was a measurement value when the light with a wavelength of 550 nm was applied in each of the MD direction and TD direction of the sheet. The average total reflection index is the average value of both indexes. Further, the sample was rotated by 15 degrees, and a value of reflection anisotropy is a difference between the total reflection index in the direction in which the total reflection index is the highest, and the total reflection index in the direction in which the total reflection index is the lowest. In addition, since the MD direction is unknown in reflecting sheets extracted from commercially available TVs, the average total reflection index was calculated from the average of the total reflection index in which the total reflection index is the highest, and the total reflection index in the direction in which the total reflection index is the lowest.

(3) Weighing

The weighing was obtained by cutting the sheet into 50 mm squares, and measuring the weight.

(4) Density

The sheet was cut into 50 mm squares, the weight and the average of total five thicknesses in the center and center portion in each side were obtained, and the density was calculated.

(5) The length of the resin (B) inside the inner layer portion of the reflecting sheet was observed in cross-sectional photographs enlarged to 1000 times to 10000 times using the scanning electron microscope (SEM) (Hitachi, Ltd. S-4700). The microsection was obtained by cutting the reflecting sheet using a cryomicrotome while varying the direction at 15° intervals with respect to the extrusion direction (MD) of the reflecting sheet, and coating each cut surface with Os. In the photograph of cross section cut in each direction, lengths of the resin (B) that could be observed in the range of 100 μm (cut direction)×20 μm (thickness in the vicinity of the surface layer in the inner layer portion) were measured, and the average value was made the length of the resin (B) in the vicinity of the surface layer portion in the inner layer portion. From the photograph of cross section cut in each direction, the length of the resin (B) in each direction was obtained, and it was defined that the direction in which the length of the resin (B) in the vicinity of the surface layer portion in the inner layer portion is the maximum is the B2 direction, the length of the resin (B) in B2 is Ds2, the direction orthogonal to the B2 direction is the B1 direction, and that the length of the resin (B) in B1 is Ds1. Further, from photographs of cross section cut in the B2 direction and B1 direction, the lengths of the resin (B) that could be observed in the range of 20 μm (cut direction)×20 μm (thickness in the center portion in the inner layer portion) were measured, the average value was made the length of the resin (B) in the center portion, and it was defined that the length in the B2 direction is Dc2, and that the length in the B1 direction is Dc1.

(6) Scanning Electron Microscope Observation of the Intermediate Sheet (c) (Length of the Resin (B) in the Inner Layer Portion of the Intermediate Sheet (c))

In the sheet, the cross section in each of the MD direction and TD direction was cut by the cryomicrotome, and was loaded on the sample mount. Etching with the Flatmilling apparatus was performed, the observation surfaces were coated with Os in about 2 nm, and samples for microscope observation were thus prepared. The cross section of the intermediate sheet was enlarged and observed using the scanning electron microscope (SEM) (Hitachi, Ltd. S-4700), and cross-sectional photographs were collected. In the photographs, as the length in the extrusion direction of the resin (B) in the vicinity of the surface layer portion in the inner layer portion, kMD1 was calculated from an average value of all lengths in the extrusion direction of the resin (B) measured in the range with 50 μm in the thickness direction from the interface between the surface layer portion and the inner layer portion and with 200 μm in the MD direction in the MD-direction cross section. As the length in the extrusion transverse direction of the resin (B), kTD1 was calculated from an average value of all lengths in the extrusion transverse direction of the resin (B) measured in the range with 50 μm in the thickness direction from the interface between the surface layer portion and the inner layer portion and with 200 μm in the TD direction in the TD-direction cross section. Further, as the length in the extrusion direction of the resin (B) in the center portion in the thickness direction of the inner layer portion, kMD2 was calculated from an average value of all lengths in the extrusion transverse direction of the resin (B) measured in the range with ±20 μm vertically from the center in the thickness direction and with 200 μm in the MD direction in the MD-direction cross section. As the length in the extrusion transverse direction of the resin (B), kTD2 was calculated from an average value of all lengths in the extrusion transverse direction of the resin (B) measured in the range with ±20 μm vertically from the center in the thickness direction and with 200 μm in the TD direction in the TD-direction cross section.

(7) Light Resistance Test

The sheet was cut into 50 mm squares, and exposed to an irradiation amount of 100 mW/cm² for 500 seconds using the high pressure mercury lamp (SEIMYUNGVACTRON SMTD51H-1), and light resistance was examined using the yellowing factor of the sheet before and after irradiation.

(8) Yellowing Factor

Colorimetry was performed using the spectral colorimeter (Konica Minolta Holdings, Inc. CM-2600d), and yellowness was calculated according to JIS Z8722 and JIS K7105. The yellowing factor was calculated from the difference in yellowness between before and after the light resistance test.

(9) Measurement of Reflected Light Intensities (L1, L2) in the 0-Degree Direction with Incidence of 60 Degrees The reflection measurement point light source (ELDIM, attached Xenon lamp D65) was attached to the varied-angle luminance meter (ELDIM, EZ Contrast XL88), and the incident angle of the point light source was adjusted to 60 degrees using the attached mirror. The reflecting sheet was mounted on the X-Y stage, and the reflected light intensities (luminance) in all the directions (from 0 degree to 88 degrees) were measured. Values in the range of ±1 degree of the obtained results were averaged, and set as the reflected light intensity in the 0-degree direction. The measurement was repeated while rotating the sample at 15° intervals, and it was defined that the direction in which the reflected light intensity in the 0-degree direction is the highest is the A1 direction, the reflected light intensity in this direction is L1, the direction orthogonal to the A1 direction is the A2 direction, and the reflected light intensity in the 0-degree direction in this direction is L2.

(10) Measurement of Reflected Light Intensities (L'1, L'2) in the 0-Degree Direction with Incidence of 60 Degrees Using the Goniophotometer (Nippon Denshoku Industries Co., LTD. GC5000L), the incident angle of the point light source was set at 60 degrees, the reflecting sheet was mounted on the state, and the reflected light intensity was measured at 1° intervals in the light receiving portion from −85 degrees to +85 degrees. Values in the range of ±1 degree of the obtained results were averaged, and set as the reflected light intensity in the 0-degree direction. Further, using the standard plate attached to the Goniophotometer (Nippon Denshoku Industries Co., LTD. GC5000L) as a white standard plate, the same measurement was performed. A value obtained by dividing the obtained reflected light intensity in the 0-degree direction obtained by measuring the reflecting sheet by the reflected light intensity in the 0-degree direction obtained by measuring the standard white plate was set as the reflected light relative intensity in the 0-degree direction. Further, the measurement was performed by rotating the reflecting sheet at 5° intervals, and it was defined that the direction in which the reflected light relative intensity in the 0-degree direction is the highest is A'1, the reflected light relative intensity in the 0-degree direction in this direction is L'1, the direction in which the reflected light relative intensity in the 0-degree direction is the lowest is A'2, and that the reflected light relative intensity in the 0-degree direction in this direction is L'2. In addition, the reflected light intensity in the 0-degree of the standard white plate was 89.9 cd/m².

(11) Measurement of Regular Reflectance

The total reflectance and diffuse reflectance was measured using the spectrophotometer (Konica Minolta Holdings, Inc., CM-2600d), and the regular reflectance was obtained by subtracting the diffuse reflectance from the total reflectance.

(12) Luminance, Lamp Image Evaluations

Figure 9:
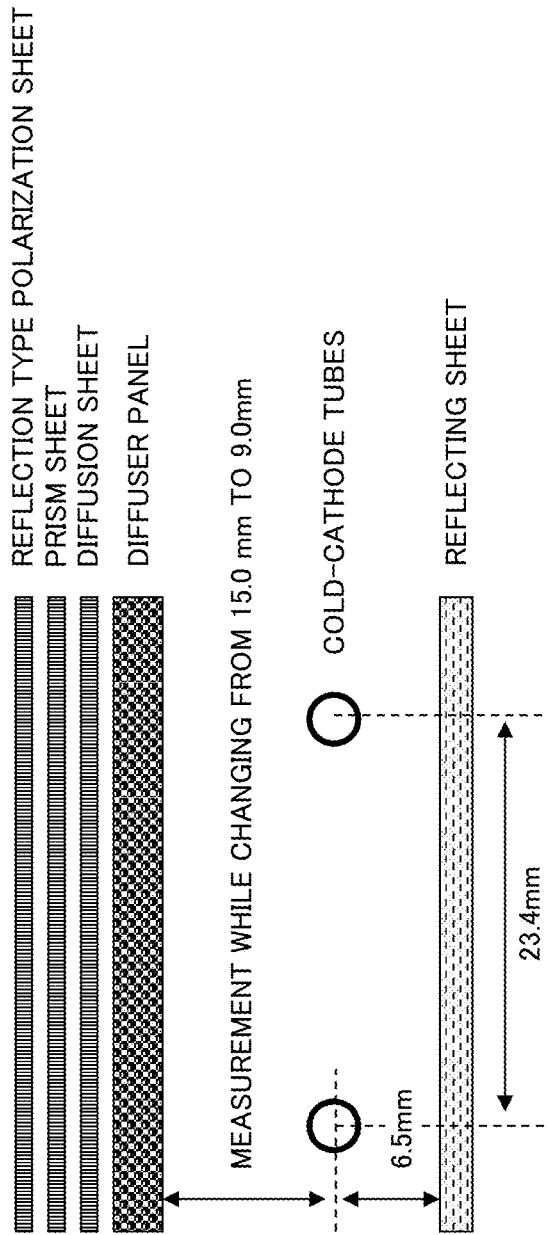
FIG. 9 is a view to explain backlight dimensions used in evaluations of luminance and lamp images.

As a backlight unit for a luminance evaluation, the existing reflecting sheet was removed from the backlight unit of the liquid crystal TV (Sony Corporation, BRAVIA (Trademark) 32-inch S-2500) (cold-cathode tube light source) and attached as a substitute for the reflecting sheet described in the Examples, etc. and the evaluation was performed. In addition, in the backlight unit, as the initial dimensions, the spacing between cold-cathode tubes was 23.4 mm (between the center of the tube and the center of the tube), the distance between the reflecting sheet and the cold-cathode tube was 6.5 mm (from the center of the tube), and the distance between the diffuser lower surface and the cold-cathode tube was 15.0 mm (from the center of the tube). Among the distances, only the distance between the diffuser lower surface and the cold-cathode tube (hereinafter, DP-cold-cathode tube distance) was varied, and the presence or absence of lamp images in the distance was examined. FIG. 9 shows dimensions and configuration of the backlight. In addition, in FIG. 9, used as an optical sheet was a laminate of the diffusion sheet, prism sheet and reflection type polarization sheet in this order from the diffuser side.

As luminance and lamp images, a 2D color luminance meter (Konica Minolta Sensing, Inc. CA2000) was used, and set apart 75 cm from the light control unit, and the average luminance value measured in the range of 22 mm×178 mm [34 dots (x)×275 dots (y)] in the center portion of the light control unit was calculated as luminance. Herein, the x direction is the direction parallel with the cold-cathode tubes, and the y direction is the direction orthogonal to the cold-cathode tubes. For fluctuations in luminance, the average luminance value in the x (22 mm) direction was obtained, and with respect to the y direction, a value obtained by dividing the luminance value of each point by the luminance average of ±17 dots from each point was calculated as a standard deviation, and lamp images were obtained. In other words, as this value is smaller, the lamp images are reduced. Further, a graph (hereinafter, luminance distribution graph), where the luminance value of each point is plotted on the y axis, and 200 dots near the center in the y-direction position above the backlight are plotted on the x axis, is described in accordance with the Examples as appropriate. Furthermore, a graph (hereinafter, lamp image graph), where a value obtained by dividing the luminance value of each point by the luminance average value of ±17 dots from each point is plotted on the y axis, and positions of from 150 dots to 350 dots in the y direction above the backlight are plotted on the x axis, was described in accordance with the Examples as appropriate. In addition, with respect to the diffuser and optical sheet of the backlight unit, the diffuser (hereinafter, abbreviated as DP), diffusion sheet (hereinafter, abbreviated as DS), optical sheet (hereinafter, abbreviated as a prism sheet) having an array-shaped prism arrangement structure and reflection type polarization sheet used in the liquid crystal TV (BRAVIA (Trademark) 32-inch S-2500) were used.

(13) Lamp Image Evaluation in Reflecting Sheet/Cold-Cathode Tubes/Diffuser

Using the same backlight as in (12), the optical sheet was not arranged except the diffuser, the DP-cold-cathode tube distance was set at 11 mm, and lamp images were evaluated. From the luminance distribution graph of luminance data obtained by arranging only the reflecting sheet/cold-cathode tubes/diffuser under the aforementioned conditions, the presence or absence of the maximum value and minimum value was examined.

(14) Evaluation of Front Luminance Between Cold-Cathode Tubes

Figure 10:
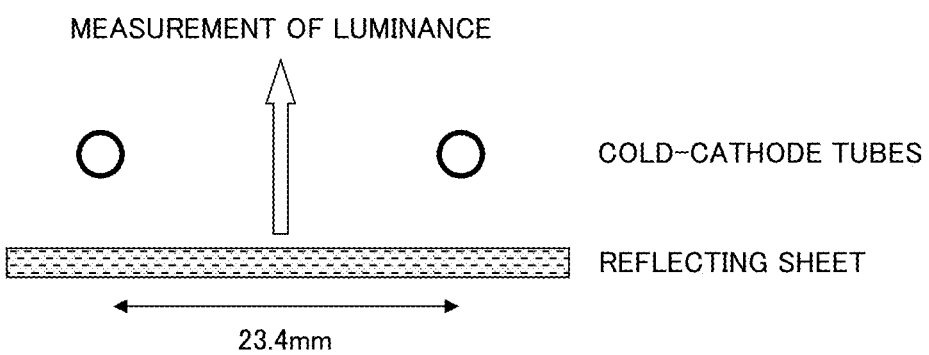
FIG. 10 is a view to explain a method of measuring luminance between cold-cathode tubes.

As a backlight unit, the existing reflecting sheet was removed from the backlight unit of the liquid crystal TV (Sony Corporation, BRAVIA (Trademark) 32-inch S-2500) (cold-cathode tube light source), and attached as a substitute for the reflecting sheet described in the Examples, etc. and luminance of an area located at the midpoint between the cold-cathode tubes was directly measured using the 2D color luminance meter (Konica Minolta Sensing, Inc. CA2000) without installing the diffuser and optical sheet. The configuration in measurement was shown in FIG. 10.

(15) Lamp Image Evaluation in the Lamp-Saving Backlight

Figure 11:
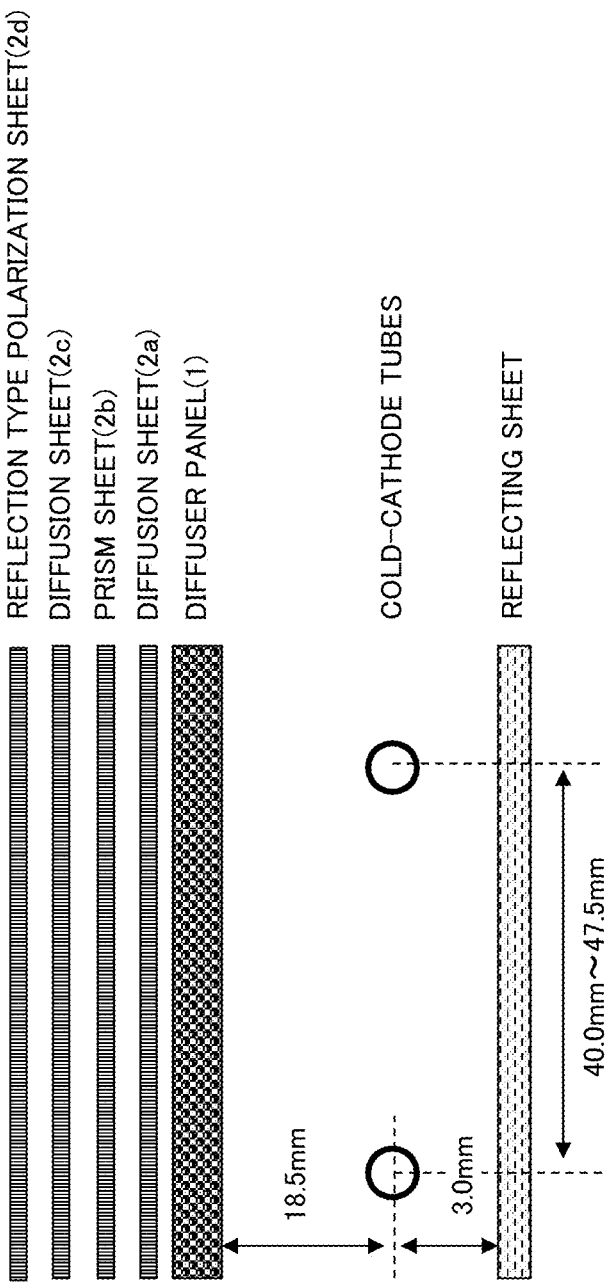
FIG. 11 is a view to explain evaluations of lamp images under lamp-saving conditions.

As a backlight, the cold-cathode tubes (the tube diameter is 3 mm) and control board used in the backlight unit of the liquid crystal TV (Sony Corporation, BRAVIA (Trademark) 32-inch S-2500) (cold-cathode tube light source) were removed, the distance between the reflecting sheet and the cold-cathode tube was fixed to 3.0 mm (from the center of the tube), the distance between the diffuser lower surface and the cold-cathode tube was fixed to 18.5 mm (from the center of the tube), only the spacing between cold-cathode tubes was made variable from 40 mm to 47.5 mm (between the center of the tube and the center of the tube), and the backlight for evaluation was thus prepared. Only the spacing between cold-cathode tubes was varied, and the presence or absence of lamp images in the spacing was examined. FIG. 11 shows dimensions and configuration of the backlight. Herein, as the diffuser and optical sheet of the backlight unit, used was a laminate of the diffusion sheet (hereinafter, abbreviated as DS, "2a" in the figure), optical sheet (hereinafter, abbreviated as a prism sheet, "2b" in the figure) having an array-shaped prism arrangement structure, DS ("2c" in the figure) and reflection type polarization sheet ("2d" in the figure) in this order from the diffuser (hereinafter, abbreviated as DP, "1" in the figure) used in the liquid crystal TV (Hitachi, Ltd. Wooo (Trademark) 32-inch UT).

As luminance and lamp images, the 2D color luminance meter (Konica Minolta Sensing, Inc. CA2000) was used, and set apart 75 cm from the light control unit, and the average luminance value measured in the range of 22 mm×178 mm [34 dots (x)×275 dots (y)] in the center portion of the light control unit was calculated as luminance. Herein, the x direction is the direction parallel with the cold-cathode tubes, and the y direction is the direction orthogonal to the cold-cathode tubes. As a quantitative evaluation method of fluctuations in luminance, the average luminance value in the x (22 mm) direction was obtained, and with respect to the y direction, assuming that the number of dots corresponding to the spacing (mm) between cold-cathode tubes is d, a value obtained by dividing the luminance value of each point by the luminance average value within the range of ±d/2 from each point i.e. the luminance average value in the distance between cold-cathode tubes, was calculated as a standard deviation, and lamp images were obtained. In other words, as this value is smaller, the lamp images are reduced. Further, a graph (hereinafter, lamp image graph), where a value obtained by dividing the luminance value of each point by the luminance average value corresponding to ±d/2 dots from each point is plotted on the y axis, and positions of from 150 dots to 350 dots in the y direction above the backlight are plotted on the x axis, was described in accordance with the Examples as appropriate.

(16) Longitudinal Extensibility Test

The intermediate sheet (c) was sampled by 10 mm and set as a longitudinal-stretching prior sheet. The longitudinal-stretching prior sheet was subjected to longitudinal stretching (stretching in the MD direction) at a stretch ratio of three times (n=10) at 155° C., and the extensibility was examined according to the presence or absence of rupture.

(17) Measurement of Melting Viscosity

The raw material resin was dried under vacuum at 80° C. for 15 hours, and used for measurement using the viscoelasticity measurement apparatus (Rheometric Scientific F E, RMS800). As the measurement conditions, the temperature at which co-extrusion is performed in manufacturing was the measurement temperature, and the melting viscosity of each resin was obtained at an angular velocity of 10 rad/sec.

Structure and Anisotropic Diffusion Performance of the Reflecting Sheet

Example 1

Used as an inner layer portion raw material was a raw-material resin of a mixture of 62 percent by volume (55 percent by weight) of a polypropylene resin (Prime Polymer Co., Ltd. E-105GM) and 38 percent by volume (45 percent by weight) of a polycarbonate resin (CHIMEI-ASAHI Corporation, WONDERLITE PC110). This raw-material resin was melted using the same-direction rotary two-way extruder with the cylinder diameter of 25 mm and the ratio between the cylinder and the diameter of 48 under operating conditions that the cylinder temperature was 250° C. and that the number of revolutions of the screw was 100 rpm, and supplied to a multi-manifold die via a gear pump with the temperature adjusted to 250° C. Further, as a surface layer portion raw material, 100 percent by weight of the polypropylene resin (Prime Polymer Co., Ltd. E-105GM) was used. The polypropylene resin was melted using a single-way extruder with the cylinder diameter of 25 mm and the ratio between the cylinder and the diameter of under operating conditions that the cylinder temperature was 210° C. and that the number of revolutions of the screw was 100 rpm, and supplied to the multi-manifold die. Herein, each raw material was supplied to the multi-manifold die so that the ratio of surface layer portion/inner layer portion/surface layer portion=1/10/1, merged, and extruded with the lip width of 400 mm and clearance of 1.9 mm. Herein, extrusion was performed so that the extrusion line speed was 0.5 m/min. The extruded melted resin was received in a pair of cast rolls set for 80° C., the resin was cooled and solidified while the melted resin was drawn in the MD direction, and a sheet with a thickness of 1.7 mm was obtained.

The obtained sheet was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and obtained was a two-kind three-layer co-extruded reflecting sheet.

The thickness (surface layer portion/inner layer portion/surface layer portion), weighing, density and total reflection index of the obtained two-kind three-layer reflecting sheet were respectively 13 μm/418 μm/14 μm, 208 g/m$^2$, 0.47 g/cm$^2$, and 97.1%. Further, the total reflection index of the surface layer portion was 14%.

Figure 12:
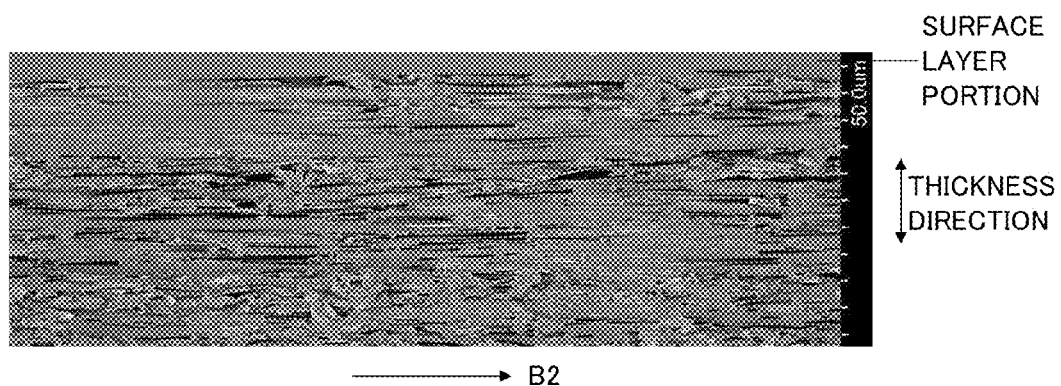
FIG. 12 is a SEM photograph of B2-direction parallel cross section in the vicinity of a surface layer portion of a sample as described in Example 1.
Figure 13:
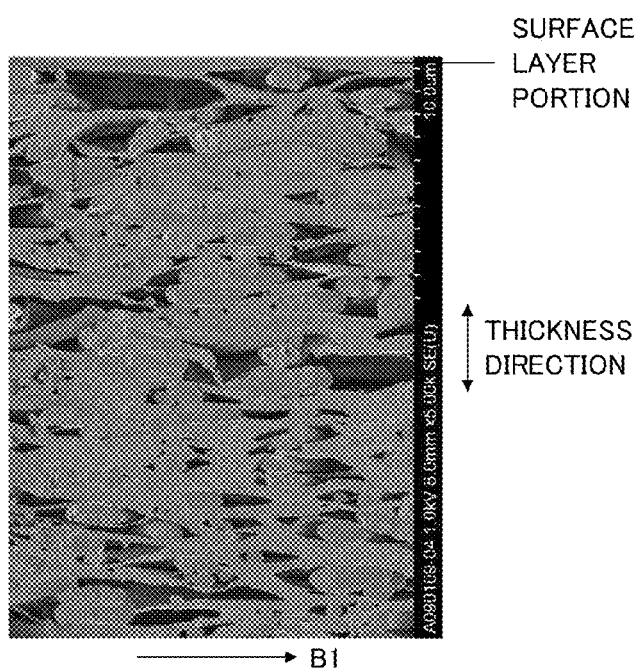
FIG. 13 is a SEM photograph of B1-direction parallel cross section in the vicinity of the surface layer portion of the sample as described in Example 1.
Figure 14:
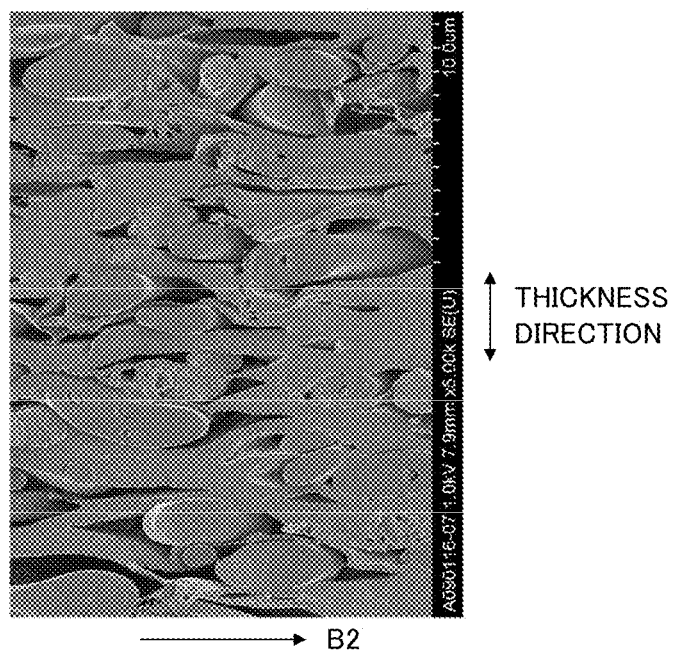
FIG. 14 is a SEM photograph of B2-direction parallel cross section in the center portion of an inner layer portion of the sample as described in Example 1.
Figure 15:
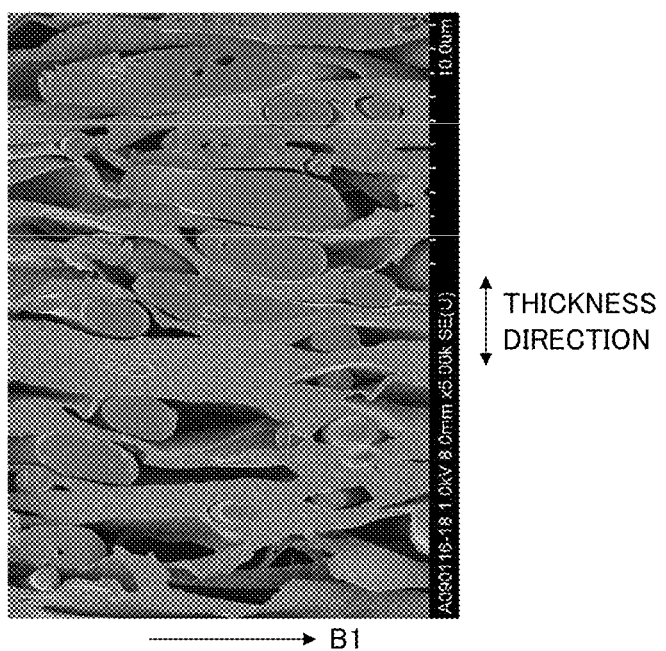
FIG. 15 is a SEM photograph of B1-direction parallel cross section in the center portion of the inner layer portion of the sample as described in Example 1.

From the cross section observation using the scanning electron microscope (SEM), it was confirmed that the polycarbonate resin is oriented in one direction in the vicinity of the surface layer portion in the inner layer portion of the obtained sheet. In the vicinity of the surface layer in the inner layer portion, the ratio Ds2/Ds1 of the length Ds2 of the resin in the B2 direction to the length Ds1 of the resin in the B1 direction was 34.2. Further, the B2 direction was coincident with the MD direction, and as a result, the B1 direction was the TD direction. In the center portion of the inner layer portion, the ratio Dc2/Dc1 of the length Dc2 of the resin in the B2 direction to the length Dc1 of the resin in the B1 direction was 0.68. For reference, FIG. 12 shows the cross-sectional photograph of the vicinity of the surface layer portion in the inner layer portion cut in the B2 direction, and FIG. 13 shows the cross-sectional photograph of the vicinity of the surface layer portion in the inner layer portion cut in the B1 direction. Further, FIG. 14 shows the cross-sectional photograph of the center portion of the inner layer portion cut in the B2 direction, and FIG. 15 shows the cross-sectional photograph of the center portion of the inner layer portion cut in the B1 direction. Particularly, from FIG. 12, it is understood that the resin is oriented in the B2 direction.

Figure 16:
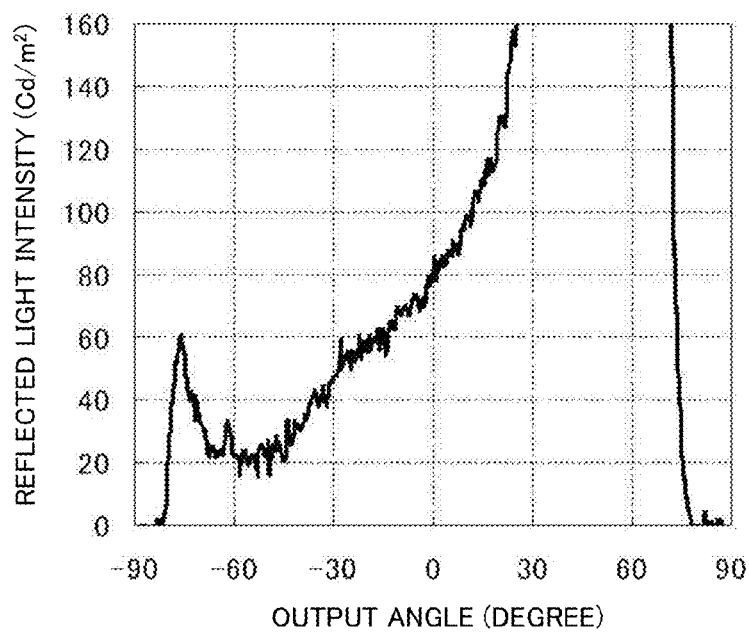
FIG. 16 is a graph showing the reflected light intensity distribution obtained by measuring the intensity using EZ contrast in A1-direction incidence of the sample as described in Example 1.
Figure 17:
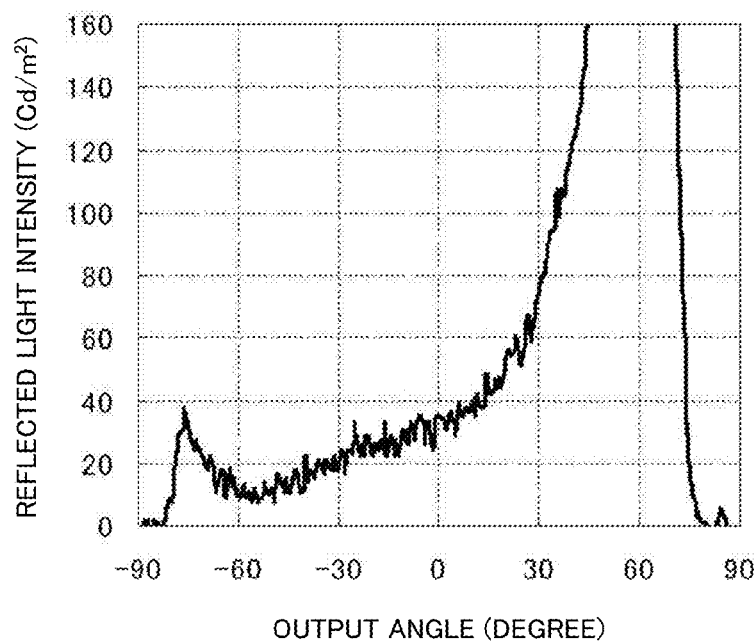
FIG. 17 is a graph showing the reflected light intensity distribution obtained by measuring the intensity using EZ contrast in A2-direction incidence of the sample as described in Example 1.

In measurement of the reflected light intensity using the varied-angle luminance meter (hereinafter, EZ Contrast) produced by ELDIM, the ratio L1/L2, of the reflected light intensity L1 in the incident direction A1 where the reflected light intensity in the 0-degree direction is the highest when the light is incident at an incident angle of 60 degrees to the reflected light intensity L2 in the incident direction A2 orthogonal to the A1 direction, was 2.34. Further, the A1 direction was coincident with the B1 direction (TD), and as a result, the A2 direction was the B2 direction (MD). For reference, FIG. 16 shows the reflected light intensity with the light incident in the A1 direction, and FIG. 17 shows the reflected light intensity with the light incident in the A2 direction. It is understood that there is a significant difference in the reflected light intensity by the incident direction. In addition, in FIGS. 16 and 17, the incident light is applied from the angle described as −60 degrees, and the high reflected light intensity around +60 degrees is derived from regular reflection.

Figure 18:
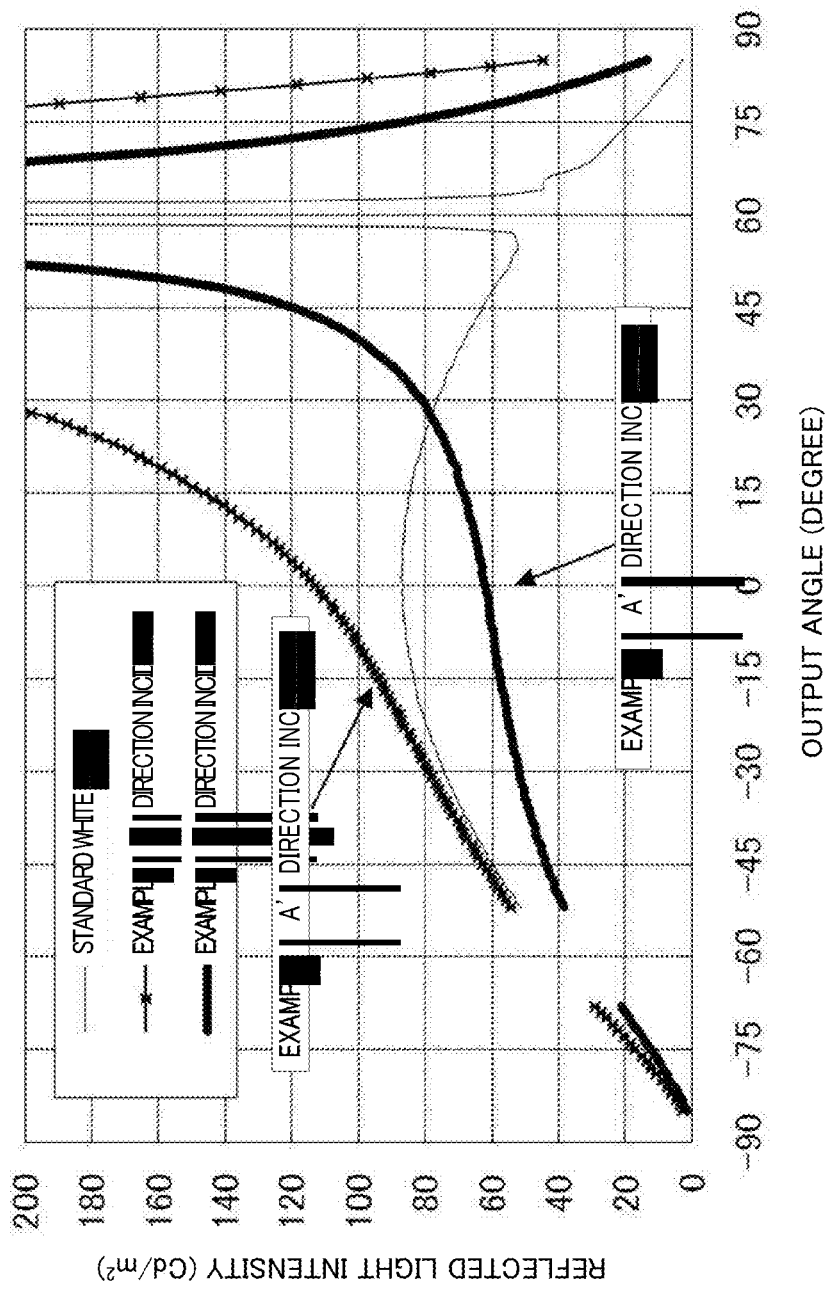
FIG. 18 is a graph showing the reflected light distribution of the sample as described in Example 1.

In measurement of the reflected light relative intensity using the Goniophotometer (Nippon Denshoku Industries Co., LTD., hereinafter referred to as GC5000L), the A'1 direction was coincident with the B1 direction (TD), and the A'2 direction was the B2 direction (MD). The reflected light relative intensity L'2 in the 0-degree direction was 69% and thus low, and it is understood that the reflected light with the light incident in the A'2 direction is low diffusion. Meanwhile, the reflected light relative intensity L'1 was 126% and thus high, and it is understood that the reflected light with the light incident in the A'1 direction is high diffusion. Further, L'1/L'2 was 1.83. For reference, FIG. 18 shows the reflected light intensities with the light incident in the A'1 direction and with the light incident in the A'2 direction. It is understood that there is a significant difference in the reflected light intensity by the incident direction. In addition, in FIG. 18, the incident light is applied from the angle described as −60 degrees, and the high reflected light intensity around +60 degrees is derived from regular reflection.

Further, in measurement of reflectance, the incident direction with the highest total reflection index was the MD direction of the reflecting sheet i.e. the A2 direction, and the total reflection index was 99.5%. The incident direction with the lowest total reflection index was the TD direction (B1 direction) of the reflecting sheet i.e. the A1 direction, and the total reflection index was 94.7%. The reflectance anisotropy was 4.8%.

Example 2

As a surface layer portion, used were 3 percent by weight of zinc oxide (Sakai Chemical Industry Co., Ltd. Nanofine 50SD, average particle size: 20 nm) and 2 percent by weight of a benzotriazolic UV absorbing agent (Ciba Specialty Chemicals K.K, T234) as UV absorbing agents, and 95 percent by weight of the polypropylene resin (Prime Polymer Co., Ltd. E-105GM). The mixture was extruded so that the extrusion line speed was 0.5 m/min as in Example 1, and stretched in the MD direction and the TD direction, and obtained was a two-kind three-layer co-extruded reflecting sheet.

The thickness (surface layer portion/inner layer portion/surface layer portion), weighing, density and total reflection index of the obtained two-kind three-layer reflecting sheet were respectively 19 μm/431 μm/22 μm, 227 g/m$^2$, 0.48 g/cm$^3$, and 97.2%. Further, the total reflection index of the surface layer portion was 23%.

From the cross section observation using the scanning electron microscope (SEM), in the vicinity of the surface layer portion in the inner layer portion, the ratio Ds2/Ds1 of the length Ds2 of the polycarbonate resin in the B2 direction where the length of the resin is the maximum to the length Ds1 of the resin in the B1 direction orthogonal to B2 was 32.3. Further, in the center portion of the inner layer portion, the ratio Dc2/Dc1 of the length Dc2 of the resin in the B2 direction to the length Dc1 of the resin in the B1 direction was 0.88.

In addition, in the vicinity of the surface layer portion in the inner layer portion, the direction B2 in which the length of the resin is the maximum was coincident with the MD direction, and as a result, B1 was coincident with the TD direction.

In measurement of the reflected light intensity using the varied-angle luminance meter (hereinafter, EZ Contrast) produced by ELDIM, the ratio L1/L2, of the reflected light intensity L1 in the incident direction A1 where the reflected light intensity in the 0-degree direction is the highest when the light is incident at an incident angle of 60 degrees to the reflected light intensity L2 in the incident direction A2 orthogonal to the A1 direction, was 1.63. Further, A1 was coincident with the B1 direction (TD), and as a result, A2 was the B2 direction (MD).

In measurement of the reflected light relative intensity using the GC5000L, A'1 was coincident with the B1 direction (TD), and A'2 was the B2 direction (MD). The reflected light relative intensity L'2 in the 0-degree direction was 64% and thus low, and it is understood that the reflected light with the light incident in the L'2 direction is low diffusion. Meanwhile, L'1 was 121% and thus high, and it is understood that the reflected light with the light incident in the L'1 direction is high diffusion. Further, L'1/L'2 was 1.89.

Moreover, the incident direction with the highest total reflection index was the MD direction of the reflecting sheet i.e. the A2 direction, and the total reflection index was 99.2%. The incident direction with the lowest total reflection index was the TD direction of the reflecting sheet i.e. the A1 direction, and the total reflection index was 95.2%. The reflectance anisotropy was 4.0%.

Example 3

As a surface layer portion, used were 5 percent by weight of zinc oxide (Sakai Chemical Industry Co., Ltd. Finex 50W, average particle size: 20 nm) as a UV absorbing agent, and 95 percent by weight of the polypropylene resin (Prime Polymer Co., Ltd. E-105GM), and in the same way as in Example 1 except that the extrusion line speed was 1.0 m/min, obtained was a two-kind three-layer co-extruded reflecting sheet.

The thickness (surface layer portion/inner layer portion/surface layer portion), weighing, density and total reflection index of the obtained two-kind three-layer reflecting sheet were respectively 14 μm/371 μm/14 μm, 191 g/m$^2$, 0.48 g/cm$^3$, and 97.3%. Further, the total reflection index of the surface layer portion was 21%.

From the cross section observation using the scanning electron microscope (SEM), in the vicinity of the surface layer portion in the inner layer portion, the ratio Ds2/Ds1 of the length Ds2 of the polycarbonate resin in the B2 direction where the length of the resin is the maximum to the length Ds1 of the resin in the B1 direction orthogonal to B2 was 41.4. Further, in the center portion of the inner layer portion, the ratio Dc2/Dc1 of the length Dc2 of the resin in the B2 direction to the length Dc1 of the resin in the B1 direction was 0.74. In addition, in the vicinity of the surface layer portion in the inner layer portion, the B2 direction in which the length of the resin is the maximum was coincident with the MD direction, and as a result, B1 was coincident with the TD direction.

Figure 19:
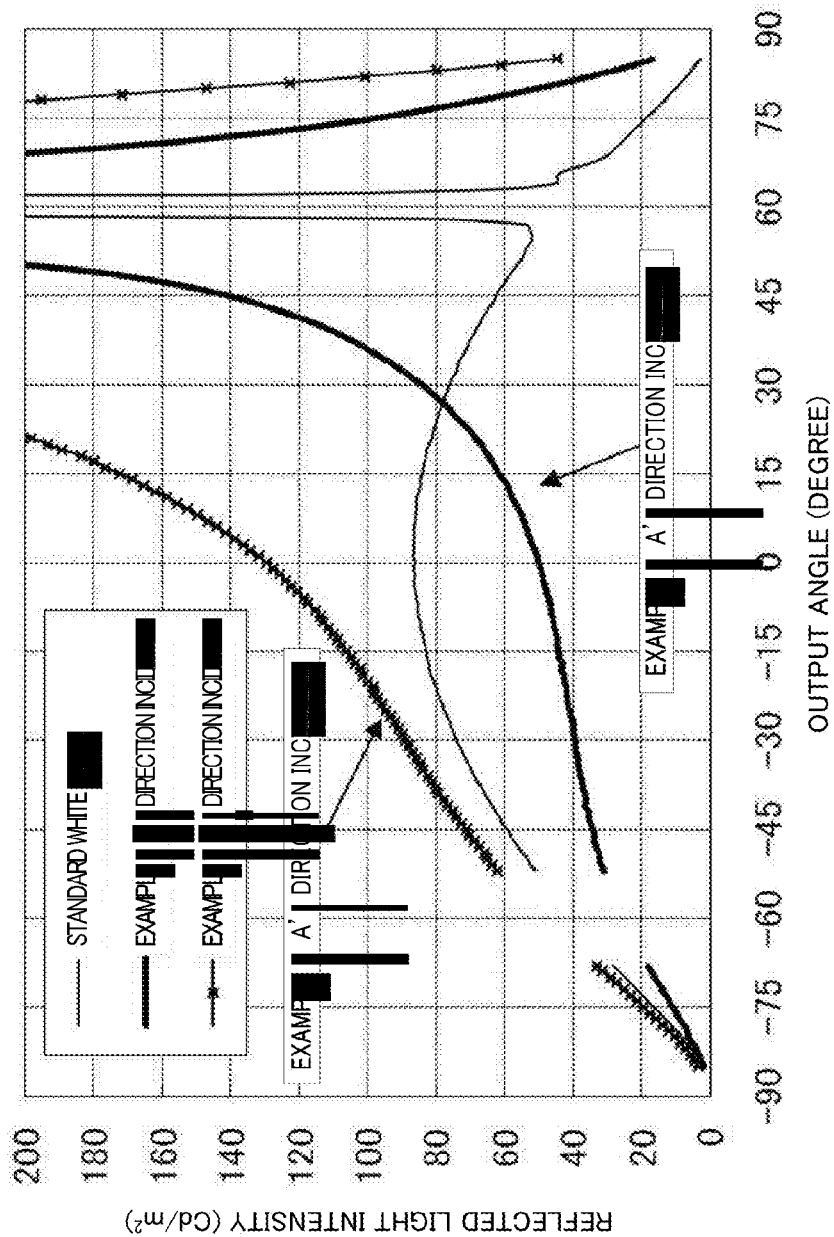
FIG. 19 is a graph showing the reflected light distribution of a sample as described in Example 3.

In measurement of the reflected light relative intensity using the GC5000L, A'1 was coincident with the B1 direction (TD), and A'2 was the B2 direction (MD). The reflected light relative intensity L'2 in the 0-degree direction was 55% and thus low, and it is understood that the reflected light with the light incident in the L'2 direction is low diffusion. Meanwhile, L'1 was 142% and thus high, and it is understood that the reflected light with the light incident in the L'1 direction is high diffusion. Further, L'1/L'2 was 2.58. For reference, FIG. 19 shows the reflected light intensities with the light incident in the A'1 direction and with the light incident in the A'2 direction. It is understood that there is a significant difference in the reflected light intensity by the incident direction. In addition, in FIG. 19, the incident light is applied from the angle described as −60 degrees, and the high reflected light intensity around +60 degrees is derived from regular reflection.

Example 4

As a surface layer portion, used were 5 percent by weight of zinc oxide (Sakai Chemical Industry Co., Ltd. Nanofine 50SD, average particle size: 20 nm) as a UV absorbing agent, and 95 percent by weight of the polypropylene resin (Prime Polymer Co., Ltd. E-105GM), and in the same way as in Example 1 except that the extrusion line speed was 0.8 m/min, obtained was a two-kind three-layer co-extruded reflecting sheet.

The thickness (surface layer portion/inner layer portion/surface layer portion), weighing, density and total reflection index of the obtained two-kind three-layer reflecting sheet were respectively 16 μm/362 μm/18 μm, 195 g/m$^2$, 0.49 g/cm$^3$, and 97.1%. Further, the total reflection index of the surface layer portion was 24%.

In measurement of the reflected light relative intensity using the GC5000L, A'1 was coincident with the extrusion transverse direction (TD), and A'2 was coincident with the extrusion direction (MD). The reflected light relative intensity L'2 in the 0-degree direction was 60% and thus low, and it is understood that the reflected light with the light incident in the L'2 direction is low diffusion. Meanwhile, L'1 was 152% and thus high, and it is understood that the reflected light with the light incident in the L'1 direction is high diffusion. Further, L'1/L'2 was 2.53.

Comparative Example 1

Extrusion was performed in the same way as in Example 1 except only the inner layer portion without the surface layer portion, longitudinal stretching and transverse stretching was further performed, and a single-layer reflecting sheet with only the inner layer portion was fabricated.

The thickness, weighing, density and total reflection index of the obtained single-layer reflecting sheet were respectively 358 μm, 194 g/m$^2$, 0.54 g/cm$^3$, and 97.4%.

From the cross section observation using the scanning electron microscope (SEM), in the range of 20 μm toward the center in the thickness direction from the surface, the ratio Ds2/Ds1 of the length Ds2 of the polycarbonate resin in the B2 direction where the length of the resin is the maximum to the length Ds1 of the resin in the B1 direction orthogonal to B2 was 9.86. Further, in the center portion of the inner layer portion, the ratio Dc2/Dc1 of the length Dc2 of the resin in the B2 direction to the length Dc1 in the B1 direction was 0.68. In addition, in the vicinity of the surface layer portion in the inner layer portion, the B2 direction in which the length of the resin is the maximum was coincident with the MD direction, and as a result, B1 was coincident with the TD direction.

In measurement using the EZ Contrast, the ratio L1/L2, of the reflected light intensity L1 in the incident direction A1 where the reflected light intensity in the 0-degree direction is the highest when the light is incident at an incident angle of 60 degrees to the reflected light intensity L2 in the incident direction A2 orthogonal to the A1 direction, was 1.33. Further, A1 was coincident with the B1 direction (TD) of the reflecting sheet, and as a result, A2 was the B2 direction (MD).

In measurement of the reflected light relative intensity using the GC5000L, A'1 was coincident with the B1 direction (TD), and A'2 was the B2 direction (MD). The reflected light relative intensity L'2 in the 0-degree direction was 79%, and L'1 was 108%. Further, L'1/L'2 was 1.37.

Comparative Example 2

Extrusion was performed in the same way as in Comparative Example 1 except that the extrusion line speed was 1.0 m/min. It was attempted to stretch the obtained sheet three times in the MD direction (longitudinal direction) at the temperature of 155° C. using the roll longitudinal stretching machine, but the sheet was broken, and it was not possible to obtain the reflecting sheet.

Comparative Example 3

Used as an inner layer portion raw material was a raw-material resin of a mixture of 80 percent by weight of the polypropylene resin (Prime Polymer Co., Ltd. E-105GM) and 20 percent by weight of barium sulfate (Sakai Chemical Industry Co., B-1), used as a surface layer portion were 5 percent by weight of barium sulfate (Sakai Chemical Industry Co., B-1) and 95 percent by weight of the polypropylene resin (Prime Polymer Co., Ltd. E-105GM), and a two-kind three-layer co-extruded reflecting sheet was obtained as in Example 1.

The thickness, weighing, density and total reflection index of the obtained two-kind three-layer reflecting sheet (surface layer portion/inner layer portion/surface layer portion) were respectively 27 µm/316 µm/26 µm, 315 g/m², 0.85 g/cm³, and 95.6%. Further, the total reflection index of the surface layer portion was 51%.

From the cross section observation using the scanning electron microscope (SEM), in the vicinity of the surface layer in the inner layer portion, the ratio Ds2/Ds1 of the length Ds2 of barium sulfate in the B2 direction where the length of the particle is the maximum to the length Ds1 of the particle in the B1 direction orthogonal to B2 was 1.03, and showed a low value. Further, in the center portion of the inner layer portion, the ratio Dc2/Dc1 of the length Dc2 of the particle in the B2 direction to the length Dc1 of the resin in the B1 direction was 1.01. In addition, in the vicinity of the surface layer portion in the inner layer portion, the B2 direction in which the length of the particle is the maximum was coincident with the MD direction, and as a result, B1 was coincident with the TD direction.

In measurement using the EZ Contrast, the ratio L1/L2, of the reflected light intensity L1 in the incident direction A1 where the reflected light intensity in the 0-degree direction is the highest when the light is incident at an incident angle of 60 degrees to the reflected light intensity L2 in the incident direction A2 orthogonal to the A1 direction, was 1.10. Further, A1 was coincident with the B1 direction (TD) of the reflecting sheet, and as a result, A2 was the B2 direction (MD).

In measurement of the reflected light relative intensity using the GC5000L, A'1 was coincident with the B1 direction (TD), and A'2 was the B2 direction (MD). The reflected light relative intensity L'2 in the 0-degree direction was 92%, and L'1 was 93%. Further, L'1/L'2 was 1.01.

Comparative Example 4

A reflecting sheet was extracted from another commercially available liquid crystal TV different from the backlight for evaluation. The total reflection index of the reflecting sheet was 96.9%. Further, only the surface layer portion was removed, and the total reflection index was measured and 57%.

Figure 20:
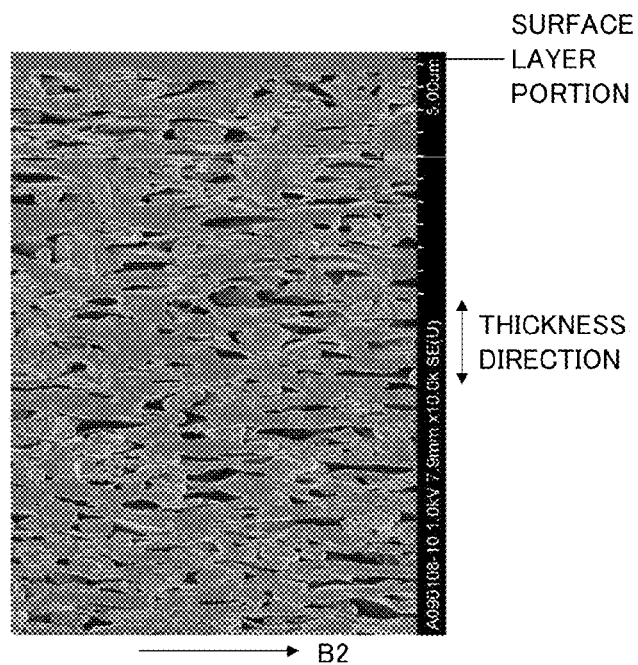
FIG. 20 is a SEM photograph of B2-direction parallel cross section in the vicinity of a surface layer portion of a sample as described in Comparative Example 4.
Figure 21:
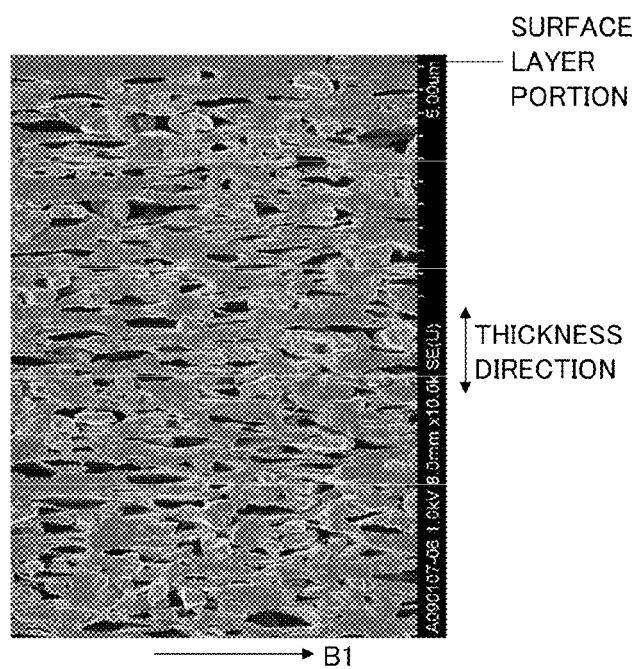
FIG. 21 is a SEM photograph of B1-direction parallel cross section in the vicinity of the surface layer portion of the sample as described in Comparative Example 4.

From the cross section observation using the scanning electron microscope (SEM), in the vicinity of the surface layer portion in the inner layer portion, the ratio Ds2/Ds1 of the length Ds2 of the void forming agent in the B2 direction where the length of the particle is the maximum to the length Ds1 of the particle in the B1 direction orthogonal to B2 was 1.01, and showed the low value. For reference, FIG. 20 shows the cross-sectional photograph of the vicinity of the surface layer portion in the inner layer portion cut in the B2 direction where the length of the cleavage nucleator is the maximum, and FIG. 21 shows the cross-sectional photograph of the vicinity of the surface layer portion in the inner layer portion cut in the B1 direction orthogonal to B2. It is understood that the cleave nucleator is in spherical form in the vicinity of the surface layer portion in the inner layer portion. Further, in the center portion of the inner layer portion, the ratio Dc2/Dc1 of the length Dc2 of the particle in B2 direction to the length Dc1 in the B1 direction was 1.04. In addition, in the vicinity of the surface layer portion in the inner layer portion, the B2 direction in which the length of the particle is the maximum was coincident with the MD direction, and as a result, B1 direction was coincident with the TD direction.

In measurement of the reflected light intensity using the EZ Contrast, the reflected light intensity in the 0-degree direction when the light was incident at an incident angle of 60 degrees was measured while varying the incident direction. The ratio L1/L2 of the reflected light intensity L1 in the incident direction A1 with the highest reflected light intensity to the reflected light intensity L2 in the incident direction A2 orthogonal to the A1 direction was 1.03, and the reflected light intensity in the 0-degree direction was almost the same irrespective of the incident direction.

Figure 22:
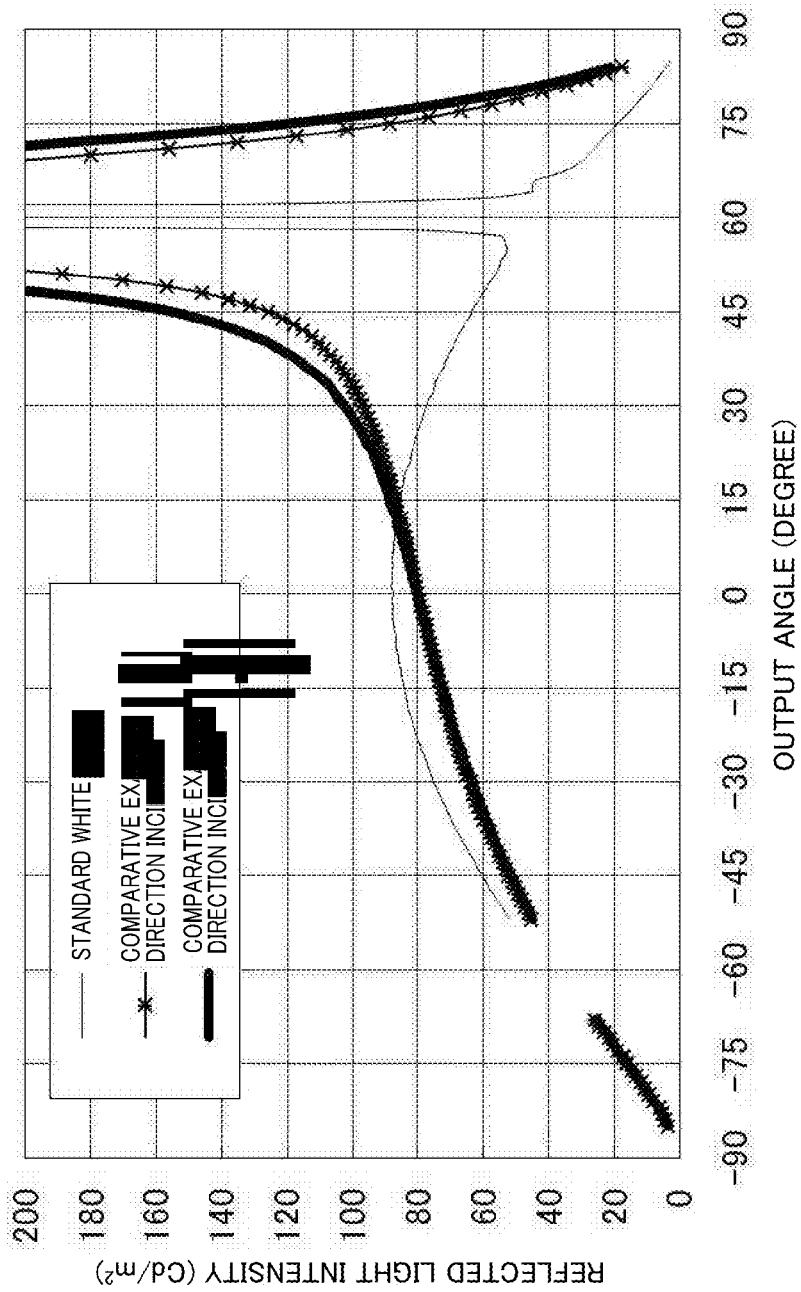
FIG. 22 is a graph showing the reflected light intensity distribution of the sample as described in Comparative Example 4.

In measurement of the reflected light relative intensity using the GC5000L, the reflected light intensity in the 0-degree direction when the light was incident at an incident angle of 60 degrees was measured while varying the incident direction. The reflected light relative intensity L'2 in the 0-degree direction was 88%, and L'1 was 89%. Further, L'1/L'2 was 1.01. For reference, FIG. 22 shows the reflected light intensity obtained in the GC5000L. As compared with FIG. 18, it is understood that the reflected light intensity in the 0-degree direction is almost the same irrespective of the incident direction.

Comparative Example 5

A reflecting sheet was extracted from another commercially available liquid crystal TV different from the backlight for evaluation and the commercially available liquid crystal TV used in Comparative Example 4. The evaluations as described in the Example were made on the use surface (surface facing the cold-cathode tubes) of the reflecting sheet. The average total reflection index of the use surface was 96.5%. Further, only the surface layer portion was removed, and the total reflection index was measured and 22%.

The cross section observation was performed using the scanning electron microscope (SEM) while varying the direction, but any difference in the length of the inside particle by the difference in the direction was not shown in the vicinity of the surface layer portion of the inner layer portion, and Ds2/Ds1 was 1.04. Further, in the center portion of the inner layer portion, Dc2/Dc1 was 1.06.

In measurement of the reflected light relative intensity using the GC5000L, the reflected light intensity in the 0-degree direction when the light was incident at an incident angle of 60 degrees was measured while varying the incident direction, but the reflected light intensity in the 0-degree direction was not changed, and the reflected light relative intensities L'1 and L'2 in the 0-degree direction were both 81%. As a result, L'1/L'2 was 1.00.

Comparative Example 6

The evaluations as described in the Example were made on the backside of the use surface (surface facing the cold-cathode tubes) of the reflecting sheet used in Comparative Example 5. The average total reflection index of the backside was 97.0%. Further, only the surface layer portion was removed, and the total reflection index was measured and 17%.

In measurement of the reflected light relative intensity using the GC5000L, the reflected light intensity in the 0-degree direction when the light was incident at an incident angle of 60 degrees was measured while varying the incident direction, but the reflected light intensity in the 0-degree direction was not changed, and the reflected light relative intensities L'1 and L'2 in the 0-degree direction were both 81%. As a result, L'1/L'2 was 1.00.

As described above, it is understood that it is possible to control the reflected light relative intensity by controlling the form of the resin (B) in the reflecting sheet. Further, the obtained results are shown in Table 1, together with the yellowing factor and average luminance. In addition, in Table 1, PP represents the polypropylene resin (Prime Polymer Co., Ltd. E-105GM), and PC represents the polycarbonate resin (CHIMEI-ASAHI Corporation, WONDERLITE PC110). For example, in the case of surface layer portion/inner layer portion/surface layer portion=13 μm/418 μm/14 μm, the thickness (μm) of the surface layer portion is indicated by 13/14.

Further, as shown in Table 1, in Comparative Example 1 without the surface layer portion, Ds2/Ds1 is lowered. The reason is considered that the sheet without the surface layer portion directly receives shear with the die when the sheet is extruded from the die, and that the resin (B) cannot be oriented in the MD direction with stability. As a result, the ratio L1/L2 in the reflected light intensity is lower than those in Examples 1 to 4 with the surface layer portion. As shown in Comparative Example 3, when the inorganic powder was used in the resin, Ds2/Ds1 further decreases, and the total reflection index is low. Further, since the resin (B) was not used, the sheet does not have anisotropy in the reflected light intensity by the incident direction. Furthermore, as shown in Comparative Examples 4 to 6, also when the sheet of the commercially available liquid crystal TV was used, Ds2/Ds1 similarly decreases, and the ratio L1/L2 in the reflected light intensity is also low.

Implementation Evaluation of the Backlight

Described below are backlight evaluations of the reflecting sheets obtained in above-mentioned Examples 1 to 4 and Comparative Examples 1 to 6.

Example 5

Figure 23:
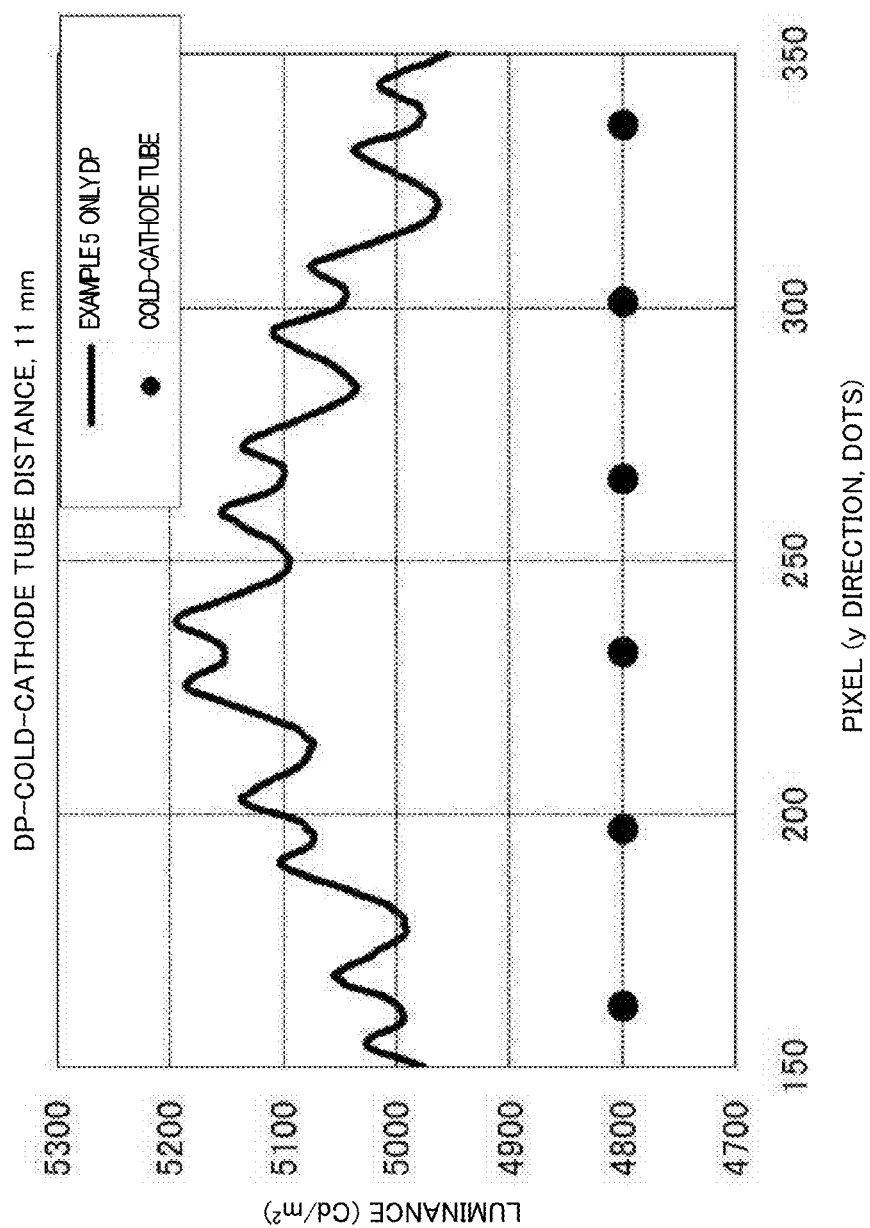
FIG. 23 is a graph to explain the luminance distribution of a sample as described in Example 5 when DP-cold-cathode tube is 11 mm and only DP is installed.
Figure 24:
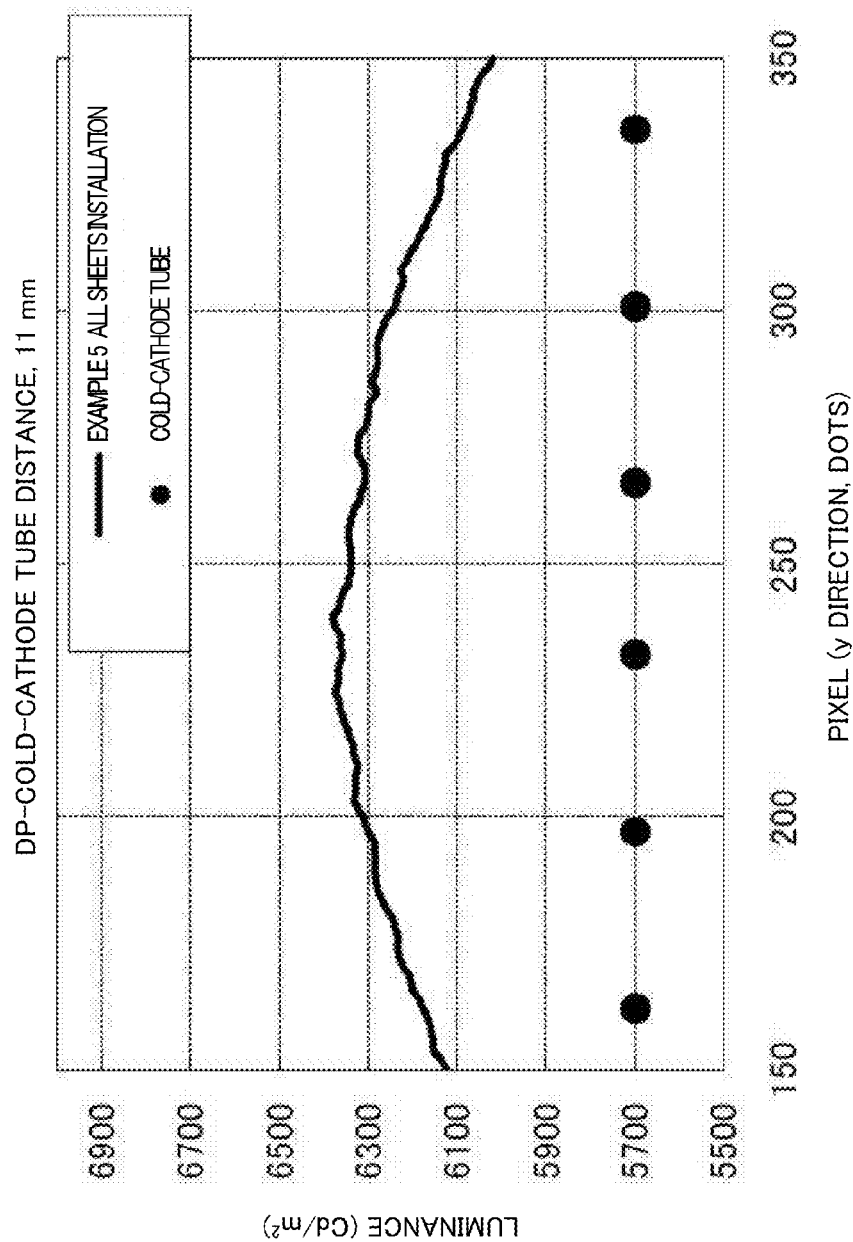
FIG. 24 is a graph to explain the luminance distribution of the sample as described in Example 5 when DP-cold-cathode tube is 11 mm and all sheets are installed.

The reflecting sheet as described in Example 1 was installed in the backlight so that the A2 direction was orthogonal to the direction of the cold-cathode tubes. Under the conditions that the DP-cold-cathode tube distance was 15 mm, 13 mm, 11 mm, 10 mm, and 9 mm, when diffuser/DS/prism sheet/reflection type polarization sheet were installed (hereinafter, all sheets installation) and lamp images were examined, the results were 0.0015, 0.0015, 0.0014, 0.0019 and 0.0039. When the DP-cold-cathode tube distance was decreased, increases in the lamp images were moderate, and even under the thin backlight condition such that the DP-cold-cathode tube distance was 11 mm, the lamp images showed the low value. Further, when the DP-cold-cathode tube distance was 11 mm, only the diffuser was installed, and the lamp images were examined, the result was 0.0055 and thus low. FIG. 23 shows the obtained luminance distribution graph. It is understood that the distribution has the minimum value of luminance immediately above each cold-cathode tube, while having two maximum values of luminance in between adjacent cold-cathode tubes. Further, FIG. 24 shows the luminance distribution graph in all sheets installation. As can be seen from FIG. 24, in the case of all sheets installation, areas immediately above the cold-cathode tubes were not lightened, and it is understood that the lamp images are remarkably reduced.

Figure 25:
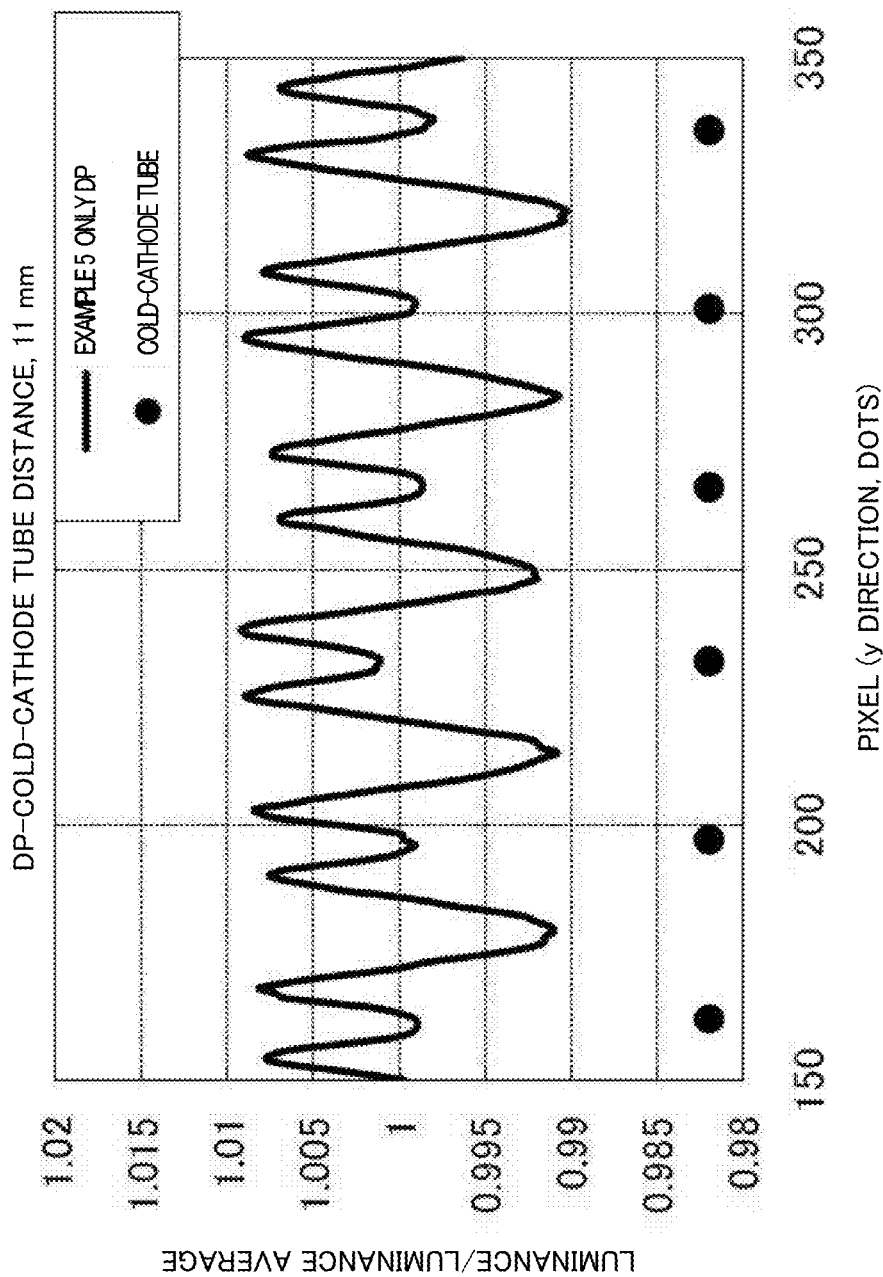
FIG. 25 is a graph to explain lamp images of the sample as described in Example 5 when DP-cold-cathode tube is 11 mm and only DP is installed.
Figure 26:
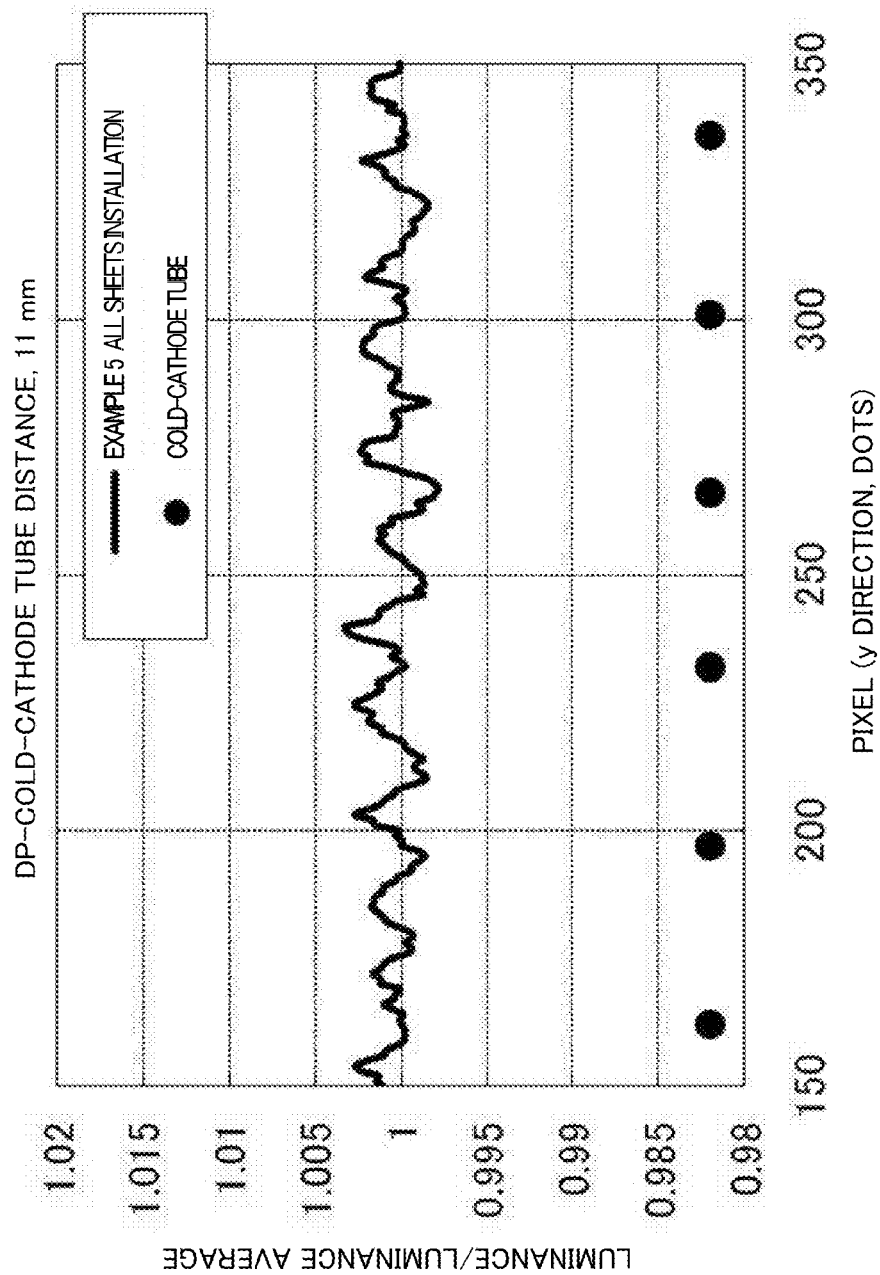
FIG. 26 is a graph to explain lamp images of the sample as described in Example 5 when DP-cold-cathode tube is 11 mm and all sheets are installed.

Further, FIG. 25 shows the lamp image graph with only the diffuser installed, and FIG. 26 shows the lamp image graph with all the sheets installed, in the DP-cold-cathode tube distance of 11 mm. As can be seen from FIG. 25, in the case of only the diffuser, areas immediately above the cold-cathode tubes were darkened. Further, as can be seen from FIG. 26, in the case of all sheets installation, areas immediately above the cold-cathode tubes were not lightened, and it is understood that the lamp images are remarkably reduced. The reason is considered that by installing the reflecting sheet of Example 1 so that A2 is orthogonal to the cold-cathode tubes, areas immediately above the cold-cathode tubes can be darkened, and that the lamp images are thereby reduced under the thin backlight condition. In addition, the luminance between cold-cathode tubes was measured, and was 1093 cd/m².

Example 6

Figure 27:
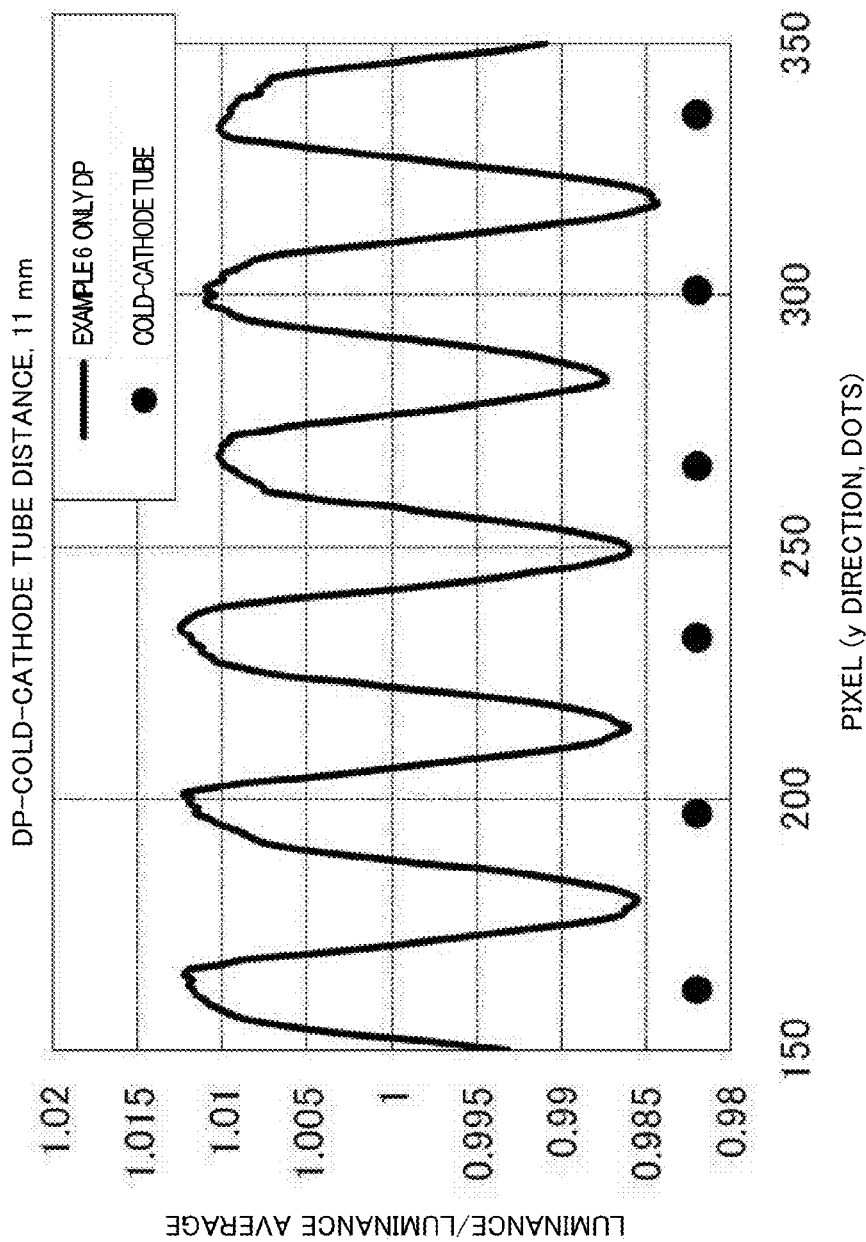
FIG. 27 is a graph to explain lamp images of a sample as described in Example 6 when DP-cold-cathode tube is 11 mm and only DP is installed.
Figure 28:
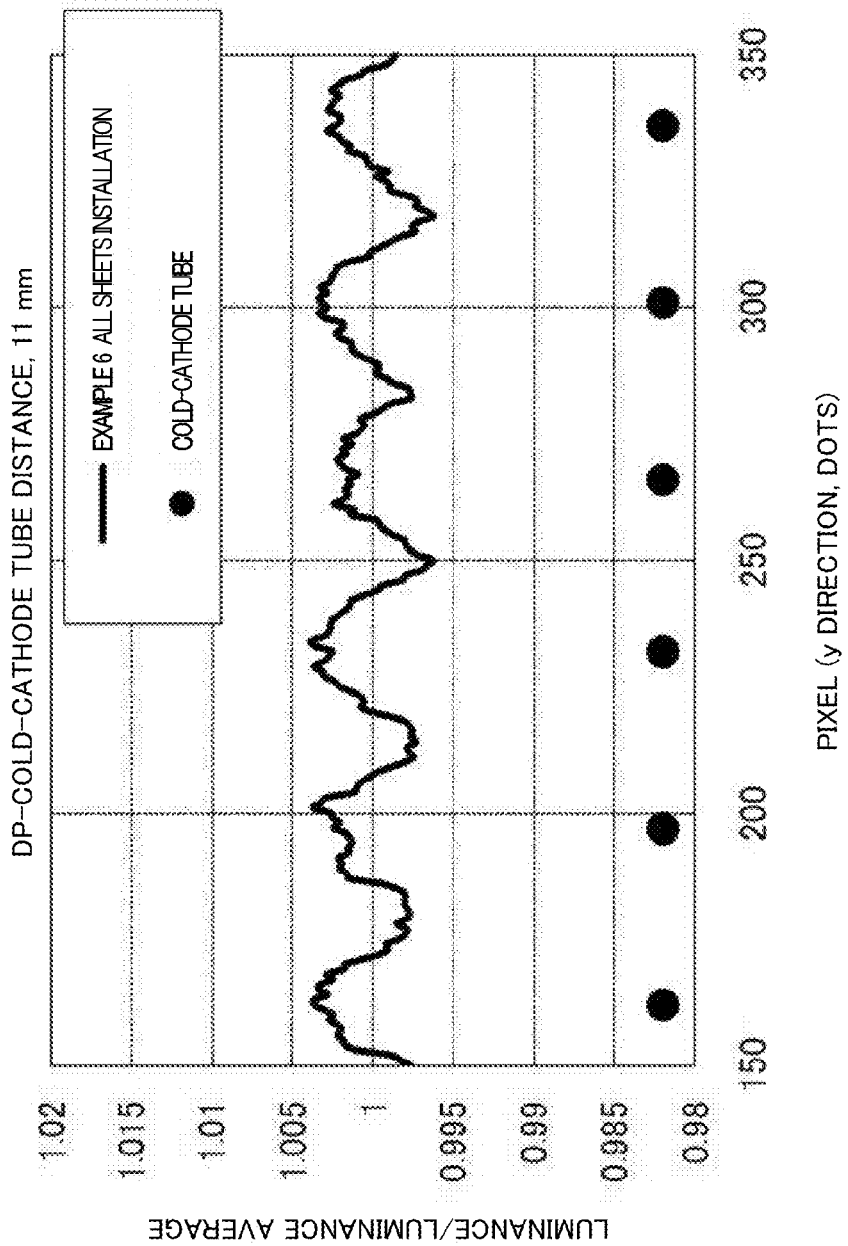
FIG. 28 is a graph to explain lamp images of the sample as described in Example 6 when DP-cold-cathode tube is 11 mm and all sheets are installed.

The reflecting sheet as described in Example 1 was installed in the backlight so that the A1 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0009, 0.0015, 0.0023, 0.0034 and 0.0056. Further, when the DP-cold-cathode tube distance was 11 mm, only the diffuser was installed, and the lamp images were examined, the result was 0.0097. It is understood that the installation of the reflecting sheet in the direction as described in Example 5 enables the lamp images to be greatly reduced under the condition that the DP-cold-cathode tube distance was 11 mm i.e. that the backlight is the thin type. FIG. 27 shows the lamp image graph with only the diffuser installed, and FIG. 28 shows the lamp image graph with all the sheets installed, in the DP-cold-cathode tube distance of 11 mm.

Meanwhile, under the condition that the DP-cold-cathode tube distance was 15 mm i.e. that the reflecting sheet upper surface-DP distance was 21.5 mm, it is understood that the lamp images are more excellent than in the installation of the reflecting sheet in the direction as described in Example 5.

When the luminance between cold-cathode tubes was measured, the luminance was 1429 cd/m², and thus high. The reason is considered that the luminance between cold-cathode tubes is high since the light from the cold-cathode tubes are diffused with excellence, and that the lamp image can thereby be reduced in the backlight where the reflecting sheet-DP distance is 20 mm or more.

Example 7

Figure 29:
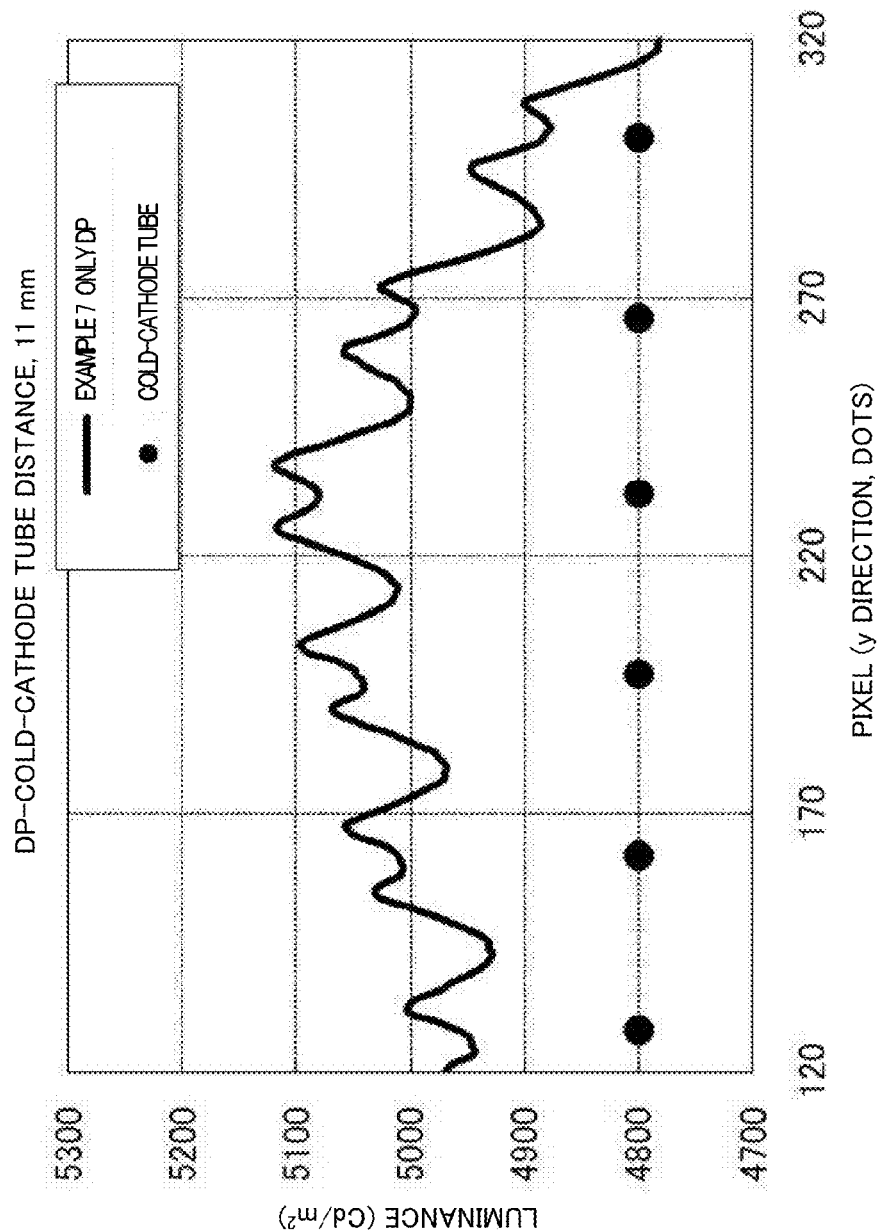
FIG. 29 is a graph to explain the luminance distribution of a sample as described in Example 7 when DP-cold-cathode tube is 11 mm and only DP is installed.
Figure 30:
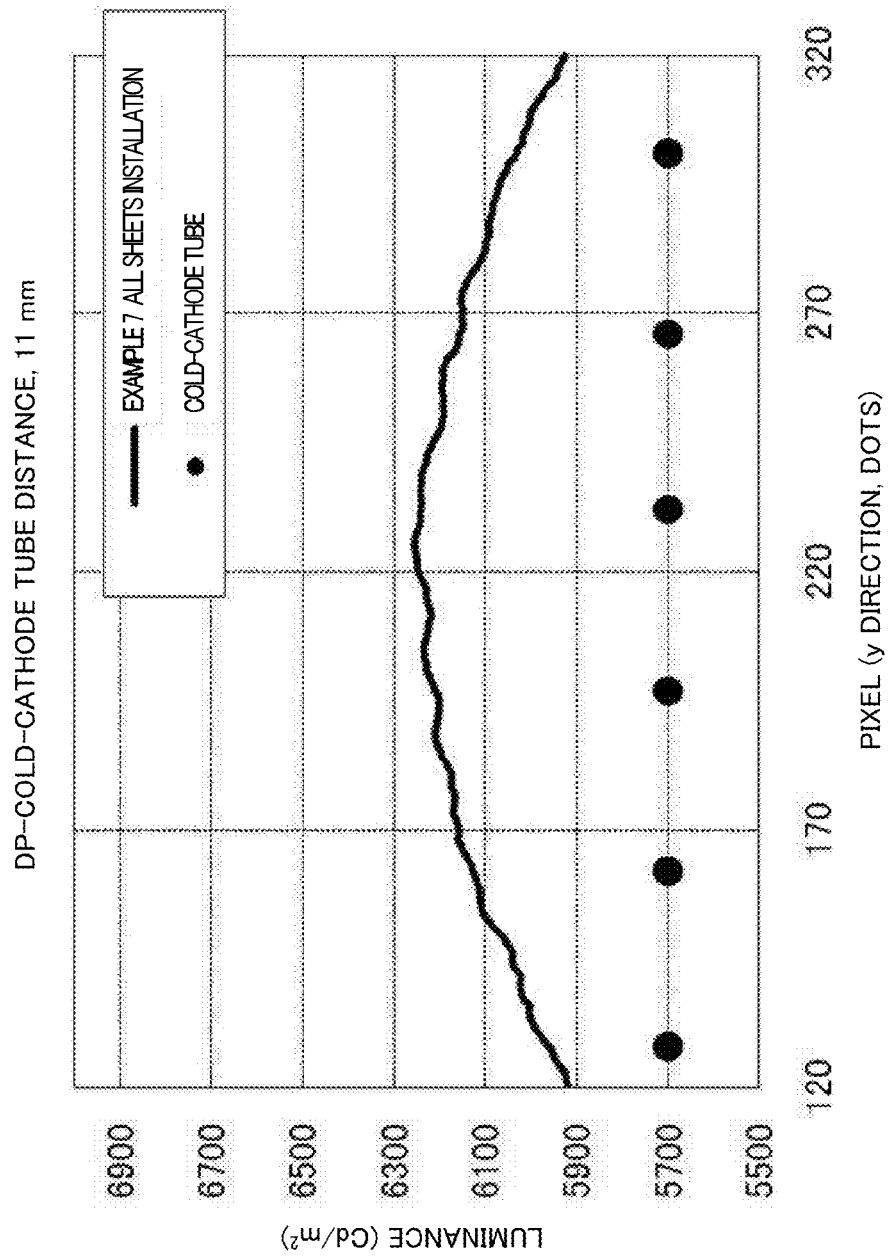
FIG. 30 is a graph to explain the luminance distribution of the sample as described in Example 7 when DP-cold-cathode tube is 11 mm and all sheets are installed.

The reflecting sheet as described in Example 2 was installed in the backlight so that the A2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0015, 0.0016, 0.0016, 0.0021 and 0.0041. When the DP-cold-cathode tube distance was decreased, increases in the lamp images were moderate, and even in the DP-cold-cathode tube distance of 11 mm, the lamp images showed the low value. Further, when the DP-cold-cathode tube distance was 11 mm, only the diffuser was installed, and the lamp images were examined, the result was 0.0059 and thus low. FIG. 29 shows the obtained luminance distribution graph. It is understood that the distribution has the minimum value of luminance immediately above each cold-cathode tube, while having two maximum values of luminance in between adjacent cold-cathode tubes. Further, FIG. 30 shows the luminance distribution graph in all sheets installation. As can be seen from FIG. 30, in the case of all sheets installation, areas immediately above the cold-cathode tubes were not lightened, and it is understood that the lamp images are remarkably reduced. In addition, the luminance between cold-cathode tubes was measured, and was 1110 cd/m$^2$.

Example 8

The reflecting sheet as described in Example 2 was installed in the backlight so that the A1 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0010, 0.0014, 0.0024, 0.0038 and 0.0057. Further, when the DP-cold-cathode tube distance was 11 mm, only the diffuser was installed, and the lamp images were examined, the result was 0.0101. It is understood that the installation of the reflecting sheet in the direction as described Example 7 enables the lamp images to be greatly reduced under the condition that the DP-cold-cathode tube distance was 11 mm i.e. that the backlight is the thin type.

Meanwhile, under the condition that the DP-cold-cathode tube distance was 15 mm i.e. that the reflecting sheet upper surface-DP distance was 21.5 mm, it is understood that the lamp images are more excellent than in the installation of the reflecting sheet in the direction as described in Example 6. Moreover, when the luminance between cold-cathode tubes was measured, the luminance was 1443 cd/m$^2$, and thus high. The reason is considered that the luminance between cold-cathode tubes is high since the light from the cold-cathode tubes are diffused with excellence, and that the lamp image can thereby be reduced in the backlight where the reflecting sheet-DP distance is 20 mm or more.

Example 9

The reflecting sheet as described in Example 3 was installed in the backlight so that the A'2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0028, 0.0022, 0.0017, 0.0017 and 0.0032. When the DP-cold-cathode tube distance was decreased, increases in the lamp images were moderate, and even in the DP-cold-cathode tube distance of 11 mm, the lamp images showed the low value. Further, when the DP-cold-cathode tube distance was 11 mm, only the diffuser was installed, and the lamp images were examined, the result was 0.0058 and thus low.

Example 10

The reflecting sheet as described in Example 4 was installed in the backlight so that the A'2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0024, 0.0021, 0.0014, 0.0015 and 0.0036. As the DP-cold-cathode tube distance was decreased, the lamp images were improved, and even in the DP-cold-cathode tube distance of 10 mm, the lamp images were of 0.0015 and showed the low value. However, when the DP-cold-cathode tube distance was 9 mm and thus decreased, the lamp images tended to increase. Further, when the DP-cold-cathode tube distance was 11 mm, only the diffuser was installed, and the lamp images were examined, the result was 0.0048 and thus low.

Comparative Example 7

The reflecting sheet as described in Comparative Example 1 was installed in the backlight so that the A2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0013, 0.0016, 0.0030, 0.0041 and 0.0064. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0101 and thus high.

Comparative Example 8

The reflecting sheet as described in Comparative Example 1 was installed in the backlight so that the A1 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0012, 0.0014, 0.0032, 0.0044 and 0.0068. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0118 and thus high.

Comparative Example 9

Figure 31:
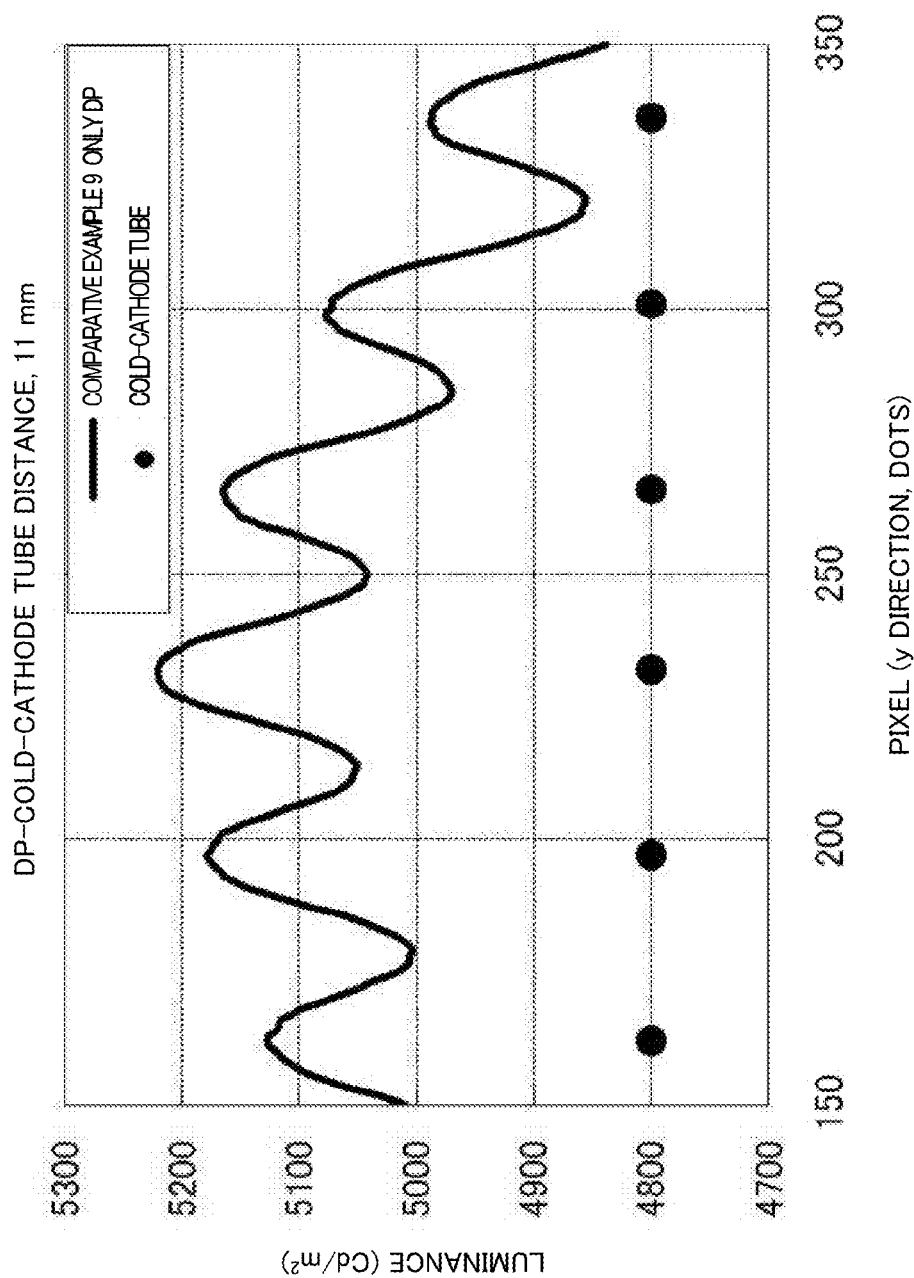
FIG. 31 is a graph to explain the luminance distribution of a sample as described in Comparative Example 9 when DP-cold-cathode tube is 11 mm and only DP is installed.
Figure 32:
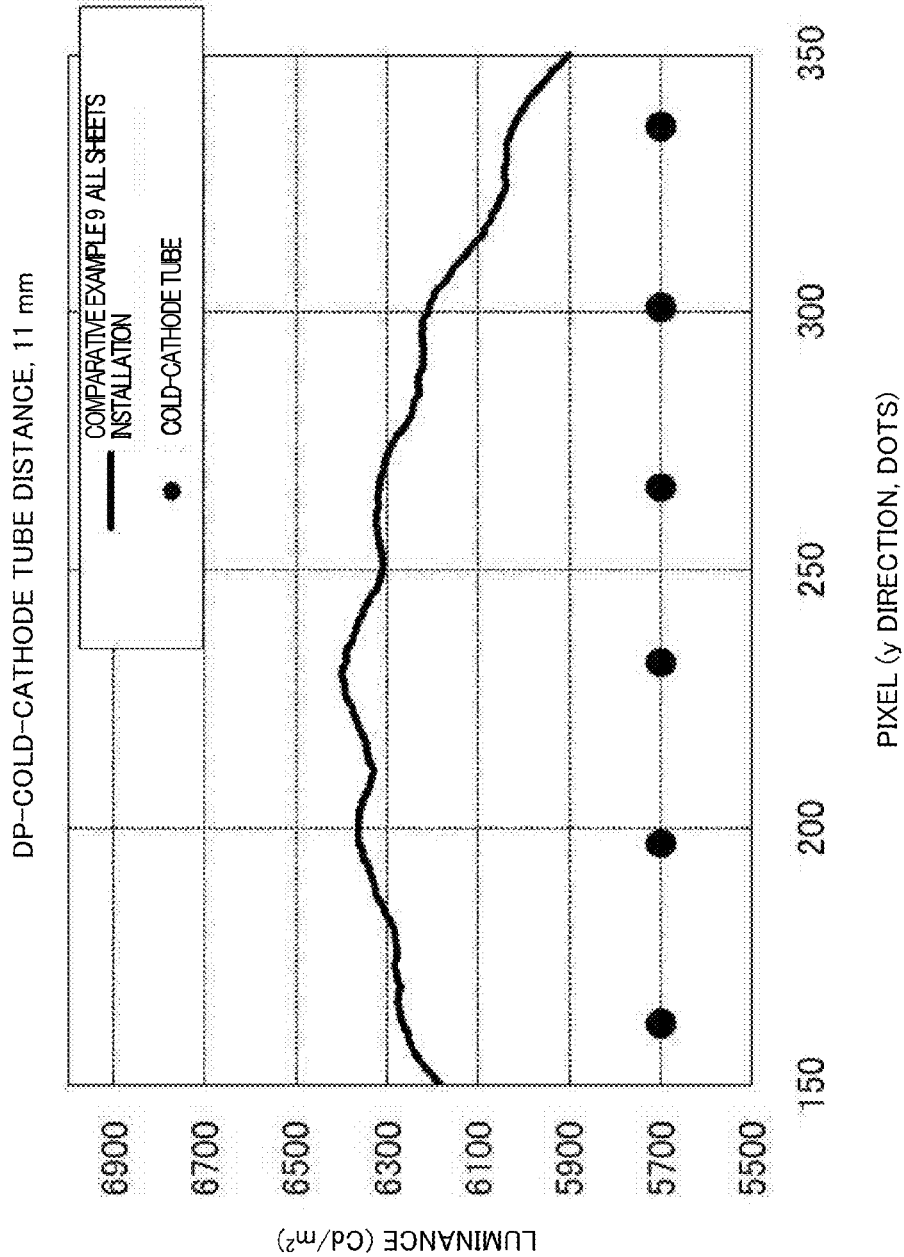
FIG. 32 is a graph to explain the luminance distribution of the sample as described in Comparative Example 9 when DP-cold-cathode tube is 11 mm and all sheets are installed.

The reflecting sheet as described in Comparative Example 3 was installed in the backlight so that the A2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0013, 0.0018, 0.0031, 0.0043 and 0.0062. As the DP-coldcathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0113 and thus high. FIG. 31 shows the obtained luminance distribution graph. It is understood that the distribution has the maximum value of luminance immediately above each cold-cathode tube, while not having the maximum value of luminance in between adjacent cold-cathode tubes. Further, FIG. 32 shows the luminance distribution graph with all the sheets installed, in the DP-cold-cathode tube distance of 11 mm. As can be seen from FIG. 32, in the case of all sheets installation, since areas immediately above the cold-cathode tubes were bright, it is understood that the lamp images remain.

Figure 33:
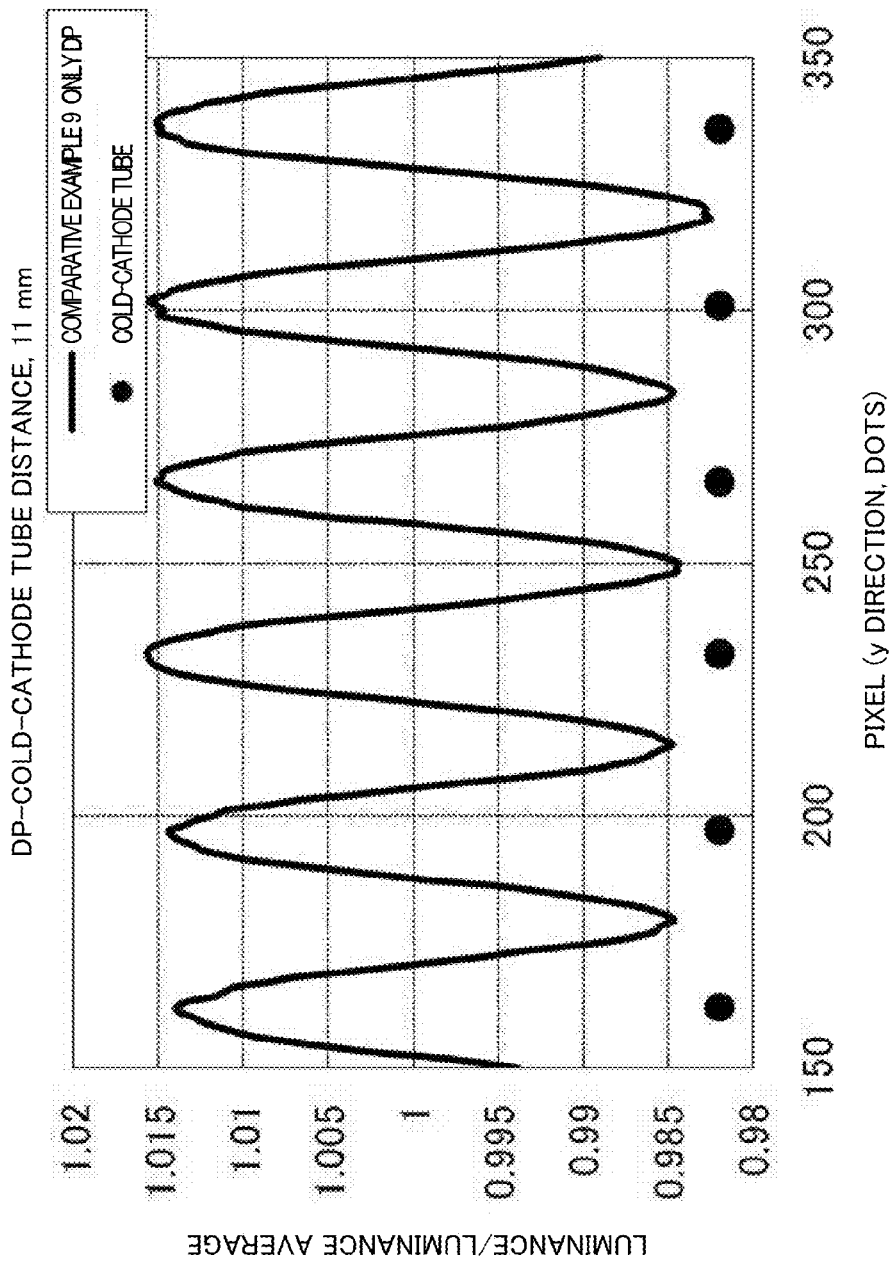
FIG. 33 is a graph to explain lamp images of the sample as described in Comparative Example 9 when DP-cold-cathode tube is 11 mm and only DP is installed.
Figure 34:
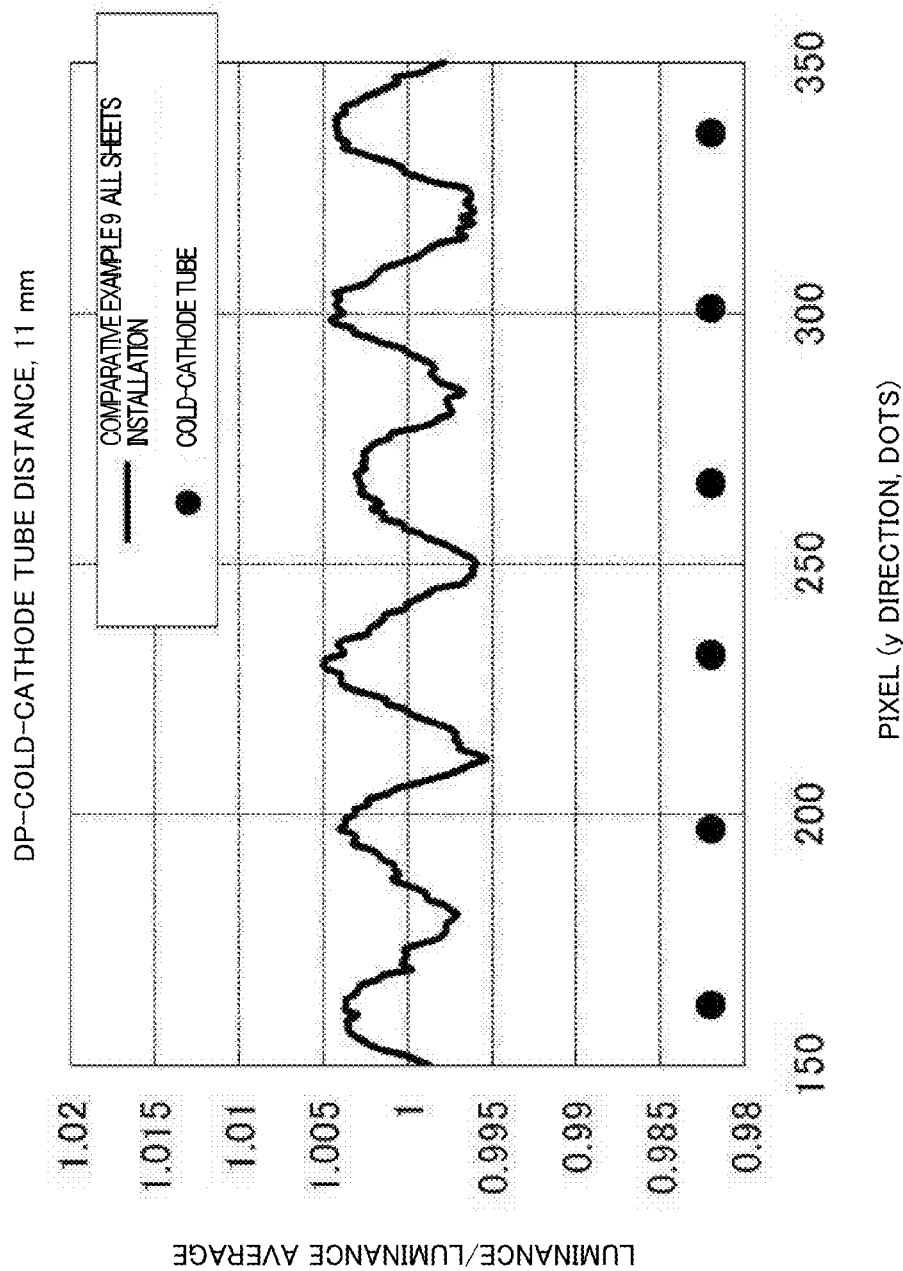
FIG. 34 is a graph to explain lamp images of the sample as described in Comparative Example 9 when DP-cold-cathode tube is 11 mm and all sheets are installed.

Further, FIG. 33 shows the lamp image graph with only the diffuser installed, and FIG. 34 shows the lamp image graph with all the sheets installed, in the DP-cold-cathode tube distance of 11 mm. As can be seen from FIG. 33, in the case of only the diffuser, areas immediately above the cold-cathode tubes were extremely bright. Further, as can be seen from FIG. 34, in the case of all sheets installation, since areas immediately above the cold-cathode tubes were bright, the lamp images remained. In addition, the luminance between cold-cathode tubes was measured, and was 1232 cd/m$^2$.

Comparative Example 10

The reflecting sheet as described in Comparative Example 3 was installed in the backlight so that the A1 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0013, 0.0019, 0.0032, 0.0043 and 0.0060. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0122 and thus high. In addition, the luminance between cold-cathode tubes was measured, and was 1214 cd/m$^2$.

Comparative Example 11

The reflecting sheet as described in Comparative Example 4 was installed in the backlight so that the A2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0011, 0.0014, 0.0028, 0.0036 and 0.0052. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0108 and thus high.

Figure 35:
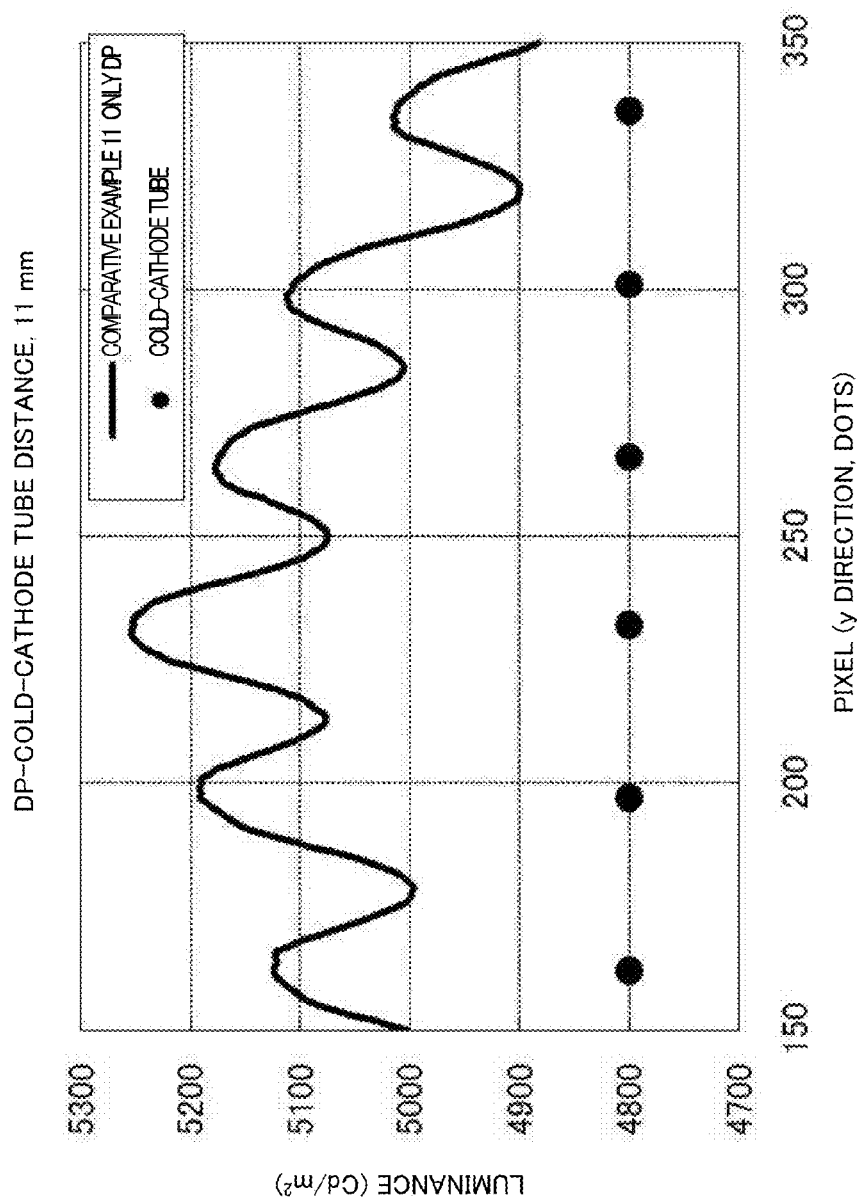
FIG. 35 is a graph to explain the luminance distribution of a sample as described in Comparative Example 11 when DP-cold-cathode tube is 11 mm and only DP is installed.
Figure 36:
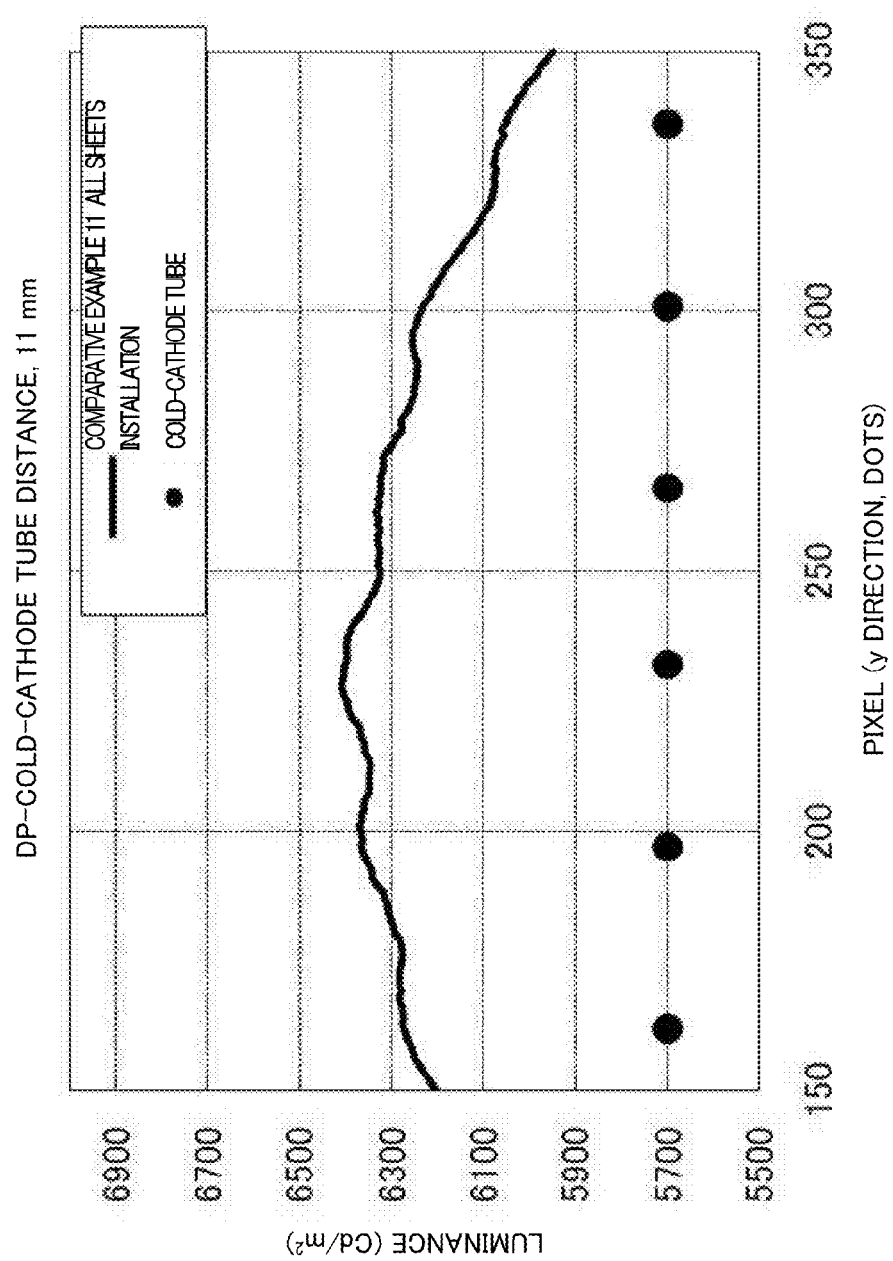
FIG. 36 is a graph to explain the luminance distribution of the sample as described in Comparative Example 11 when DP-cold-cathode tube is 11 mm and all sheets are installed.

Further, FIG. 35 shows the obtained luminance distribution graph. It is understood that the distribution has the maximum value of luminance immediately above each cold-cathode tube, while not having the maximum value of luminance in between adjacent cold-cathode tubes. FIG. 36 shows the luminance distribution graph with all the sheets installed, in the DP-cold-cathode tube distance of 11 mm. As can be seen from FIG. 36, in the case of all sheets installation, since areas immediately above the cold-cathode tubes were bright, it is understood that the lamp images remain.

Comparative Example 12

The reflecting sheet as described in Comparative Example 4 was installed in the backlight so that the A1 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0011, 0.0015, 0.0029, 0.0037 and 0.0057. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0112 and thus high.

Comparative Example 13

The reflecting sheet as described in Comparative Example 5 was installed in the backlight. Under the conditions that the DP-cold-cathode tube distance was 15 mm, 13 mm, 11 mm, 10 mm, and 9 mm, when lamp images were examined in all sheets installation, the results were 0.0008, 0.0013, 0.0026, 0.0034 and 0.0054. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0096 and thus high.

Comparative Example 14

The reflecting sheet as described in Comparative Example 6 was installed in the backlight. Under the conditions that the DP-cold-cathode tube distance was 15 mm, 13 mm, 11 mm, 10 mm, and 9 mm, when lamp images were examined in all sheets installation, the results were 0.0009, 0.0013, 0.0023, 0.0031 and 0.0054. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0080 and thus high.

Figure 37:
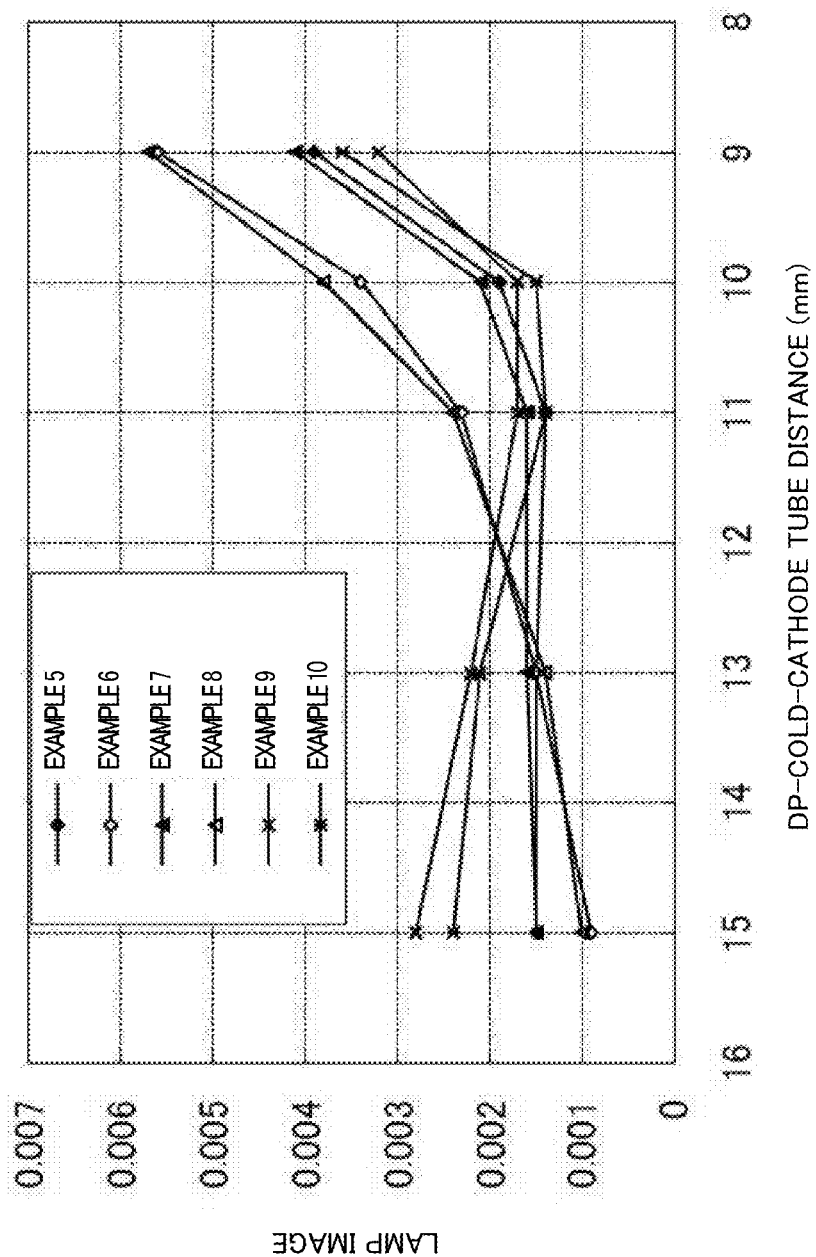
FIG. 37 is a graph illustrating the relationship between DP-cold-cathode tube distance and lamp image in all the samples as described in Examples 5 to 11.
Figure 38:
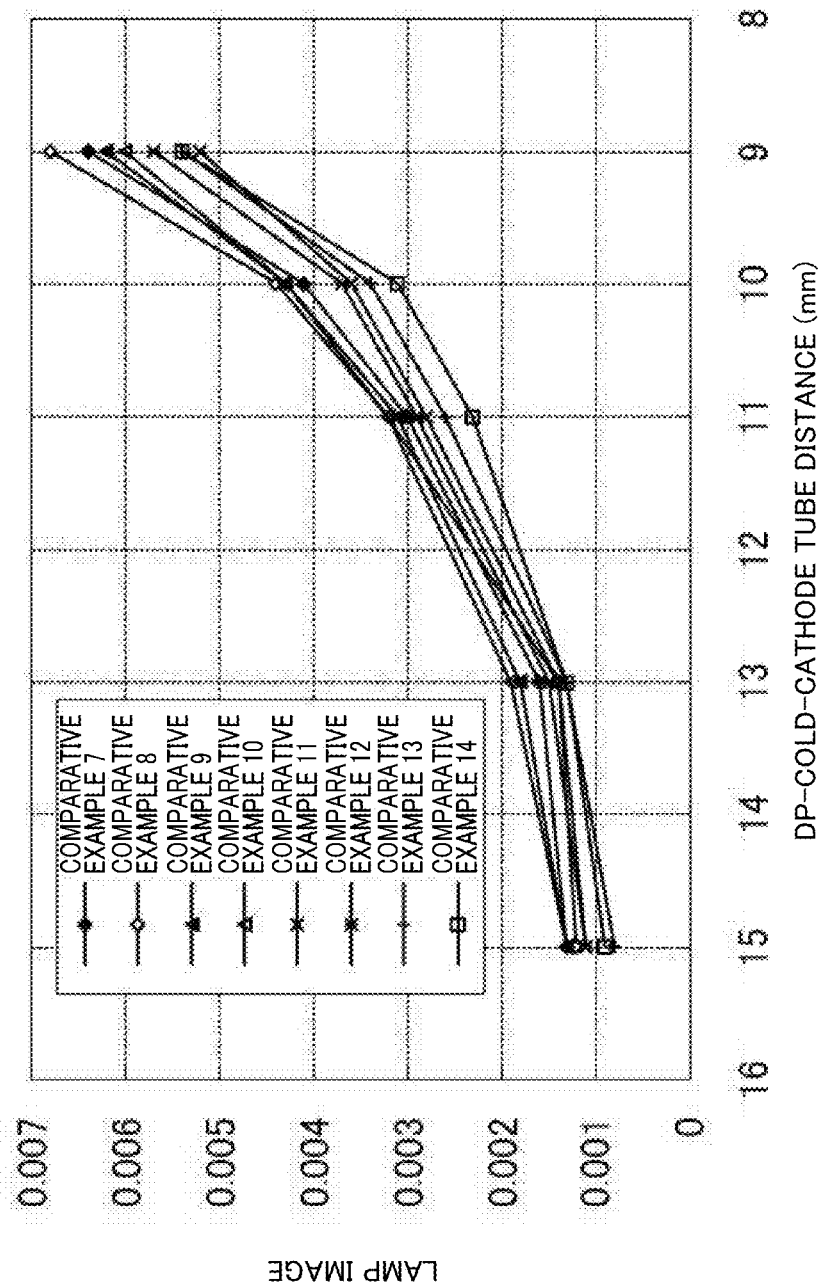
FIG. 38 is a graph illustrating the relationship between DP-cold-cathode tube distance and lamp image in all the samples as described in Comparative Examples 7 to 14.

As a result of the foregoing, Table 2 shows the obtained results together with the yellowing factor and average luminance. By installing the reflecting sheet of the invention so that the A1 direction (A'1 direction) of the reflecting sheet is orthogonal to the cold-cathode tubes, luminance between cold-cathode tubes is improved, and it is understood that it is possible to reduce lamp images in the diffuser-cold-cathode tube distance of 15 mm. Further, by installing the reflecting sheet of the invention so that the A2 direction (A'2 direction) of the reflecting sheet is orthogonal to the cold-cathode tubes, areas immediately above the cold-cathode tubes are darkened to provide the minimum value of luminance, and as a result, it is understood that it is possible to greatly reduce lamp images in the thin type backlight. As can be seen from Comparative Example 7, when the sheet does not have the surface layer portion, the ratio L1/L2 in the reflected light intensity is low, and it is understood that lamp images of the thin type backlight cannot be reduced. As can be seen from Comparative Example 9, even when the sheet has the surface layer portion, it is understood that lamp images of the thin type backlight cannot be reduced when the ratio L1/L2 in the reflected light intensity is low. FIGS. 37 and 38 show graphs where the value of lamp images in each DP-cold-cathode tube distance is plotted. It is understood that it is possible to suppress increases in the lamp image in the thin type backlight by installing the reflecting sheet of the invention so that the A2 direction (A'2 direction) of the sheet is orthogonal to the cold-cathode tubes.

Reflected Light Relative Intensity L'2 and Lamp Images of the Thin Type Backlight Described below are optical characteristics and thin type backlight evaluations of the reflecting sheets obtained in above-mentioned Examples 1 to 4 and Comparative Examples 1 to 6.

Example 11

Figure 39:
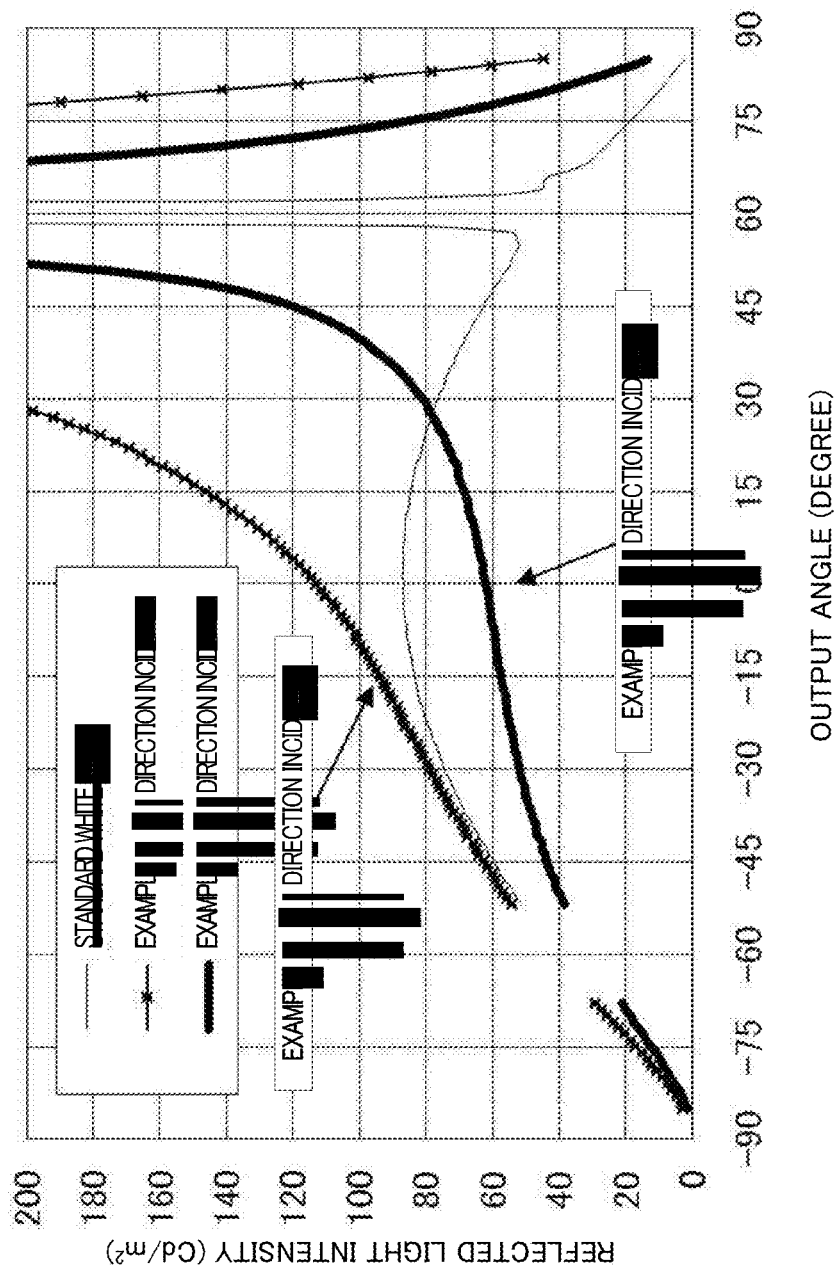
FIG. 39 is a graph showing the reflected light intensity distribution of a sample as described in Example 11.

When measurement of the reflected light relative intensity of the reflecting sheet as described in Example was performed using the Goniophotometer (Nippon Denshoku Industries Co., LTD., hereinafter referred to as GC5000L), A'1 was coincident with the B1 direction (TD) as described in Example 1, and A'2 was the B2 direction (MD) as described in Example 1. The reflected light relative intensity L'2 in the 0-degree direction was 69% and thus low, and it is understood that the reflected light with the light incident in the A'2 direction is low diffusion. Meanwhile, the reflected light relative intensity L'1 was 126% and thus high, and L'1/L'2 was 1.83. For reference, FIG. 39 shows the reflected light intensities with the light incident in the A'1 direction and with the light incident in the A'2 direction. It is understood that there is a significant difference in the reflected light intensity by the incident direction. In addition, in FIG. 39, the incident light is applied from the angle described as −60 degrees, and the high reflected light intensity around +60 degrees is derived from regular reflection.

Figure 40:
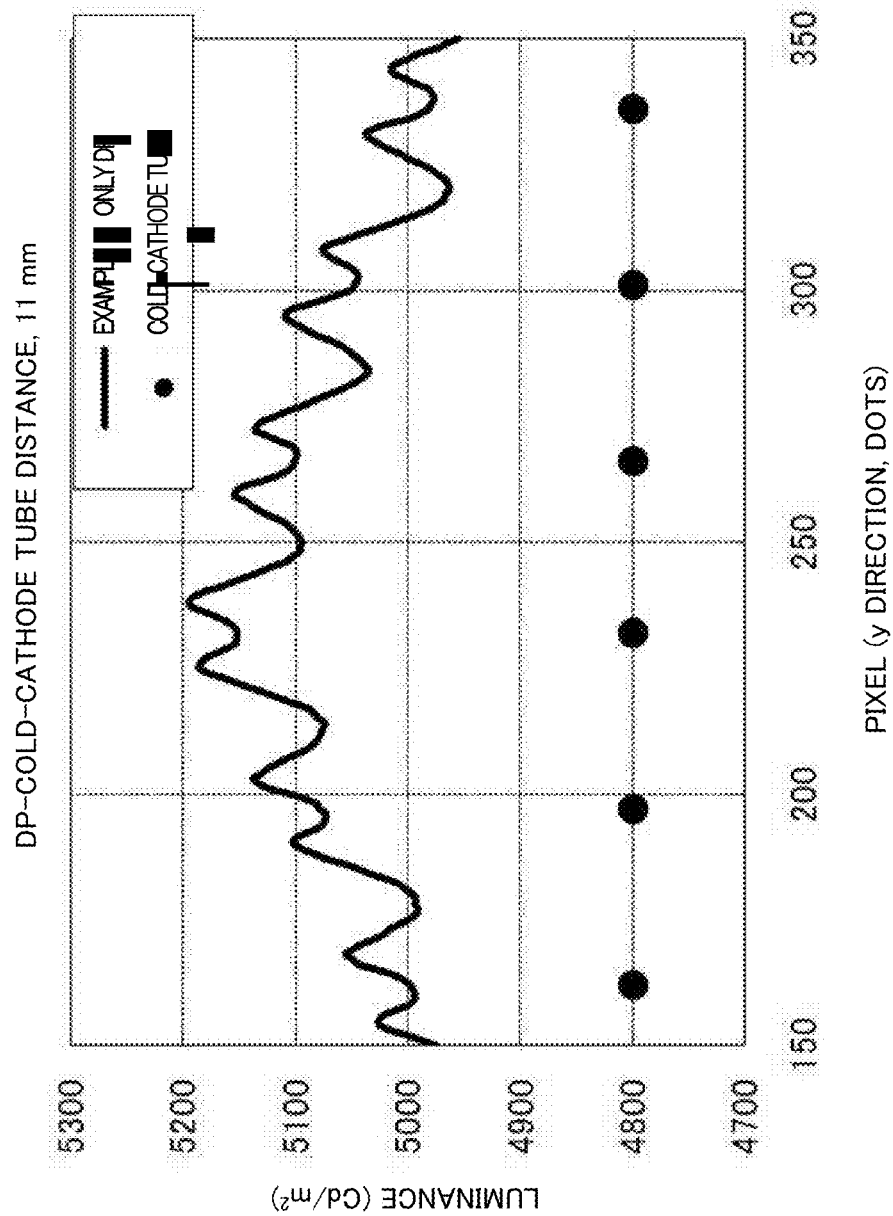
FIG. 40 is a graph to explain the luminance distribution of the sample as described in Example 11 when DP-cold-cathode tube is 11 mm and only DP is installed.
Figure 41:
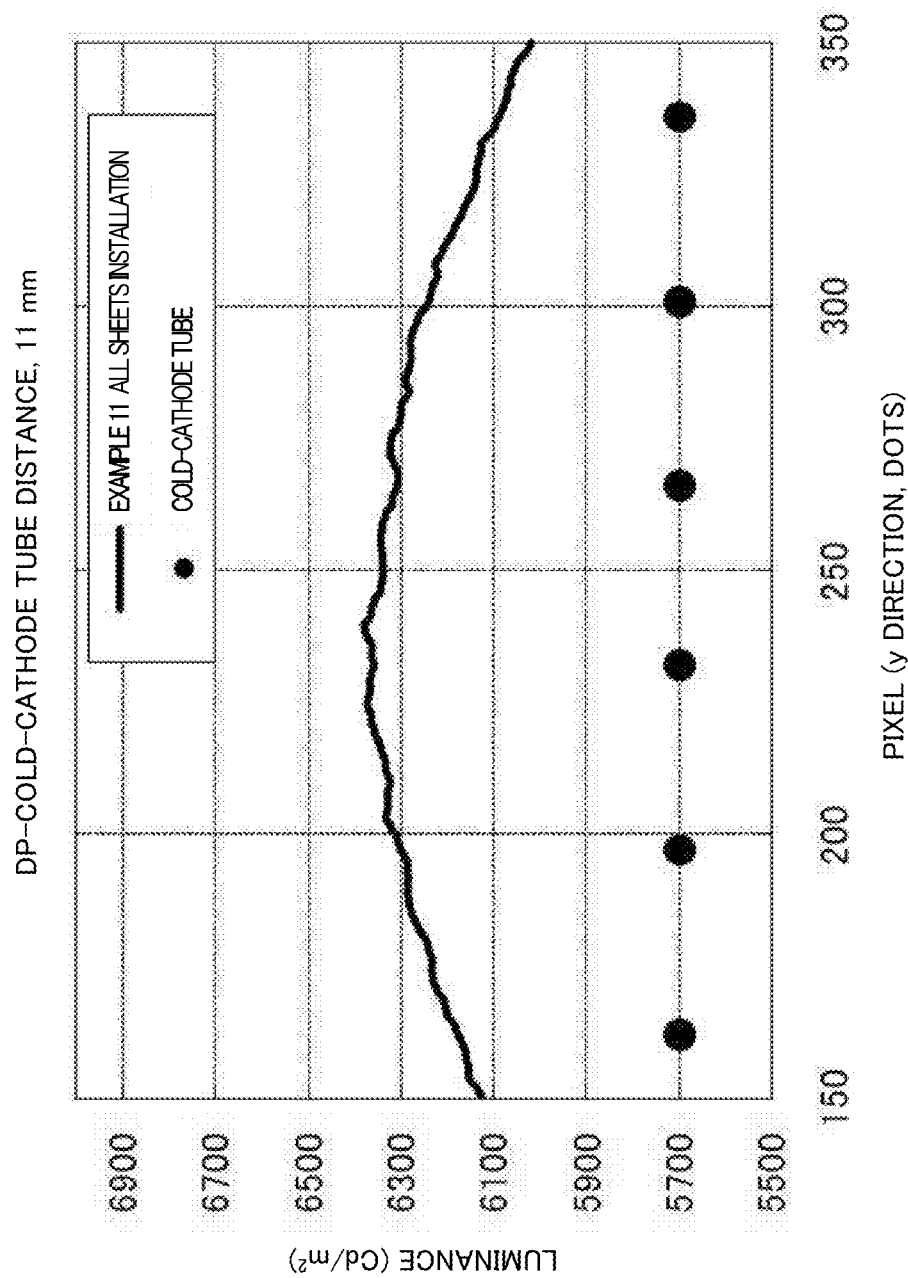
FIG. 41 is a graph to explain the luminance distribution of the sample as described in Example 11 when DP-cold-cathode tube is 11 mm and all sheets are installed.

The reflecting sheet was installed in the backlight so that the A'2 direction was orthogonal to the direction of the cold-cathode tubes. Under the conditions that the DP-cold-cathode tube distance was 15 mm, 13 mm, 11 mm, 10 mm, and 9 mm, when diffuser/DS/prism sheet/reflection type polarization sheet were installed (hereinafter, all sheets installation) and lamp images were examined, the results were 0.0015, 0.0015, 0.0014, 0.0019 and 0.0039. When the DP-cold-cathode tube distance was decreased, increases in the lamp images were moderate, and even under the thin backlight condition such that the DP-cold-cathode tube distance was 11 mm, the lamp images showed the low value. Further, when the DP-cold-cathode tube distance was 11 mm, only the diffuser was installed, and the lamp images were examined, the result was 0.0055 and thus low. FIG. 40 shows the obtained luminance distribution graph. It is understood that the distribution has the minimum value of luminance immediately above each cold-cathode tube, while having two maximum values of luminance in between adjacent cold-cathode tubes. Further, FIG. 41 shows the luminance distribution graph in all sheets installation. As can be seen from FIG. 41, in the case of all sheets installation, areas immediately above the cold-cathode tubes were not lightened, and it is understood that the lamp images are remarkably reduced.

Figure 42:
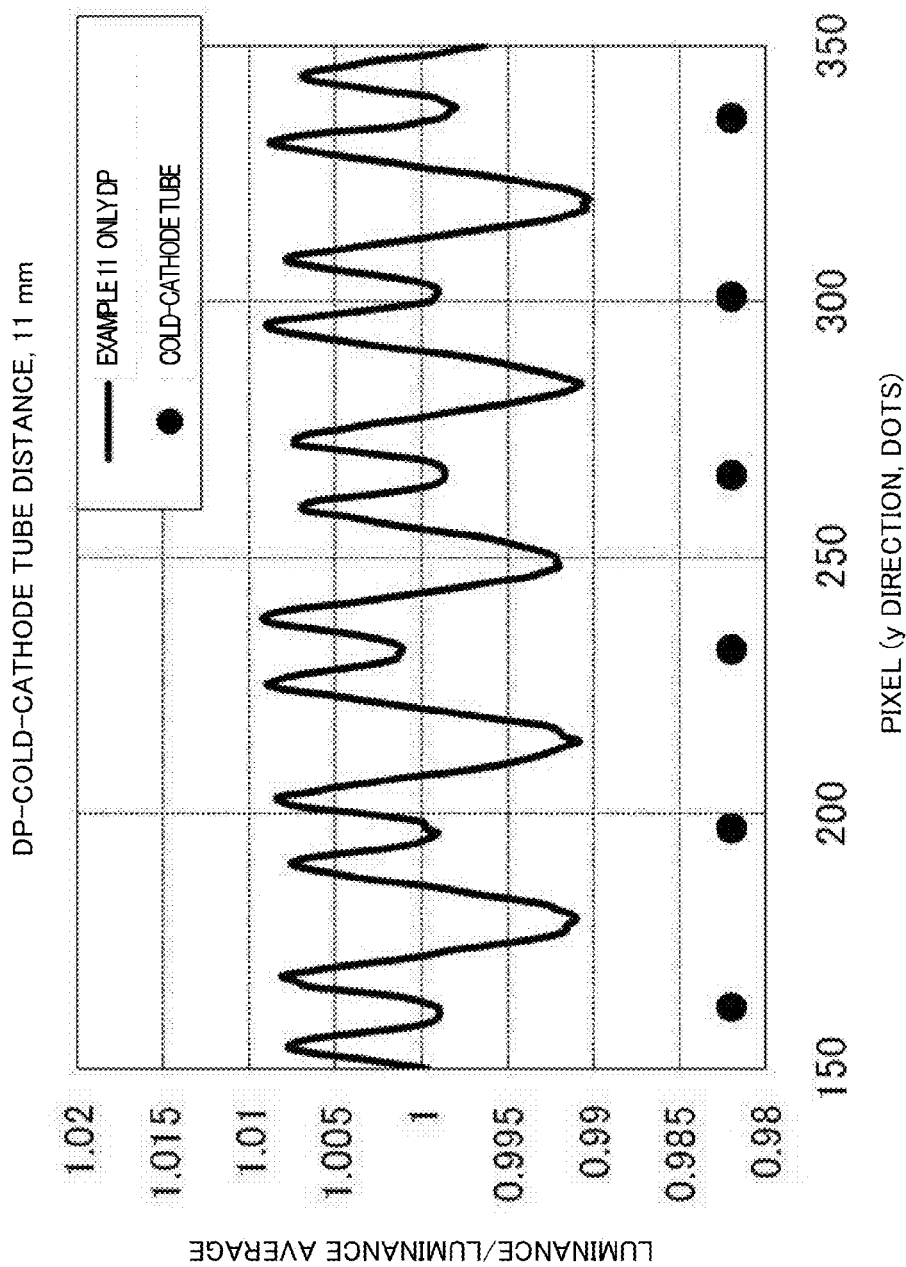
FIG. 42 is a graph to explain lamp images of the sample as described in Example 11 when DP-cold-cathode tube is 11 mm and only DP is installed.
Figure 43:
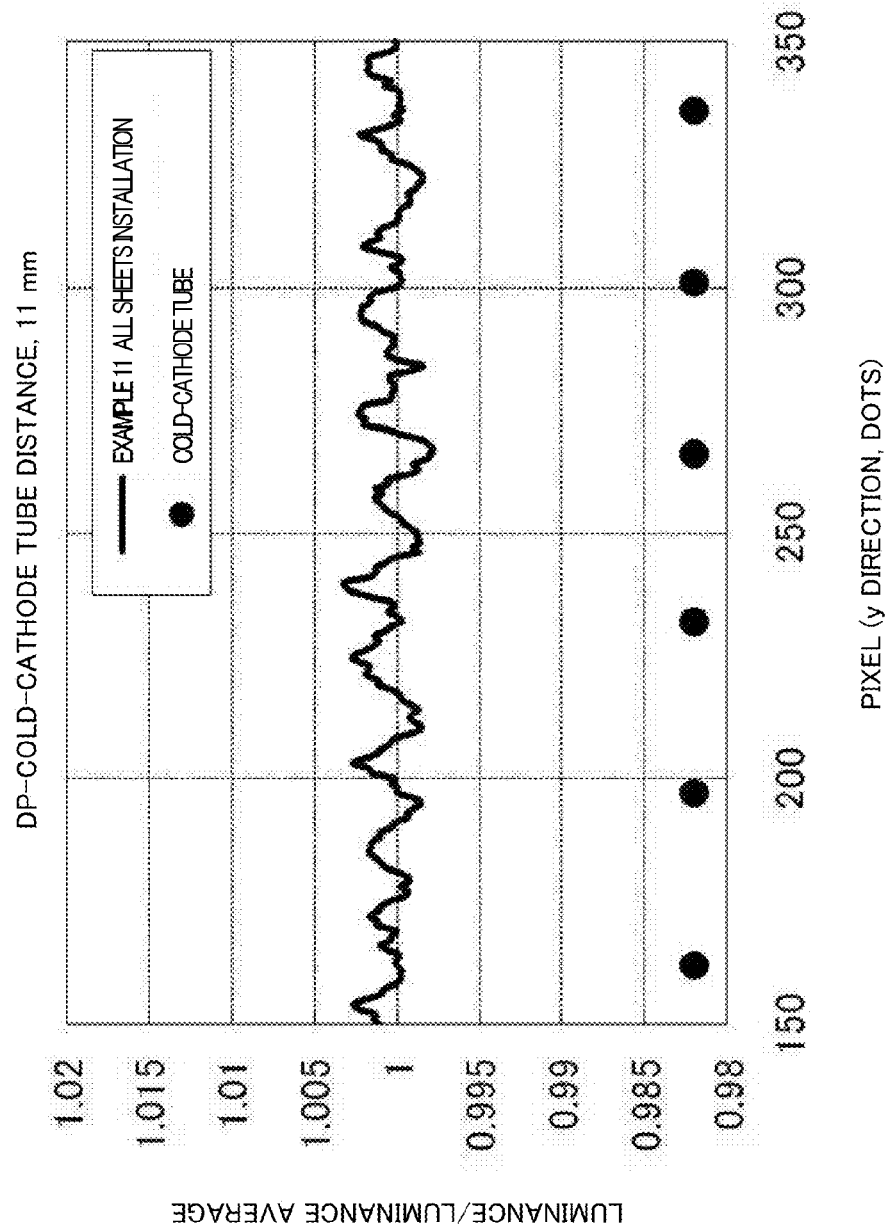
FIG. 43 is a graph to explain lamp images of the sample as described in Example 11 when DP-cold-cathode tube is 11 mm and all sheets are installed.

Further, FIG. 42 shows the lamp image graph with only the diffuser installed, and FIG. 43 shows the lamp image graph with all the sheets installed, in the DP-cold-cathode tube distance of 11 mm. As can be seen from FIG. 42, in the case of only the diffuser, areas immediately above the cold-cathode tubes were darkened. Further, as can be seen from FIG. 43, in the case of all sheets installation, areas immediately above the cold-cathode tubes were not lightened, and it is understood that the lamp images are remarkably reduced. The reason is considered that by installing the reflecting sheet of Example 1 so that the MD direction where the reflected light relative intensity is 69% of the standard white plate and low diffusion is orthogonal to the cold-cathode tubes, areas immediately above the cold-cathode tubes can be darkened, and that the lamp images are thereby controlled to be low.

Example 12

When measurement of the reflected light relative intensity of the reflecting sheet as described in Example 2 was performed using the GC5000L, A'1 was coincident with the B1 direction (TD), and A'2 was the B2 direction (MD). The reflected light relative intensity L'2 in the 0-degree direction was 64% and thus low, and it is understood that the reflected light with the light incident in the A'2 direction is low diffusion. Meanwhile, L'1 was 121% and thus high, and L'1/L'2 was 1.89.

Figure 44:
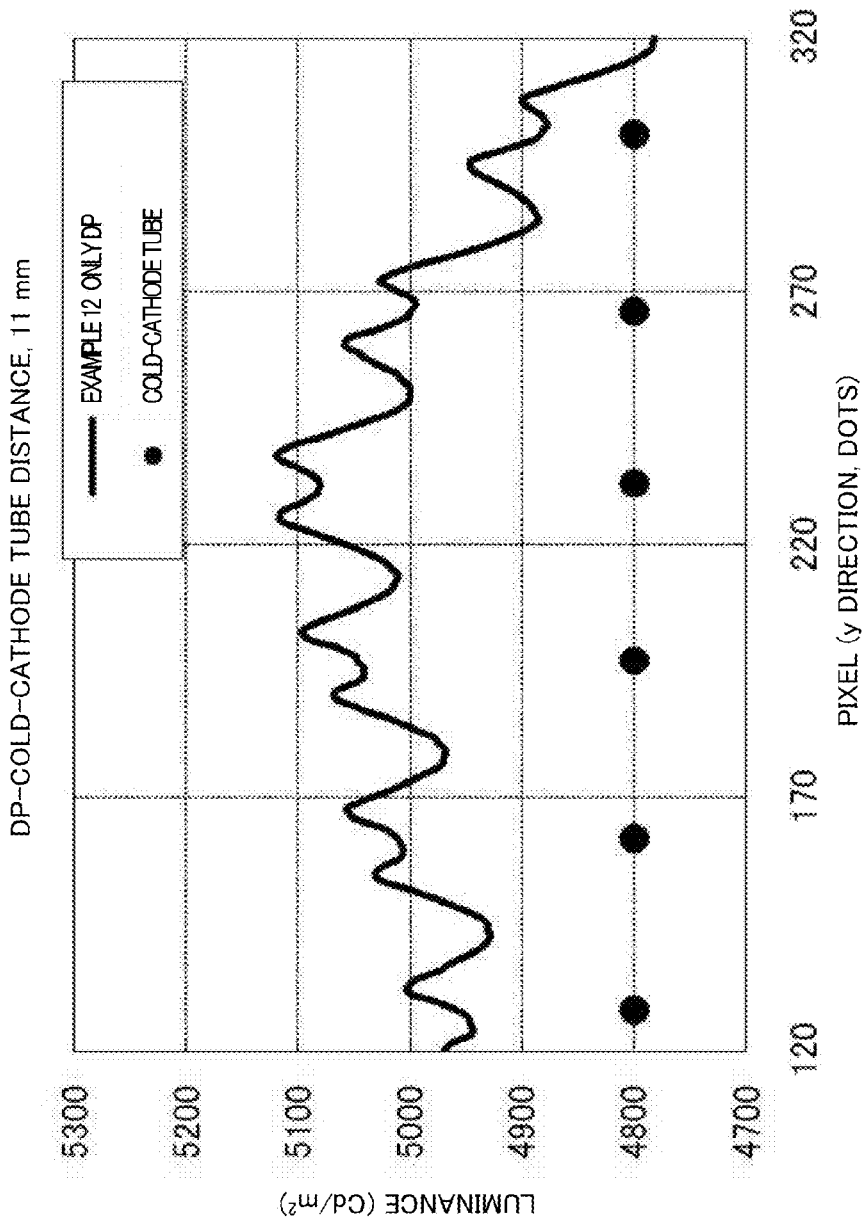
FIG. 44 is a graph to explain the luminance distribution of a sample as described in Example 12 when DP-cold-cathode tube is 11 mm and only DP is installed.
Figure 45:
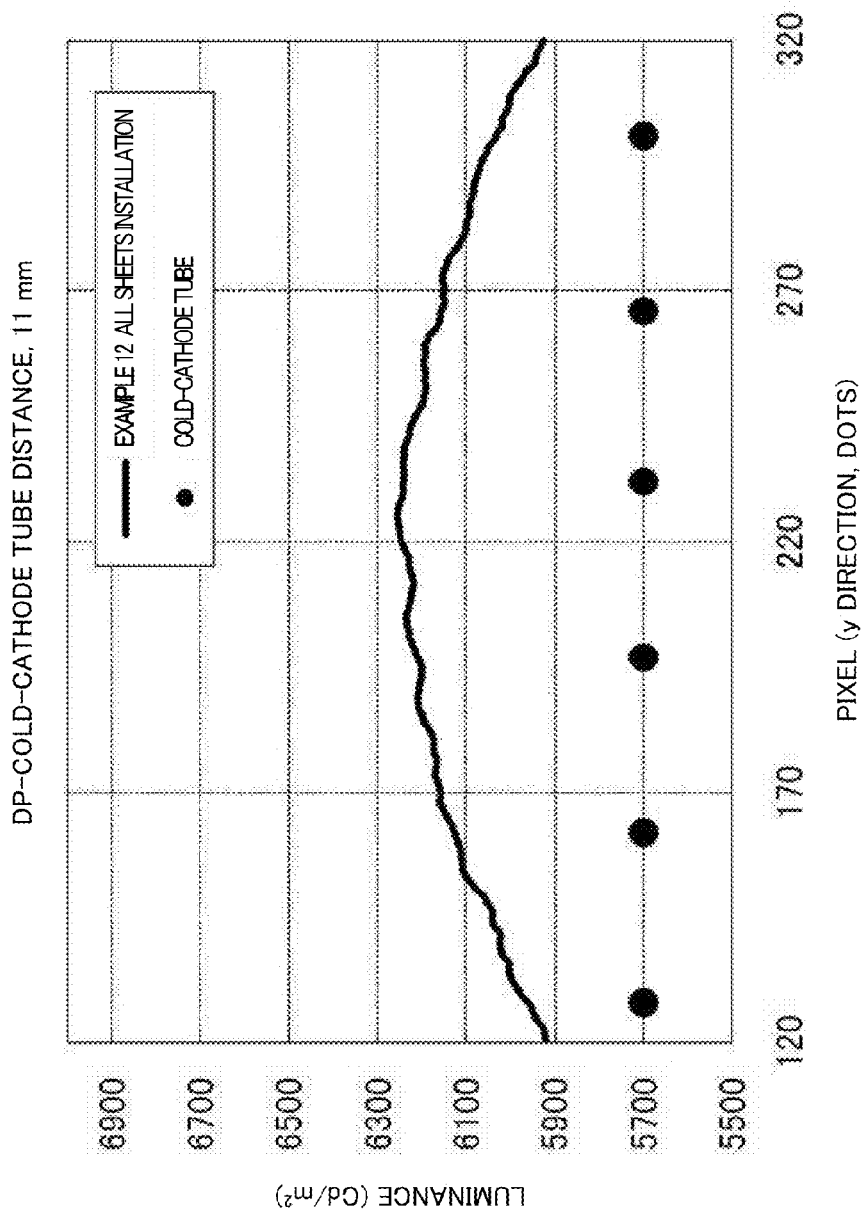
FIG. 45 is a graph to explain the luminance distribution of the sample as described in Example 12 when DP-cold-cathode tube is 11 mm and all sheets are installed.

The reflecting sheet as described in Example 2 was installed in the backlight so that the A'2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0015, 0.0016, 0.0016, 0.0021 and 0.0041. When the DP-cold-cathode tube distance was decreased, increases in the lamp images were moderate, and in the DP-cold-cathode tube distance of 11 mm, the lamp images showed the low value. Further, when the DP-cold-cathode tube distance was 11 mm, only the diffuser was installed, and the lamp images were examined, the result was 0.0059 and thus low. FIG. 44 shows the obtained luminance distribution graph. It is understood that the distribution has the minimum value of luminance immediately above each cold-cathode tube, while having two maximum values of luminance in between adjacent cold-cathode tubes. Further, FIG. 45 shows the luminance distribution graph in all sheets installation. As can be seen from FIG. 45, in the case of all sheets installation, areas immediately above the cold-cathode tubes were not lightened, and it is understood that the lamp images are remarkably reduced.

Example 13

Figure 46:
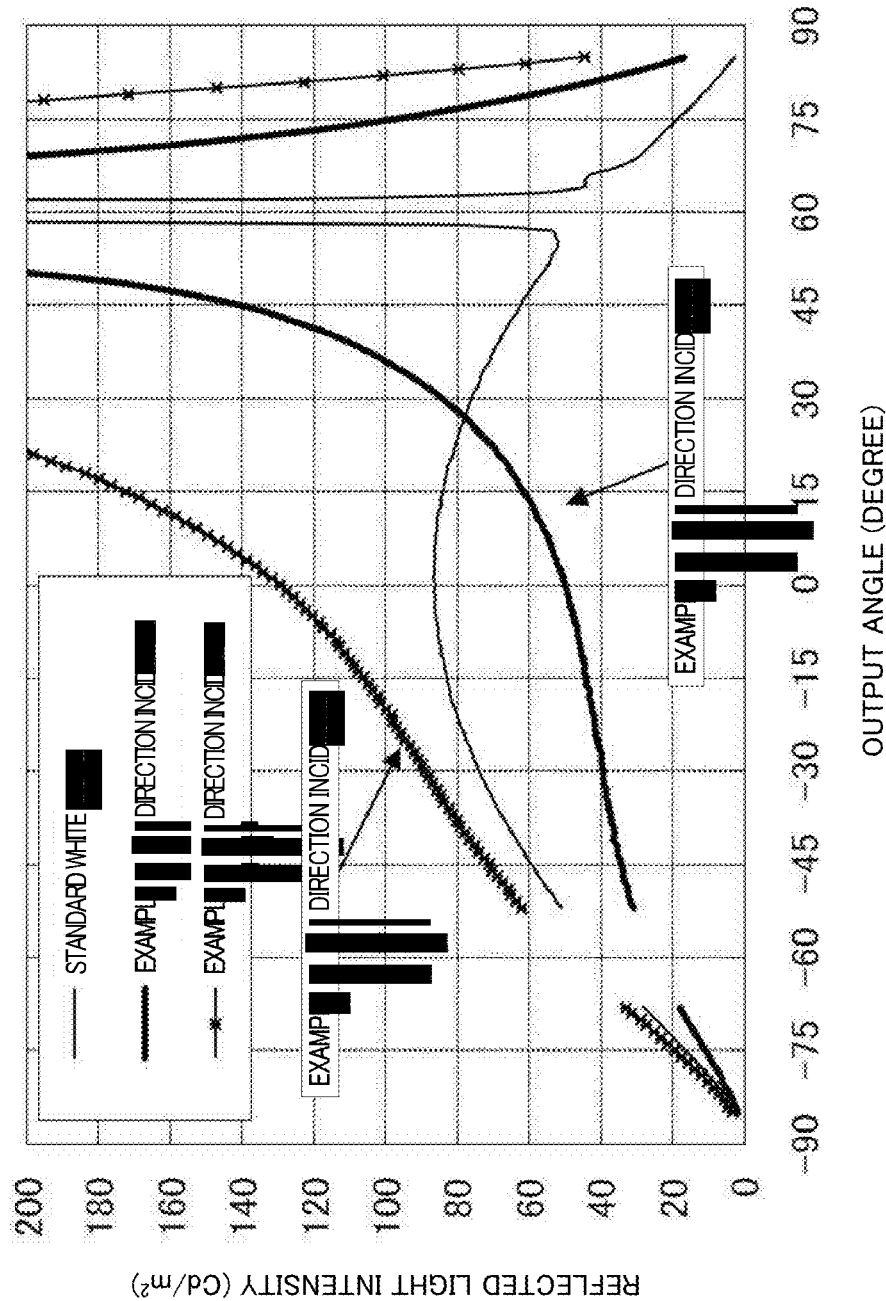
FIG. 46 is a graph showing the reflected light intensity distribution of a sample as described in Example 13.

When measurement of the reflected light relative intensity of the reflecting sheet as described in Example 3 was performed using the GC5000L, A'1 was coincident with the B1 direction (TD), and A'2 was the B2 direction (MD). The reflected light relative intensity L'2 in the 0-degree direction was 55% and thus low, and it is understood that the reflected light with the light incident in the A'2 direction is low diffusion. Meanwhile, L'1 was 142% and thus high, and L'1/L'2 was 2.58. For reference, FIG. 46 shows the reflected light intensities with the light incident in the A'1 direction and with the light incident in the A'2 direction. It is understood that there is a significant difference in the reflected light intensity by the incident direction. In addition, in FIG. 46, the incident light is applied from the angle described as −60 degrees, and the high reflected light intensity around +60 degrees is derived from regular reflection.

The reflecting sheet was installed in the backlight so that the A'2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0028, 0.0022, 0.0017, 0.0017 and 0.0032. When the DP-cold-cathode tube distance was decreased, increases in the lamp images were moderate, and in the DP-cold-cathode tube distance of 11 mm, the lamp images showed the low value. Further, when the DP-cold-cathode tube distance was 11 mm, only the diffuser was installed, and the lamp images were examined, the result was 0.0058 and thus low.

Example 14

When measurement of the reflected light relative intensity of the reflecting sheet as described in Example 4 was performed using the GC5000L, A'1 was coincident with the extrusion transverse direction (TD), and A'2 was coincident with the extrusion direction (MD). The reflected light relative intensity L'2 in the 0-degree direction was 60% and thus low, and it is understood that the reflected light with the light incident in the A'2 direction is low diffusion. Meanwhile, L'1 was 152% and thus high, and L'1/L'2 was 2.53.

The reflecting sheet was installed in the backlight so that the A'2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0024, 0.0021, 0.0014, 0.0015 and 0.0036. As the DP-cold-cathode tube distance was decreased, the lamp images were improved, and in the DP-cold-cathode tube distance of 10 mm, the lamp images were of 0.0015 and showed the low value. However, when the DP-cold-cathode tube distance was 9 mm and thus decreased, the lamp images tended to increase. Further, when the DP-cold-cathode tube distance was 11 mm, only the diffuser was installed, and the lamp images were examined, the result was 0.0048 and thus low.

Comparative Example 15

When measurement of the reflected light relative intensity of the reflecting sheet as described in Comparative Example 1 was performed using the GC5000L, A'1 was coincident with the B1 direction (TD), and A'2 was the B2 direction (MD). The reflected light relative intensity L'2 in the 0-degree direction was 79%. In addition, L'1 was 108%, and L'1/L'2 was 1.37.

The reflecting sheet was installed in the backlight so that the A'2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0013, 0.0016, 0.0030, 0.0041 and 0.0064. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0101 and thus high.

Comparative Example 16

When measurement of the reflected light relative intensity of the reflecting sheet as described in Comparative Example 3 was performed using the GC5000L, A'1 was coincident with the B1 direction (TD), and A'2 was the B2 direction (MD). The reflected light relative intensity L'2 in the 0-degree direction was 92%. In addition, L'1 was 93%, and L'1/L'2 was 1.01.

Figure 47:
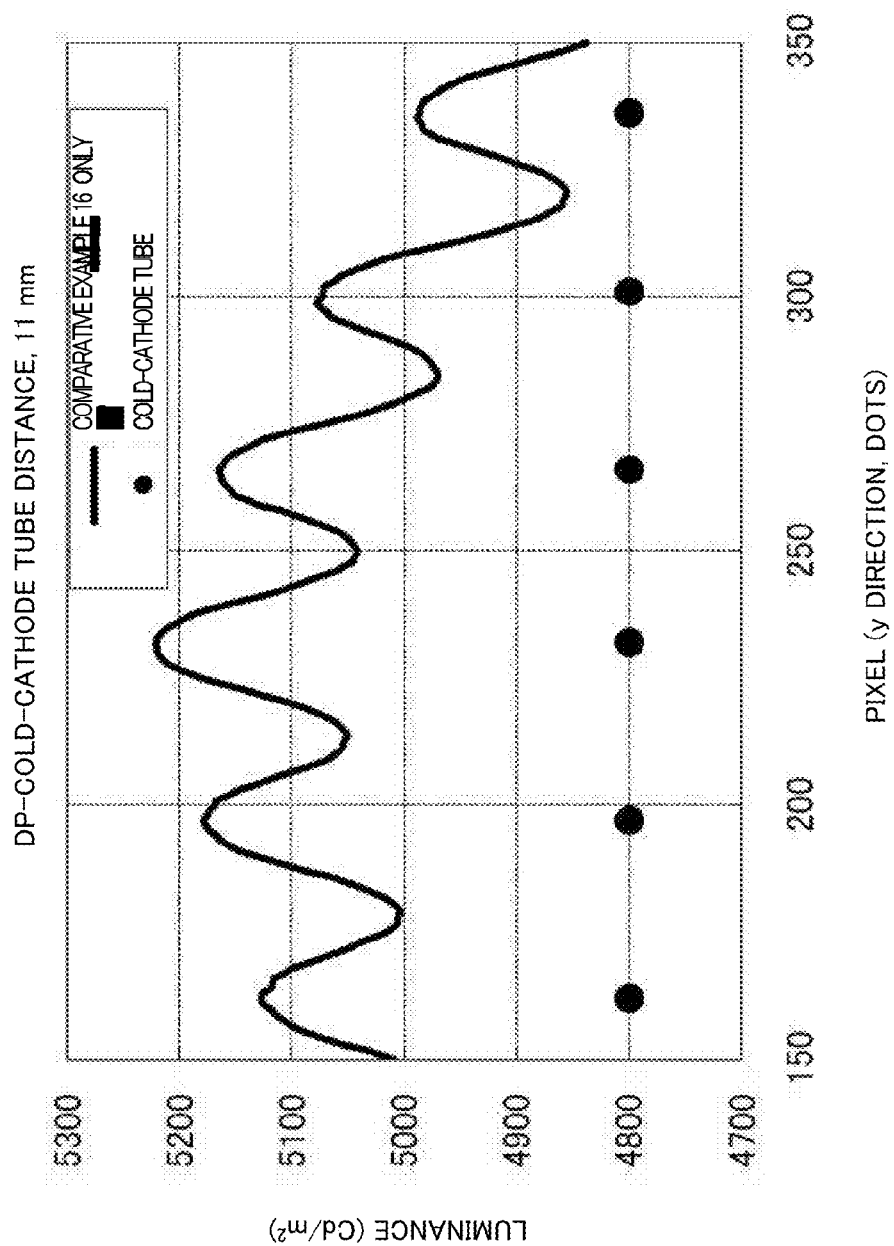
FIG. 47 is a graph to explain the luminance distribution of a sample as described in Comparative Example 16 when DP-cold-cathode tube is 11 mm and only DP is installed.
Figure 48:
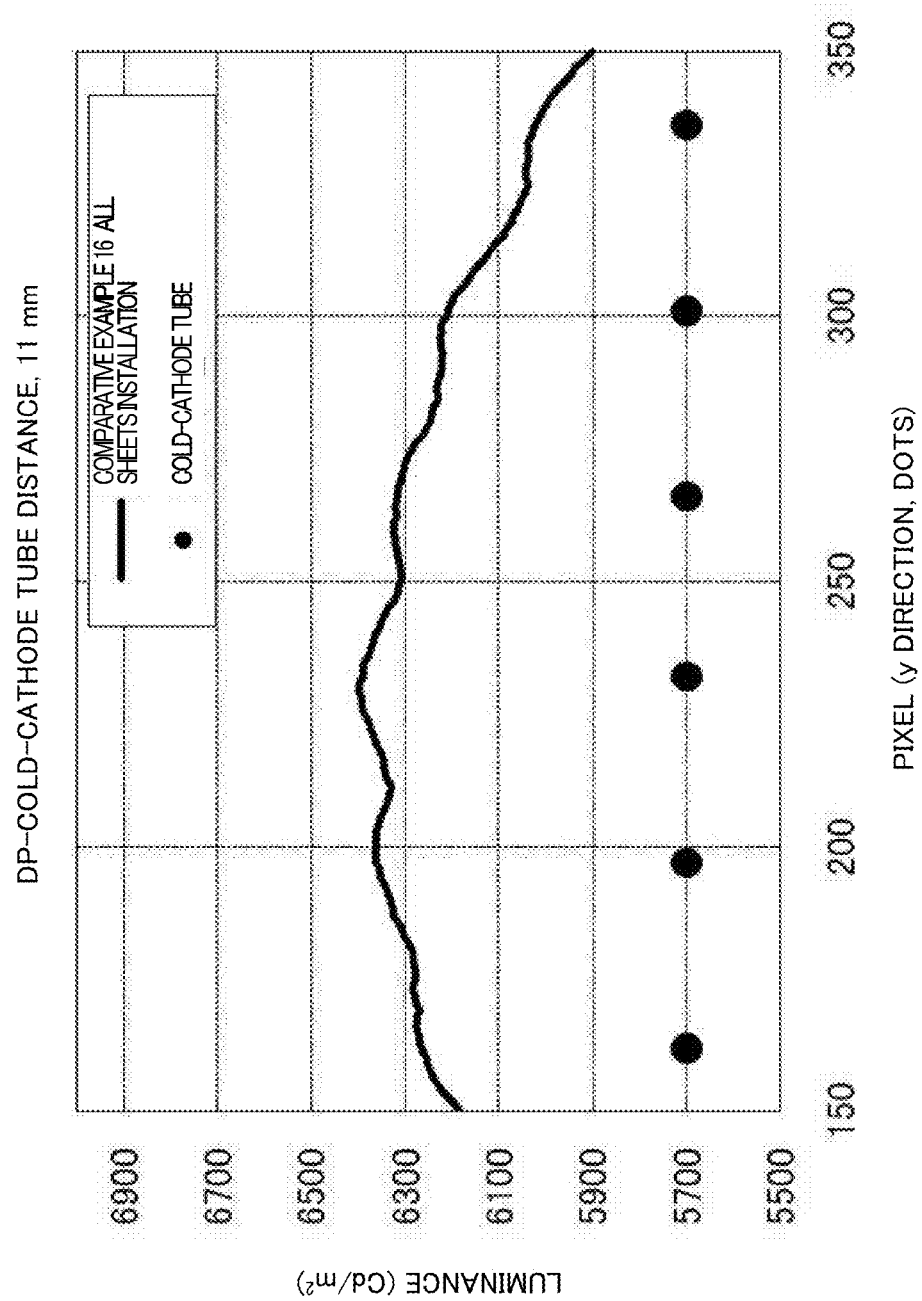
FIG. 48 is a graph to explain the luminance distribution of the sample as described in Comparative Example 16 when DP-cold-cathode tube is 11 mm and all sheets are installed.

The reflecting sheet was installed in the backlight so that the A2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0013, 0.0018, 0.0031, 0.0043 and 0.0062. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0113 and thus high. FIG. 47 shows the obtained luminance distribution graph. It is understood that the distribution has the maximum value of luminance immediately above each cold-cathode tube, while not having the maximum value of luminance in between adjacent cold-cathode tubes. Further, FIG. 48 shows the luminance distribution graph with all the sheets installed, in the DP-cold-cathode tube distance of 11 mm. As can be seen from FIG. 48, in the case of all sheets installation, since areas immediately above the cold-cathode tubes were bright, it is understood that the lamp images remain.

Figure 49:
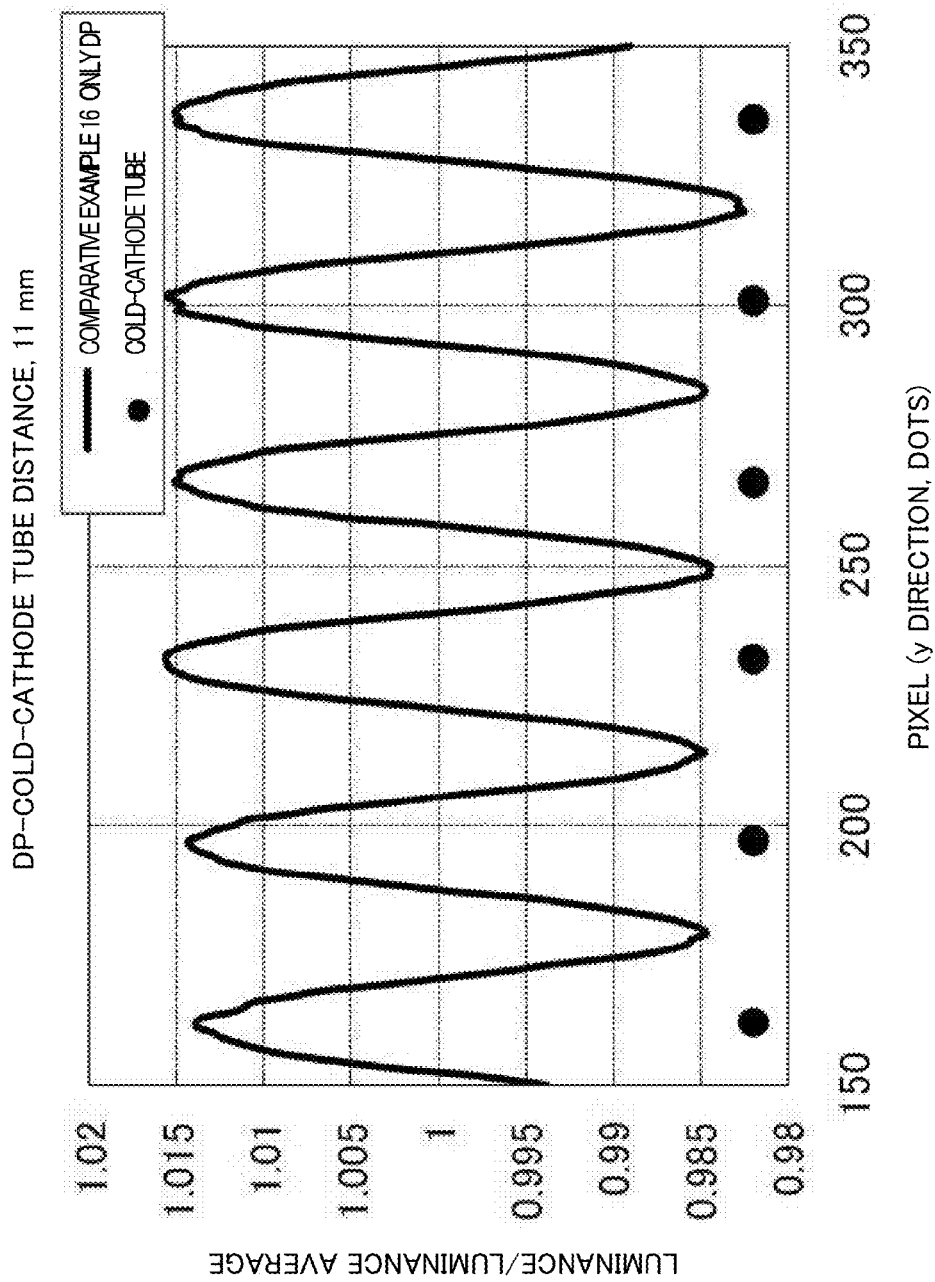
FIG. 49 is a graph to explain lamp images of the sample as described in Comparative Example 16 when DP-cold-cathode tube is 11 mm and only DP is installed.
Figure 50:
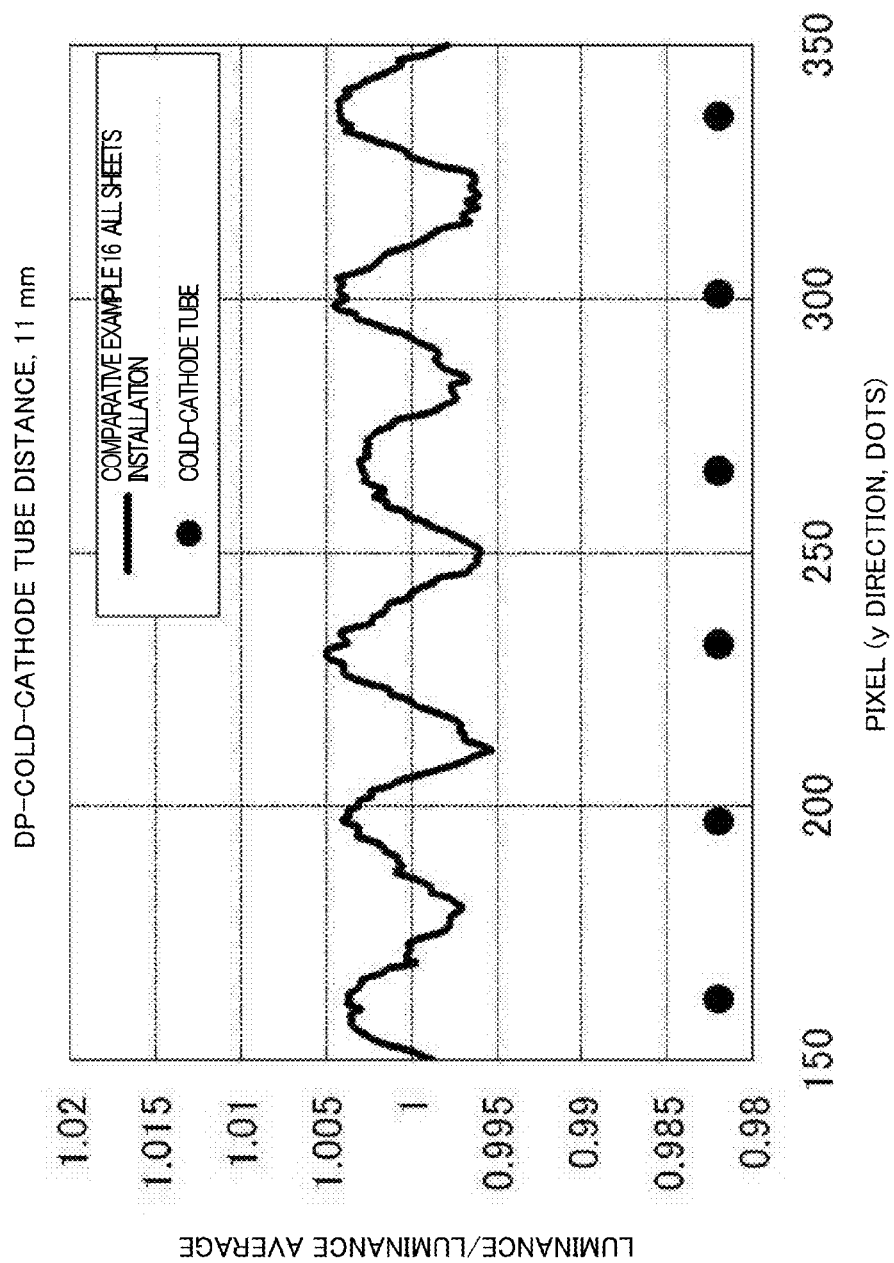
FIG. 50 is a graph to explain lamp images of the sample as described in Comparative Example 16 when DP-cold-cathode tube is 11 mm and all sheets are installed.

Further, FIG. 49 shows the lamp image graph with only the diffuser installed, and FIG. 50 shows the lamp image graph with all the sheets installed, in the DP-cold-cathode tube distance of 11 mm. As can be seen from FIG. 49, in the case of only the diffuser, areas immediately above the cold-cathode tubes were extremely bright. Further, as can be seen from FIG. 50, in the case of all sheets installation, since areas immediately above the cold-cathode tubes were bright, the lamp images remained.

Comparative Example 17

Figure 51:
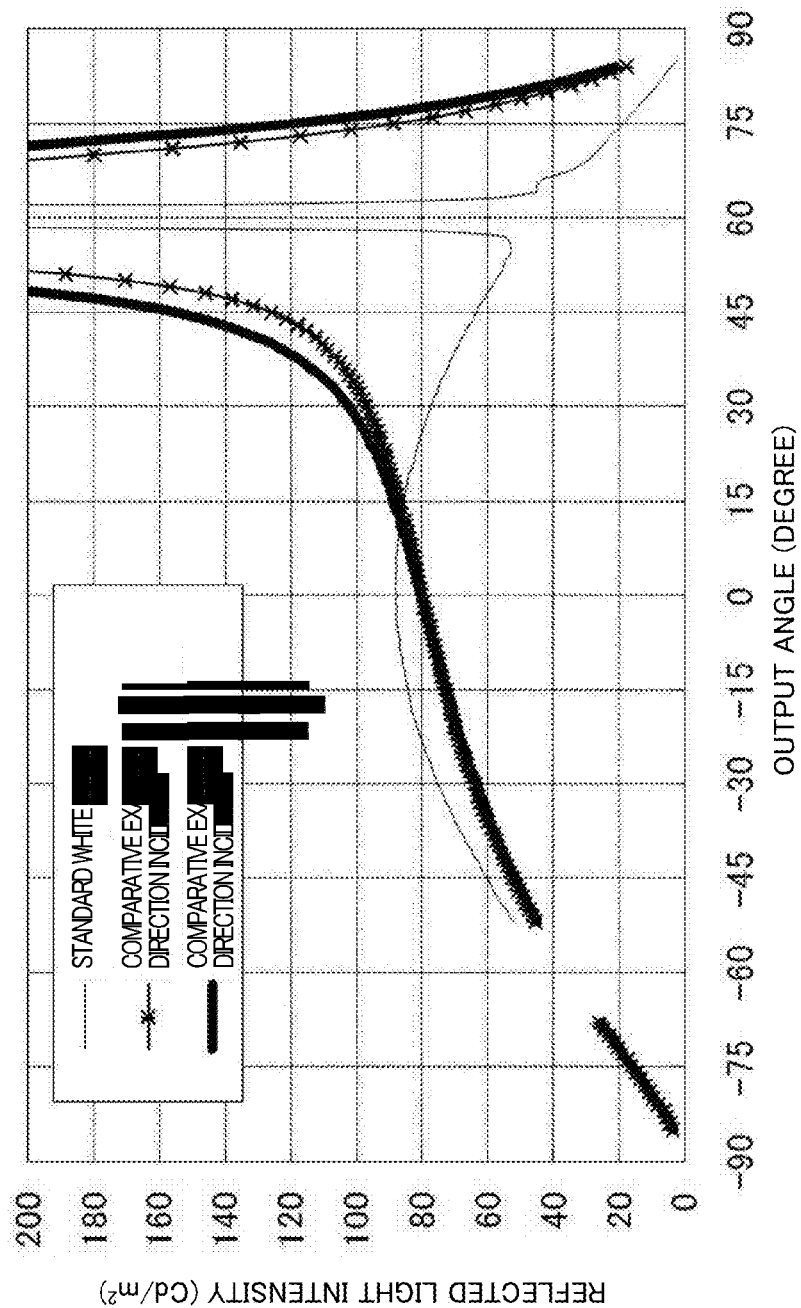
FIG. 51 is a graph showing the reflected light intensity distribution of a sample as described in Comparative Example 17.

The measurement of the reflected light relative intensity using the GC5000L was performed on the reflecting sheet as described in Comparative Example 4, and the reflected light intensity in the 0-degree direction when the light was incident at an incident angle of 60 degrees was measured while varying the incident direction. The reflected light relative intensity L'2 in the 0-degree direction was 88%. Meanwhile, L'1 was 89%, and L'1/L'2 was 1.01. For reference, FIG. 51 shows the reflected light intensity obtained in the GC5000L. As compared with FIG. 39, it is understood that the reflected light intensity in the 0-degree direction is almost the same irrespective of the incident direction.

The reflecting sheet was installed in the backlight so that the A2 direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0011, 0.0014, 0.0028, 0.0036 and 0.0052. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0108 and thus high.

Figure 52:
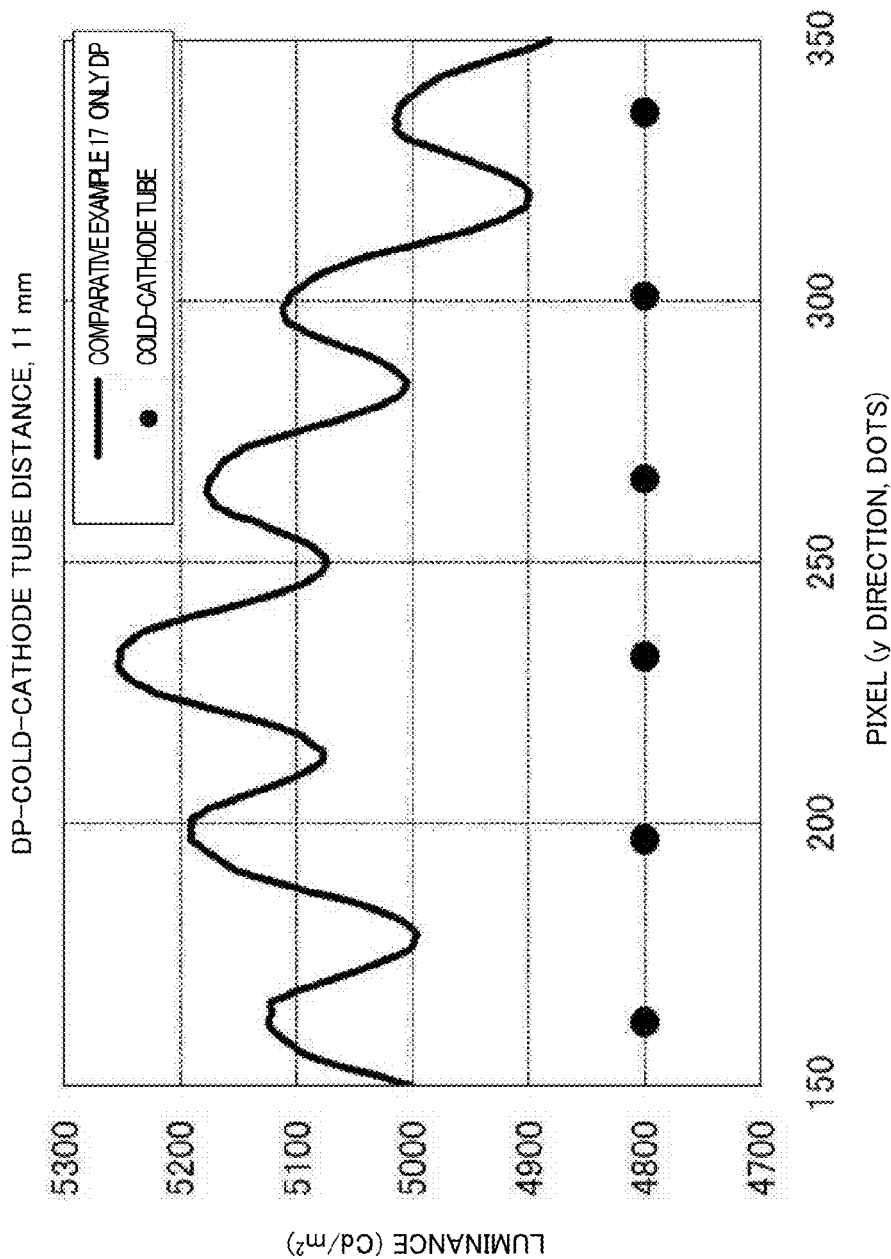
FIG. 52 is a graph to explain the luminance distribution of the sample as described in Comparative Example 17 when DP-cold-cathode tube is 11 mm and only DP is installed.
Figure 53:
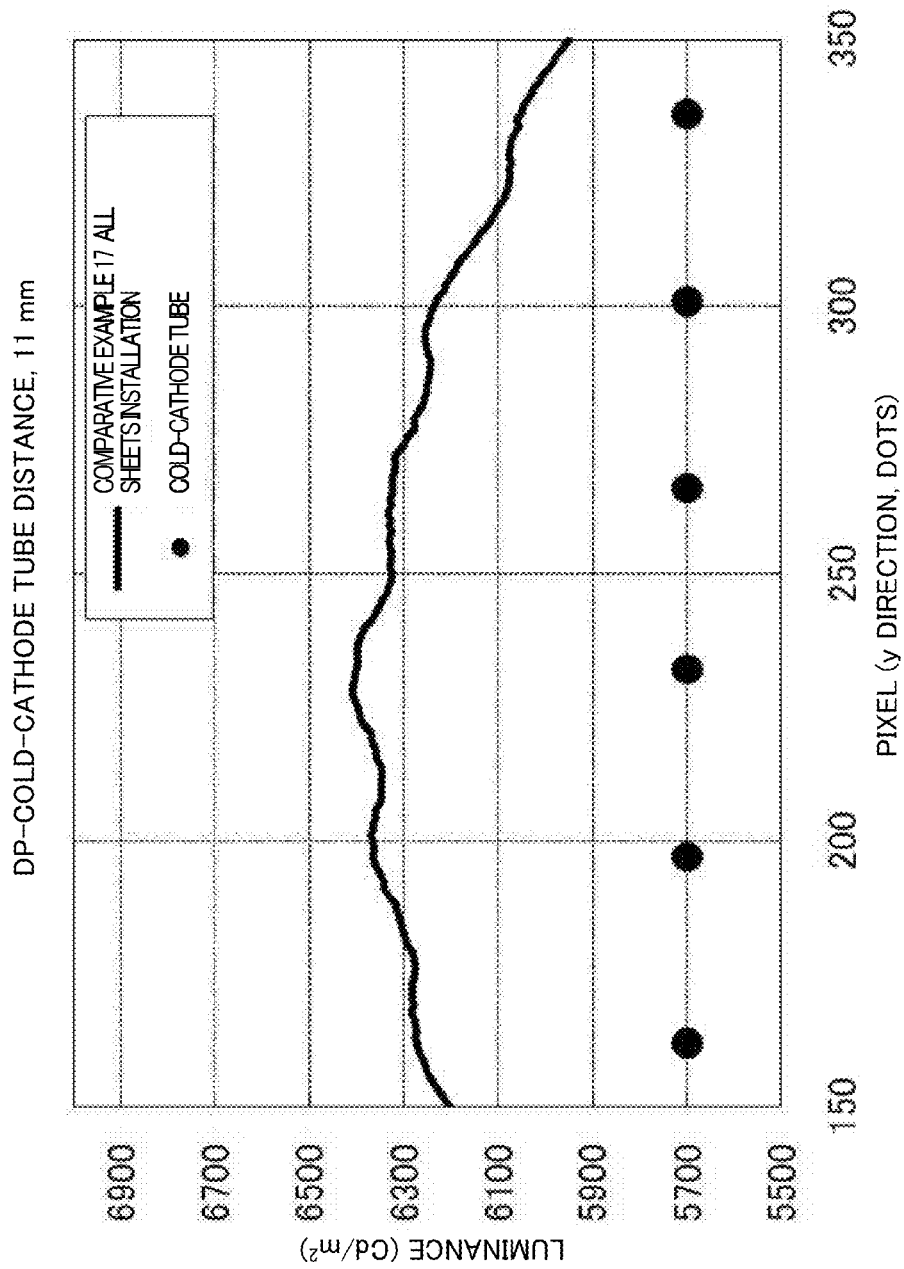
FIG. 53 is a graph to explain the luminance distribution of the sample as described in Comparative Example 17 when DP-cold-cathode tube is 11 mm and all sheets are installed.

Further, FIG. 52 shows the obtained luminance distribution graph. It is understood that the distribution has the maximum value of luminance immediately above each cold-cathode tube, while not having the maximum value of luminance in between adjacent cold-cathode tubes. FIG. 53 shows the luminance distribution graph with all the sheets installed, in the DP-cold-cathode tube distance of 11 mm. As can be seen from FIG. 53, in the case of all sheets installation, since areas immediately above the cold-cathode tubes were bright, it is understood that the lamp images remain.

Comparative Example 18

The measurement of the reflected light relative intensity using the GC5000L was performed on the reflecting sheet as described in Comparative Example 5, the reflected light intensity in the 0-degree direction when the light was incident at an incident angle of 60 degrees was measured while varying the incident direction, but the reflected light intensity in the 0-degree direction was not changed, and the reflected light relative intensities L'1 and L'2 in the 0-degree direction were both 81%. As a result, L'1/L'2 was 1.00.

The reflecting sheet was installed in the backlight. Under the conditions that the DP-cold-cathode tube distance was 15 mm, 13 mm, 11 mm, 10 mm, and 9 mm, when lamp images were examined in all sheets installation, the results were 0.0008, 0.0013, 0.0026, 0.0034 and 0.0054. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0096 and thus high.

Comparative Example 19

The measurement of the reflected light relative intensity using the GC5000L was performed on the reflecting sheet as described in Comparative Example 6, the reflected light intensity in the 0-degree direction when the light was incident at an incident angle of 60 degrees was measured while varying the incident direction, but the reflected light intensity in the 0-degree direction was not changed, and the reflected light relative intensities L'1 and L'2 in the 0-degree direction were both 81%. As a result, L'1/L'2 was 1.00.

The reflecting sheet was installed in the backlight. Under the conditions that the DP-cold-cathode tube distance was 15 mm, 13 mm, 11 mm, 10 mm, and 9 mm, when lamp images were examined in all sheets installation, the results were 0.0009, 0.0013, 0.0023, 0.0031 and 0.0054. As the DP-cold-cathode tube distance was decreased, the lamp images increased, and in the DP-cold-cathode tube distance of 11 mm, the lamp images showed a high value. Further, when the DP-cold-cathode tube distance was 11 mm, only the diffuser was installed, and the lamp images were examined, the result was 0.0080 and thus high.

Figure 54:
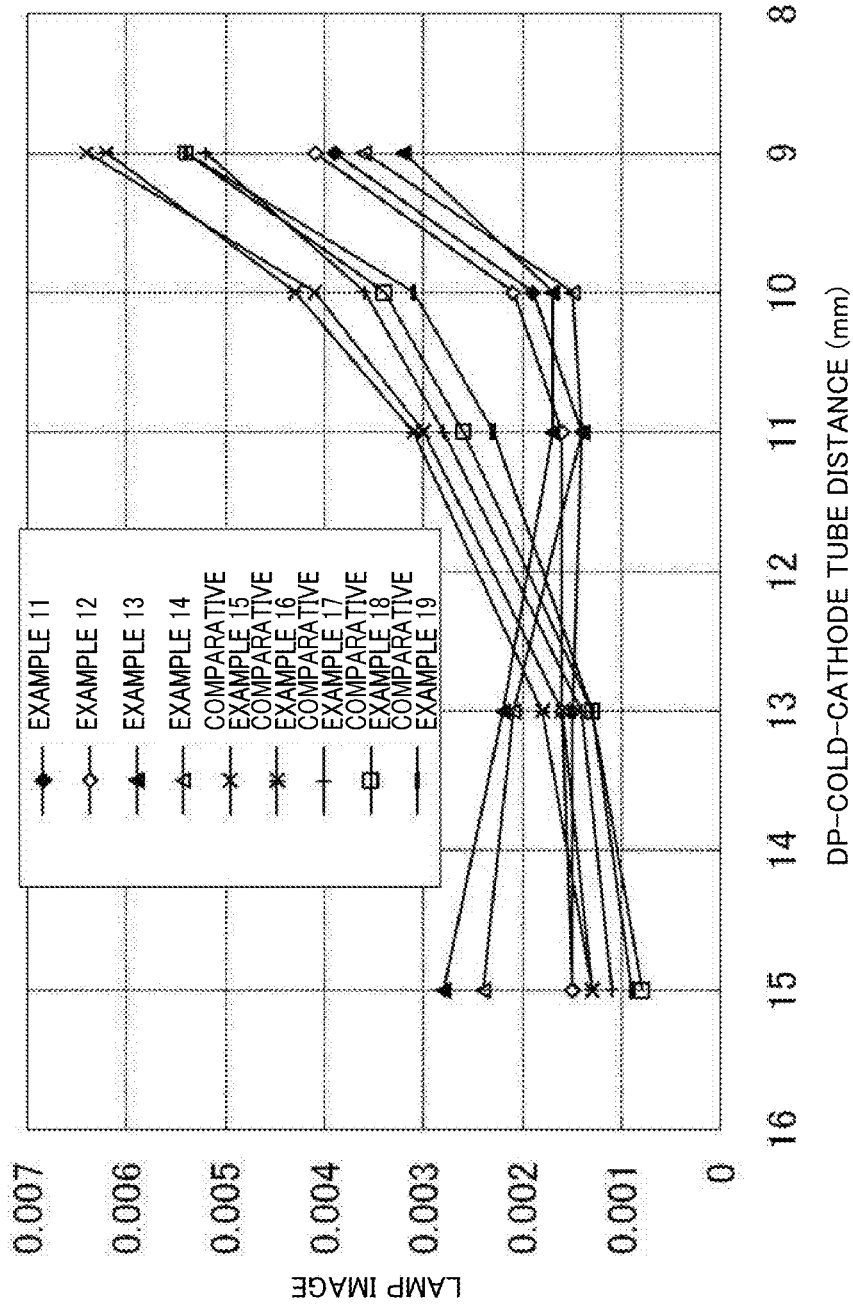
FIG. 54 is a graph illustrating the relationship between DP-cold-cathode tube distance and lamp image in all the samples as described in Examples 11 to 14 and Comparative Examples 15 to 19.

As a result of the foregoing, Table 3 shows the obtained results together with the yellowing factor and average luminance. By installing the reflecting sheet characterized by having the incident direction where the reflected light relative intensity L'2 in the 0-degree direction ranges from 20% to 75% so that the A'2 direction of the reflecting sheet is orthogonal to the cold-cathode tubes, areas immediately above the cold-cathode tubes are darkened to provide the minimum value of luminance, and as a result, it is understood that it is possible to greatly reduce lamp images in the thin type backlight. As can be seen from Comparative Example 15, when the sheet does not have the surface layer portion, the reflected light relative intensity L'2 is high, areas immediately above the cold-cathode tubes are not darkened, and it is understood that lamp images cannot be reduced in the thin type backlight. FIG. 54 shows the graph where the value of lamp images in each DP-cold-cathode tube distance is plotted. It is understood that it is possible to suppress increases in the lamp image in the thin type backlight by suitably using the reflecting sheet of the invention.

Reflected Light Relative Intensity L'1 and Lamp Images in the Lamp-Saving Backlight Described below are lamp-saving backlight evaluations of the reflecting sheets obtained in above-mentioned Examples 1 to 4 and Comparative Examples 1 to 6.

Example 15

When measurement of the reflected light relative intensity of the reflecting sheet as described in Example 1 was performed using the Goniophotometer (Nippon Denshoku Industries Co., LTD., hereinafter referred to as GC5000L), A'1 was coincident with the B1 direction (TD) as described in Example 1, and A'2 was the B2 direction (MD). The reflected light relative intensity L'1 in the 0-degree direction was 126% and thus high, and it is understood that the reflected light with the light incident in the A'1 direction is high diffusion. Meanwhile, L'2 was 69% and thus low, and L'1/L'2 was 1.83.

Figure 55:
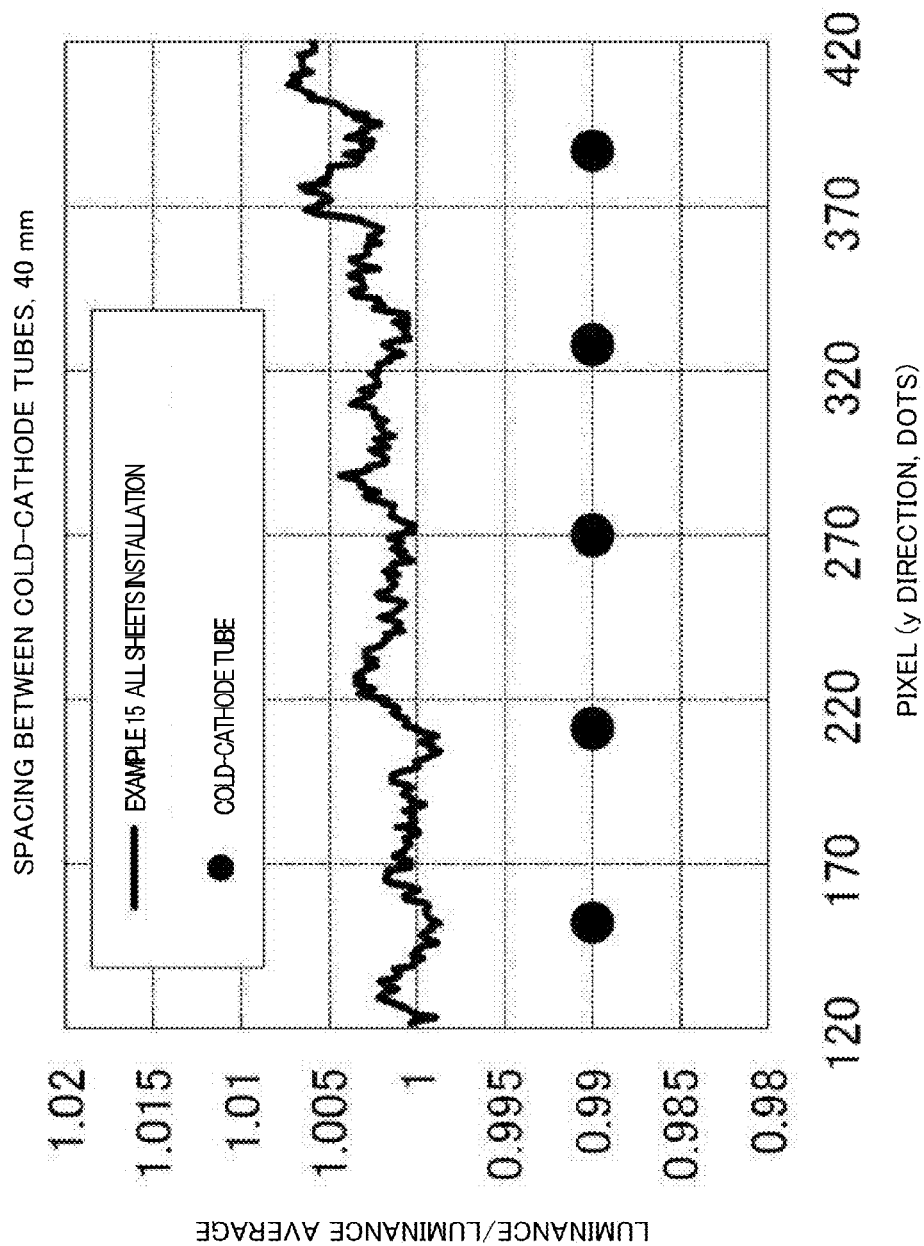
FIG. 55 is a graph to explain lamp images of a sample as described in Example 15 when the spacing among cold-cathode tubes is 40 mm and all sheets are installed.

The reflecting sheet was installed in the backlight so that the A'1 direction was orthogonal to the direction of the cold-cathode tubes. Under the conditions that the spacing between cold-cathode tubes was 40 mm, 42.5 mm, 45.0 mm, and 47.5 mm, when diffuser/DS/prism sheet/reflection type polarization sheet were installed (hereinafter, all sheets installation) and lamp images were examined, the results were 0.0012, 0.0023, 0.0039, and 0.0059, and thus low. FIG. 55 shows the lamp image graph under the condition that the spacing between cold-cathode tubes was 40 mm in all sheets installation. Areas between cold-cathode tubes were not darkened, and the lamp images were reduced greatly. By installing the reflecting sheet of Example 1 so that the A'1 direction where the reflected light relative intensity (L'1) was 126% and high diffusion was orthogonal to the cold-cathode tubes, since areas between cold-cathode tubes could be lightened, the reason is considered that the lamp images are controlled to be low.

Example 16

When measurement of the reflected light relative intensity of the reflecting sheet as described in Example 2 was performed using the GC5000L, A'1 was coincident with the B1 direction (TD), and A'2 was the B2 direction (MD). The reflected light relative intensity L'1 in the 0-degree direction was 121% and thus high, and it is understood that the reflected light with the light incident in the A'1 direction is high diffusion. Meanwhile, L'2 was 64% and thus low, and L'1/L'2 was 1.89.

The reflecting sheet was installed in the backlight so that the A'1 direction was orthogonal to the direction of the cold-cathode tubes. Under the conditions that the spacing between cold-cathode tubes was 40 mm, 42.5 mm, 45.0 mm, and 47.5 mm, when lamp images were examined in all sheets installation, the results were 0.0013, 0.0023, 0.0039, and 0.0061, and thus low in any spacing with the spacing between cold-cathode tubes increased from 40 mm to 47.5 mm.

Example 17

When measurement of the reflected light relative intensity of the reflecting sheet as described in Example 3 was performed using the GC5000L, A'1 was coincident with the B1 direction (TD), and A'2 was the B2 direction (MD). The reflected light relative intensity L'1 in the 0-degree direction was 142% and thus high, and it is understood that the reflected light with the light incident in the A'1 direction is high diffusion. Meanwhile, L'2 was 55% and thus low, and L'1/L'2 was 2.58.

The reflecting sheet was installed in the backlight so that the A'1 direction was orthogonal to the direction of the cold-cathode tubes. Under the conditions that the spacing between cold-cathode tubes was 40 mm, 42.5 mm, 45.0 mm, and 47.5 mm, when lamp images were examined in all sheets installation, the results were 0.0012, 0.0022, 0.0037, and 0.0059, and thus low in any spacing with the spacing between cold-cathode tubes increased from 40 mm to 47.5 mm.

Example 18

When measurement of the reflected light relative intensity of the reflecting sheet as described in Example 4 was performed using the GC5000L, A'1 was coincident with the extrusion transverse direction (TD), and A'2 was coincident with the extrusion direction (MD). The reflected light relative intensity L'1 in the 0-degree direction was 152% and thus high, and it is understood that the reflected light with the light incident in the A'1 direction is high diffusion. Meanwhile, L'2 was 60% and thus low, and L'1/L'2 was 2.53.

The reflecting sheet was installed in the backlight so that the A'1 direction was orthogonal to the direction of the cold-cathode tubes. Under the conditions that the spacing between cold-cathode tubes was 40 mm, 42.5 mm, 45.0 mm, and 47.5 mm, when lamp images were examined in all sheets installation, the results were 0.0012, 0.0017, 0.0030, and 0.0051, and thus low in any spacing with the spacing between cold-cathode tubes increased from 40 mm to 47.5 mm.

Comparative Example 20

When measurement of the reflected light relative intensity of the reflecting sheet as described in Comparative Example 1 was performed using the GC5000L, A'1 was coincident with the B1 direction (TD), and A'2 was the B2 direction (MD). The reflected light relative intensity L'1 in the 0-degree direction was 108% and thus low. L'2 was 79%, and L'1/L'2 was 1.37.

The reflecting sheet was installed in the backlight so that the A'1 direction was orthogonal to the direction of the cold-cathode tubes. Under the conditions that the spacing between cold-cathode tubes was 40 mm, 42.5 mm, 45.0 mm, and 47.5 mm, when lamp images were examined in all sheets installation, the results were 0.0014, 0.0027, 0.0044, and 0.0068.

Comparative Example 21

When measurement of the reflected light relative intensity of the reflecting sheet as described in Comparative Example 3 was performed using the GC5000L, A'1 was coincident with the B1 direction (TD), and A'2 was the B2 direction (MD). The reflected light relative intensity L'1 in the 0-degree direction was 93%. Meanwhile, L'2 was 92%, and L'1/L'2 was 1.01.

Figure 56:
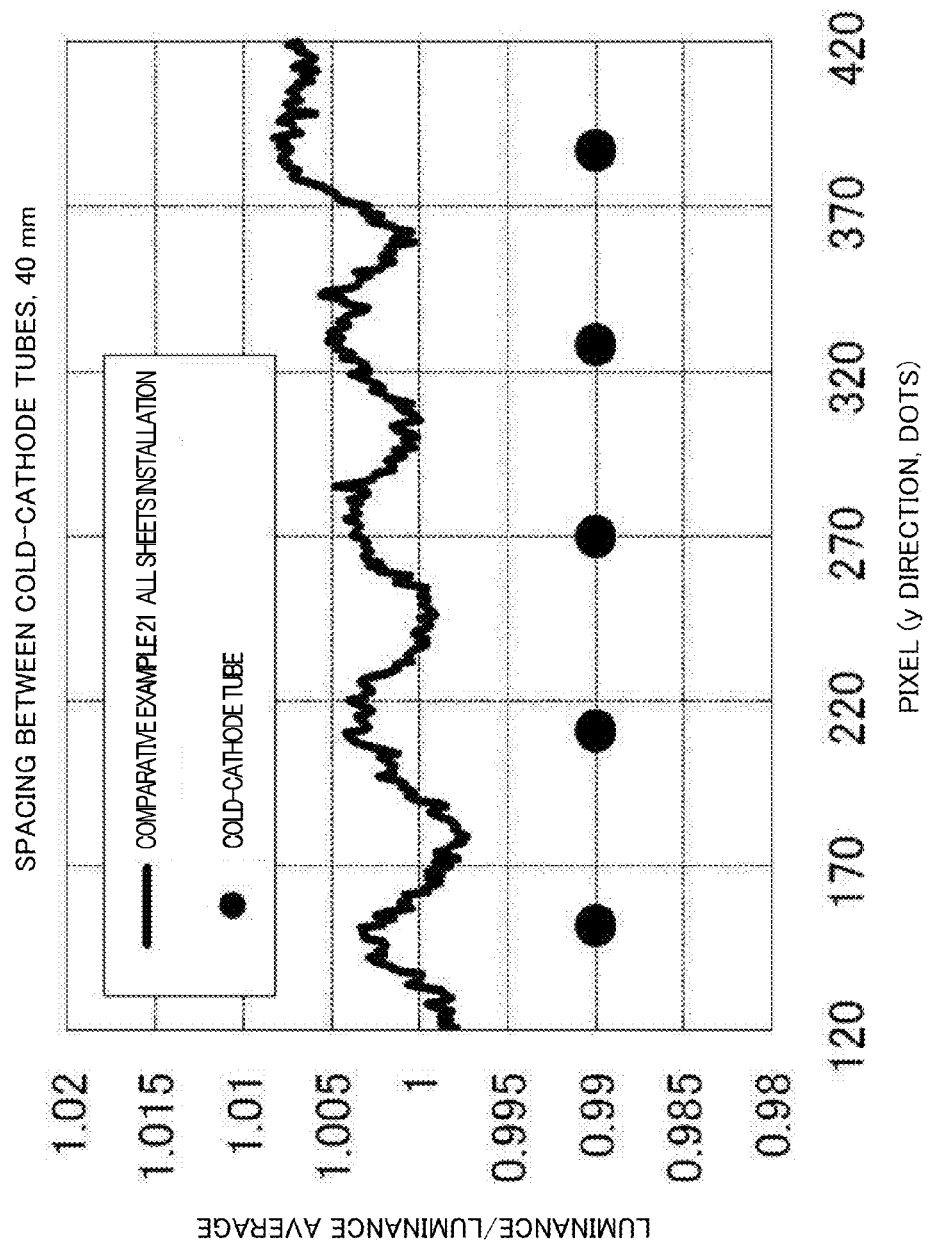
FIG. 56 is a graph to explain lamp images of a sample as described in Comparative Example 21 when the spacing among cold-cathode tubes is 40 mm and all sheets are installed.

The reflecting sheet was installed in the backlight so that the A'1 direction was orthogonal to the direction of the cold-cathode tubes. Under the conditions that the spacing between cold-cathode tubes was 40 mm, 42.5 mm, 45.0 mm, and 47.5 mm, when lamp images were examined in all sheets installation, the results were 0.0024, 0.0042, 0.0059, and 0.0080, and thus, the lamp images were higher than in the case of using the reflecting sheet as described in any one of the Examples in any spacing between cold-cathode tubes. FIG. 56 shows the lamp image graph in all sheets installation with the spacing between cold-cathode tubes of 40 mm. Areas between cold-cathode tubes were not sufficiently bright because of low diffusion of the reflecting sheet in the orthogonal direction to the cold-cathode tubes, and it is understood that the lamp images remain as a result.

Comparative Example 22

The reflecting sheet was extracted from another commercially available liquid crystal TV different from the evaluation backlight. The average total reflection index and regular reflectance of the reflecting sheet were respectively 96.3% and 4.8%. Further, only the surface layer portion was removed, and the total reflection index was measured and 41%. In measurement of the reflected light relative intensity using the GC5000L, when the intensity was measured while varying the incident direction of the incident light, the reflected light relative intensity in the 0-degree was not changed, and the reflected light relative intensities L'1 and L'2 were both 95%.

The reflecting sheet was installed in the backlight. Under the conditions that the spacing between cold-cathode tubes was 40 mm, 42.5 mm, 45.0 mm, and 47.5 mm, when lamp images were examined in all sheets installation, the results were 0.0019, 0.0033, 0.0049, and 0.0076, and thus, the lamp images were higher than in the case of using the reflecting sheet as described in any one of the Examples in any spacing between cold-cathode tubes.

Figure 57:
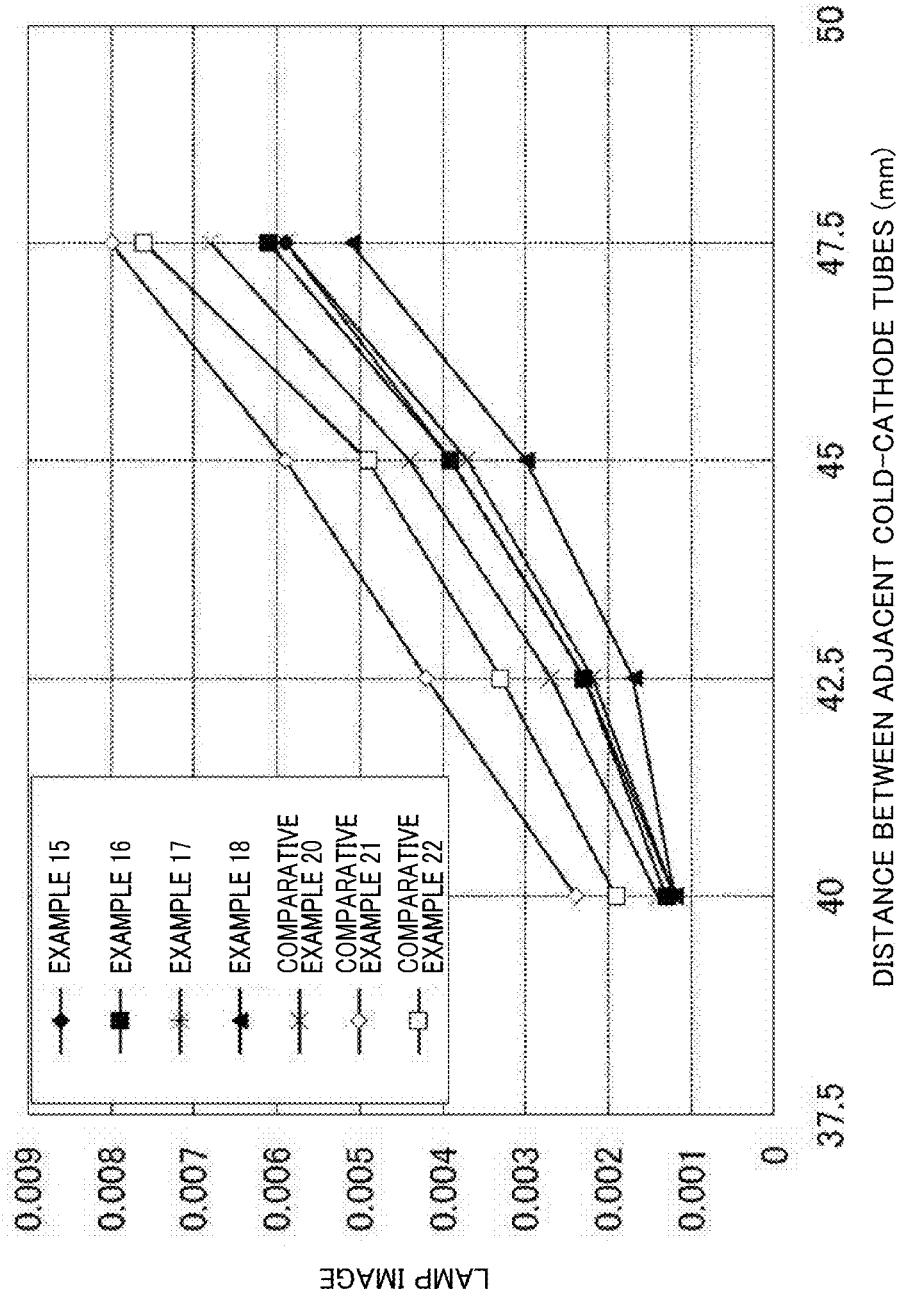
FIG. 57 is a graph illustrating the relationship between DP-cold-cathode tube distance and lamp image in all the samples as described in Examples 15 to 18 and Comparative Examples 20 to 22.

As a result of the foregoing, Table 4 shows the obtained results. It is understood that by installing the reflecting sheet of the invention so that the A1 (A'1) direction of the reflecting sheet is orthogonal to the cold-cathode tubes, it is possible to reduce the lamp images with excellence in the lamp-saving backlight. FIG. 57 shows the graph where the value of lamp images in each distance between cold-cathode tubes is plotted. It is understood that it is possible to suppress increases in the lamp image also in the lamp-saving backlight by suitably using the reflecting sheet of the invention.

Manufacturing Conditions of the Reflecting Sheet and Lamp Image Reducing Effect

Example 19

Used as an inner layer portion raw material was a raw-material resin of a mixture of 62 percent by volume (55 percent by weight) of a polypropylene resin (Japan Polyethylene Corporation, EA7A) and 38 percent by volume (45 percent by weight) of a polycarbonate resin (Mitsubishi Engineering-Plastics Corporation, E2000). This raw-material resin was melted using the same-direction rotary two-way extruder with the cylinder diameter of 25 mm and the ratio between the cylinder and the diameter of 48 under operating conditions that the cylinder temperature was 250° C. and that the number of revolutions of the screw was 100 rpm, and supplied to a multi-manifold die via a gear pump with the temperature adjusted to 250° C. Further, as a surface layer portion raw material, 100 percent by weight of the polypropylene resin (Japan Polypropylene Corporation, EA7A) was used. The polypropylene resin was melted using a single-way extruder with the cylinder diameter of 25 mm and the ratio between the cylinder and the diameter of 48 under operating conditions that the cylinder temperature was 220° C. and that the number of revolutions of the screw was 100 rpm, and supplied to the multi-manifold die. Herein, each raw material was supplied to the multi-manifold die so that the ratio of surface layer portion/inner layer portion/surface layer portion=1/10/1, merged, and extruded at an extrusion temperature of 220° C., extrusion speed s1 of 1.00 m/min, lip width of 400 mm and lip clearance of 2.0 mm. The viscosity v1 of the polypropylene resin (EA7A) and the viscosity v2 of the polycarbonate resin (E2000) at the extrusion temperature were respectively 3346 Pa·s and 27127 Pa·s, and the viscosity ratio v2/v1 was 8.11. The extruded melted resin was received in a pair of cast rolls set for 80° C. at the speed s2 of 1.01 m/min. and the draw ratio s2/s1 of 1.01, the resin was cooled and solidified, and an intermediate sheet with a thickness of 2.0 mm was fabricated.

Figure 58:
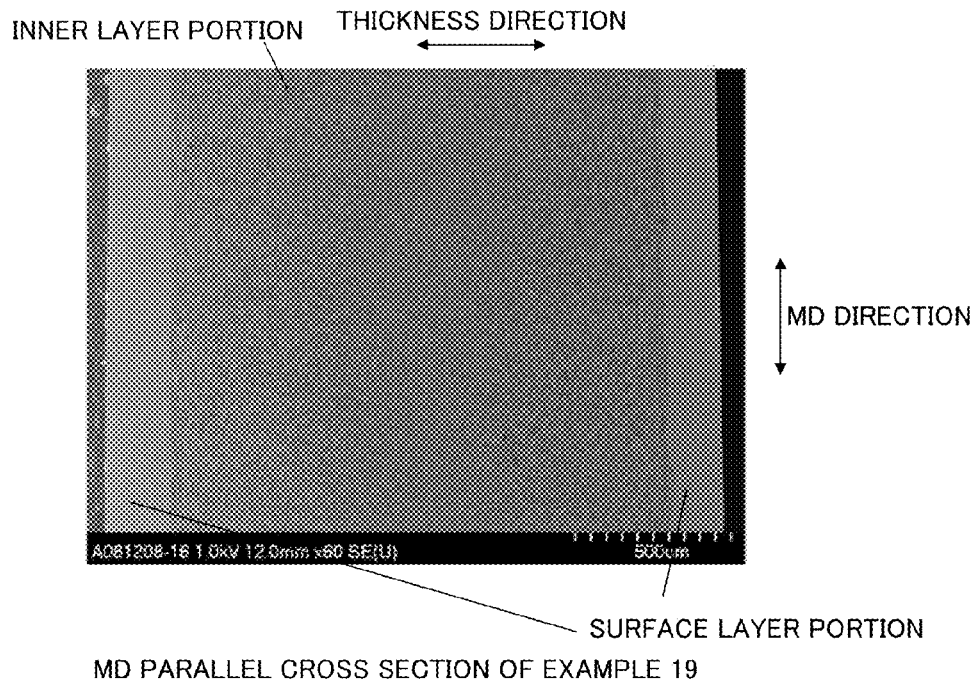
FIG. 58 is a SEM photograph of MD-direction parallel cross section in the entire cross section of an intermediate sheet as described in Example 19.
Figure 59:
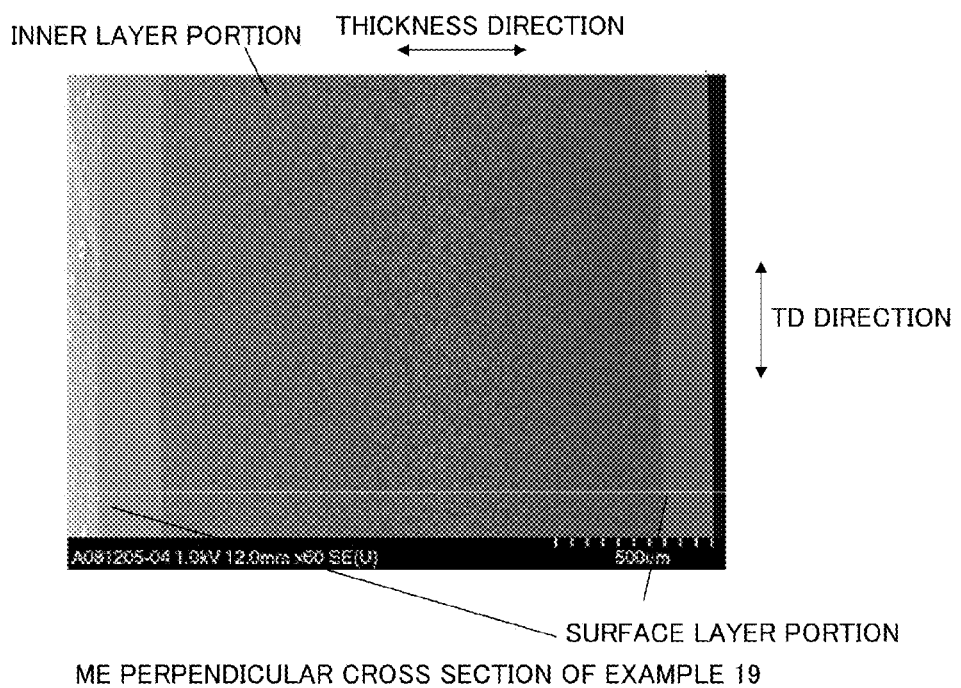
FIG. 59 is a SEM photograph of TD-direction parallel cross section in the entire cross section of the intermediate sheet as described in Example 19.
Figure 60:
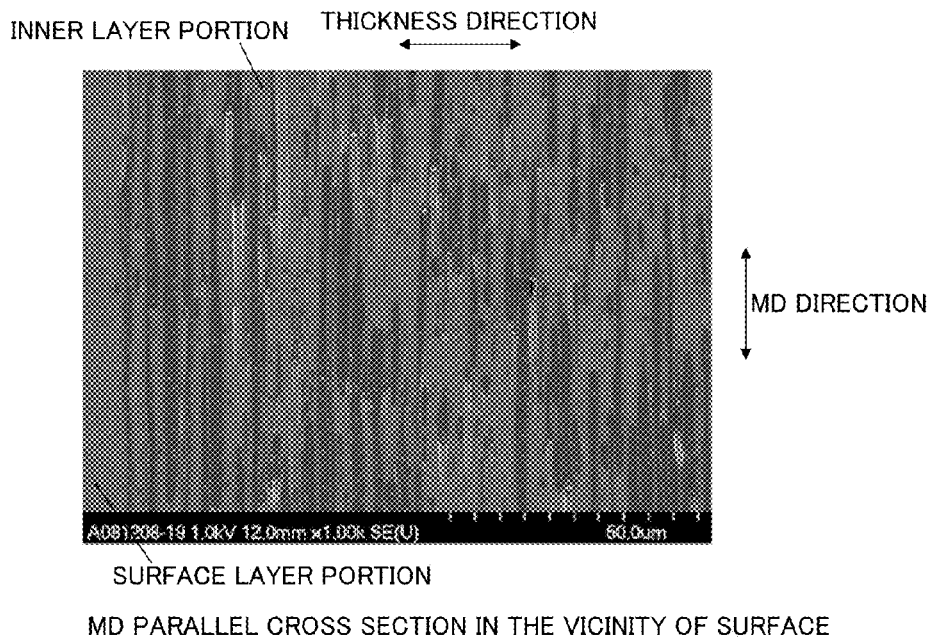
FIG. 60 is a SEM photograph of MD-direction parallel cross section in the vicinity of a surface layer portion of the intermediate sheet as described in Example 19.
Figure 61:
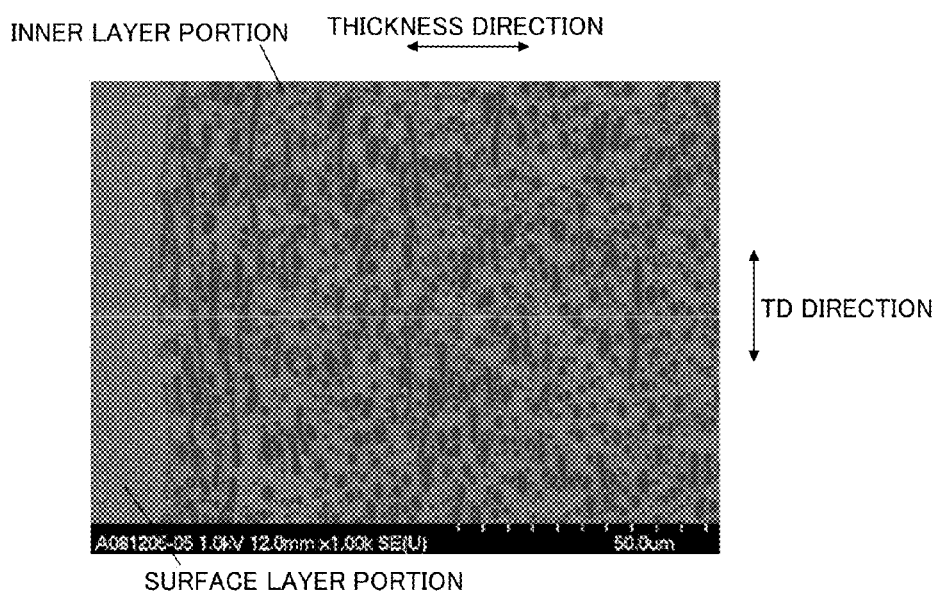
FIG. 61 is a SEM photograph of TD-direction parallel cross section in the vicinity of the surface layer portion of the intermediate sheet as described in Example 19.
Figure 62:
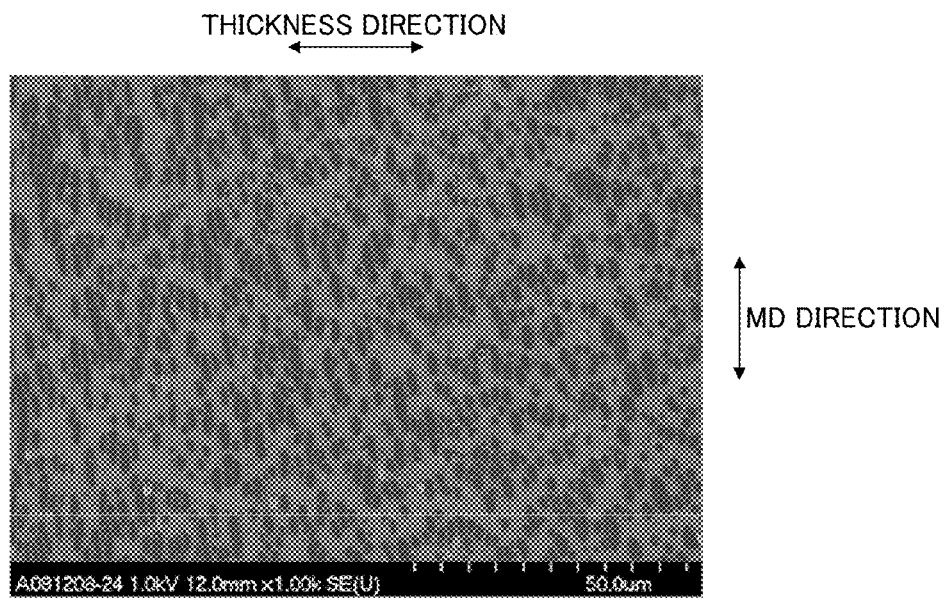
FIG. 62 is a SEM photograph of MD-direction parallel cross section in the center portion of the intermediate sheet as described in Example 19.
Figure 63:
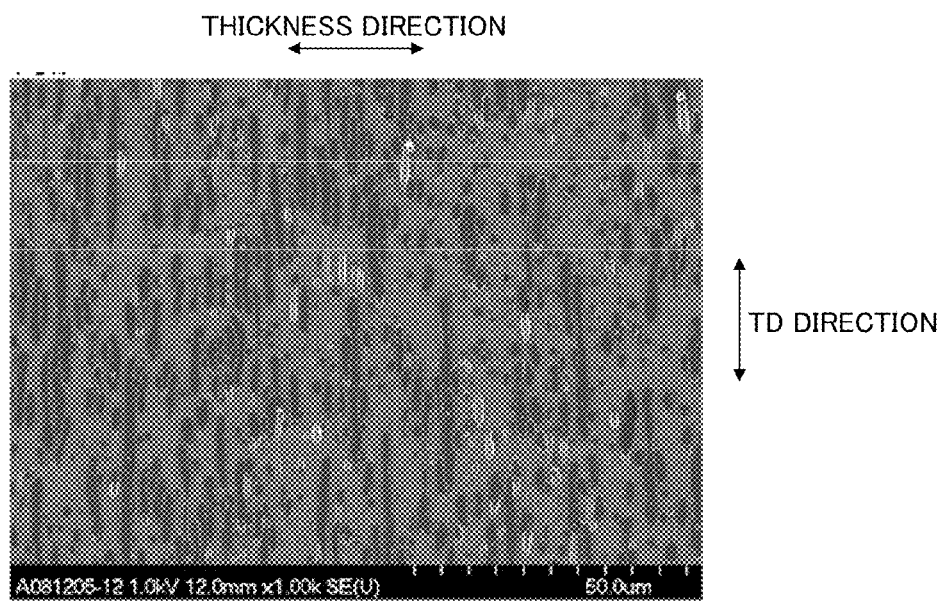
FIG. 63 is a SEM photograph of TD-direction parallel cross section in the center portion of the intermediate sheet as described in Example 19.

The thickness (surface layer portion/inner layer portion/surface layer portion) of the obtained intermediate sheet (c) was 150 μm/1737 μm/148 μm. When the intermediate sheet (c) was cut in the direction parallel and perpendicular to the MD, and the cross section was subjected to SEM observation, kMD1 and kTD1 were respectively 53.32 μm and 3.75 μm, kMD1/kTD1 was 14.21, kMD2 and kTD2 were respectively 5.57 μm and 13.92 μm, and kMD2/kTD2 was 0.40. From the foregoing, it is understood that the resin (B) is oriented in the MD direction only in the vicinity of the surface layer in the inner layer portion. For reference, FIGS. 58 and 59 show SEM photographs of the entire cross sections with the intermediate sheet cut in the direction parallel or perpendicular to MD. Further, FIGS. 60 and 61 show SEM photographs of the cross sections parallel or perpendicular to MD in the vicinity of the surface layer portion in the inner layer portion. Similarly, FIGS. 62 and 63 show SEM photographs of the cross sections parallel or perpendicular to MD in the center portion in the thickness direction in the inner layer portion.

Longitudinal-stretching prior sheets were cut from the intermediate sheet, and the extensibility test was performed. As a result, in three-time stretching, the stretching pass rate was 100%. The intermediate sheet was stretched three times in the MD direction at the temperature of 155° C. using the roll longitudinal stretching machine, and then, stretched three times in the TD direction at the temperature of 155° C. using tenter transverse stretching, and a two-kind three-layer co-extruded reflecting sheet was fabricated.

Figure 64:
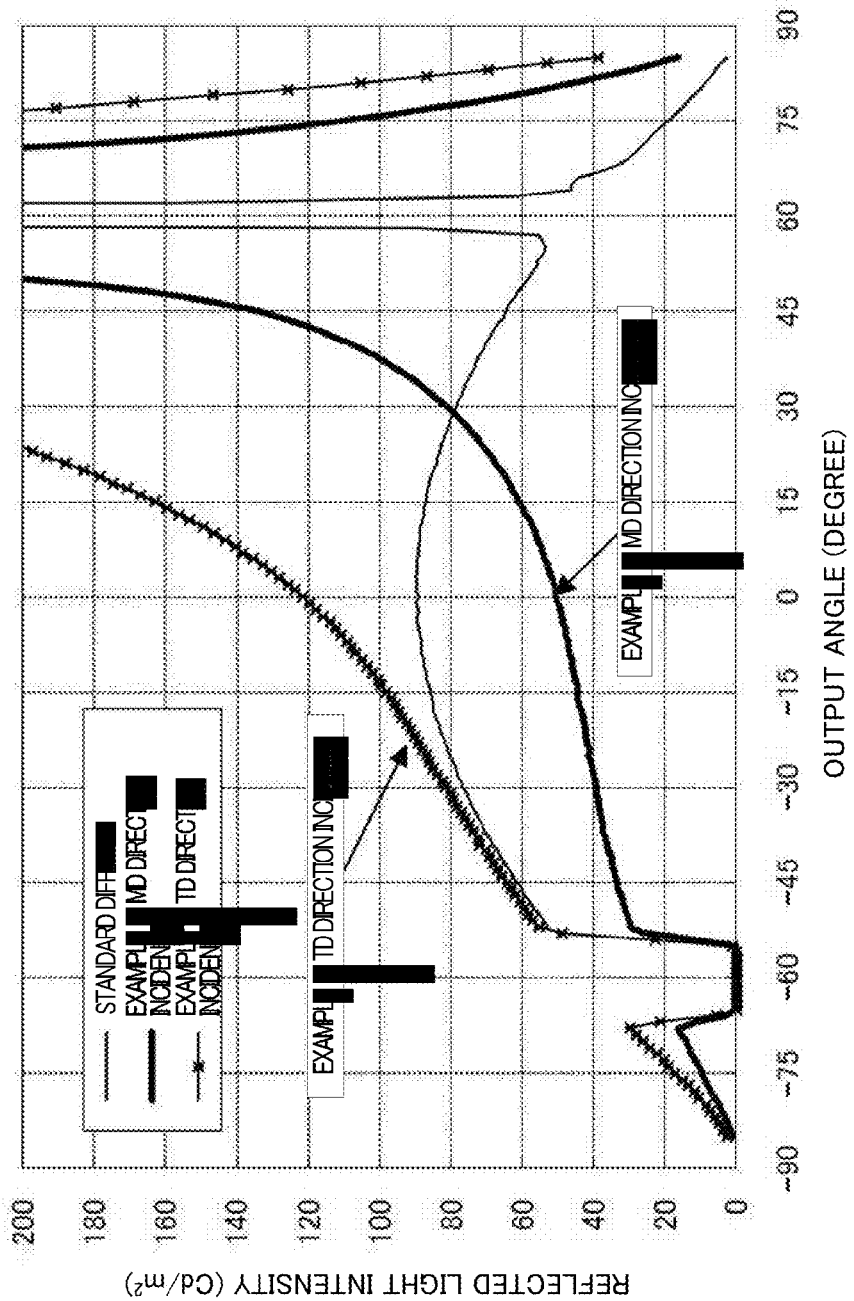
FIG. 64 is a graph showing the reflected light intensity distribution of a reflecting sheet as described in Example 19.

The thickness (surface layer portion/inner layer portion/surface layer portion), weighing, density, total reflection index and regular reflectance of the obtained two-kind three-layer reflecting sheet were respectively 14 μm/427 μm/14 μm, 215 g/m$^2$, 0.47 g/cm$^3$, 97.3%, and 7.8%. Further, the total reflection index of the surface layer portion was 16%. The incident direction where the reflected light relative intensity in the 0-degree was the highest was the TD direction of the reflecting sheet, and L'1/L'2 was 2.40. For reference, FIG. 64 shows the reflected light relative intensity with the light incident in the TD direction and the reflected light relative intensity with the light incident in the MD direction. It is understood that there is a significant difference in the reflected light intensity by the incident direction. In addition, in FIG. 64, the incident light is applied from the angle described as −60 degrees, and the high reflected light intensity around +60 degrees is derived from regular reflection.

The reflecting sheet was installed in the backlight so that the MD direction was orthogonal to the direction of the cold-cathode tubes. Under the conditions that the DP-cold-cathode tube distance was 15 mm, 13 mm, 11 mm, 10 mm, and 9 mm, when diffuser/DS/prism sheet/reflection type polarization sheet were installed (hereinafter, all sheets installation) and lamp images were examined, the results were 0.0021, 0.0017, 0.0015, 0.0016 and 0.0037. Further, when the DP-cold-cathode tube distance was 11 mm, only the diffuser was installed, and the lamp images were examined, the result was 0.0050 and thus low.

Example 20

As a surface layer portion, used were 3 percent by weight of zinc oxide (Sakai Chemical Industry Co., Ltd. NAnofine 50SD, average particle size: 20 nm) and 2 percent by weight of a benzotriazolic UV absorbing agent (Ciba Specialty Chemicals K.K, T23) as UV absorbing agents, and 95 percent by weight of the polypropylene resin (Japan Polypropylene Corporation, EA7A), and an intermediate sheet was fabricated as in Example 19. The thickness (surface layer portion/inner layer portion/surface layer portion) of the obtained intermediate sheet was 168 μm/1699 μm/173 μm. Further, kMD1 and kTD1 were respectively 51.30 μm and 3.91 μm, kMD1/kTD1 was 13.11, kMD2 and kTD2 were respectively 6.02 μm and 12.50 μm, and kMD2/kTD2 was 0.48.

Longitudinal-stretching prior sheets were cut from the intermediate sheet, and the extensibility test was performed. As a result, in three-time stretching, the stretching pass rate was 100%. The intermediate sheet was stretched three times in the MD direction at the temperature of 155° C. using the roll longitudinal stretching machine, and then, stretched three times in the TD direction at the temperature of 155° C. using tenter transverse stretching, and a two-kind three-layer co-extruded reflecting sheet was fabricated.

The thickness (surface layer portion/inner layer portion/surface layer portion), weighing, density, total reflection index and regular reflectance of the obtained two-kind three-layer reflecting sheet were respectively 14 μm/421 μm/16 μm, 218 g/m$^2$, 0.48 g/cm$^3$, 97.5%, and 7.5%. Further, the total reflection index of the surface layer portion was 22%. The incident direction where the reflected light relative intensity was the highest was the TD direction of the reflecting sheet, and L'1/L'2 was 1.89.

The reflecting sheet was installed in the backlight so that the MD direction was orthogonal to the direction of the cold-cathode tubes. Under the conditions that the DP-cold-cathode tube distance was 15 mm, 13 mm, 11 mm, 10 mm, and 9 mm, when lamp images were examined in all sheets installation, the results were 0.0018, 0.0017, 0.0017, 0.0021 and 0.0038. When the DP-cold-cathode tube distance was 11 mm, only the diffuser was installed, and the lamp images were examined, the result was 0.0055 and thus low.

Example 21

As a surface layer portion, used were 5 percent by weight of zinc oxide (Sakai Chemical Industry Co., Ltd. Nanofine 50SD, average particle size: 20 nm) as a UV absorbing agents, and 95 percent by weight of the polypropylene resin (Japan Polypropylene Corporation, EA7A), and an intermediate sheet was fabricated as in Example 19. The thickness (surface layer portion/inner layer portion/surface layer portion) of the obtained intermediate sheet was 164 μm/1716 μm/166 μm. Further, kMD1 and kTD1 were respectively 50.04 μm and 3.91 μm, kMD1/kTD1 was 12.79, kMD2 and kTD2 were respectively 7.33 μm and 12.31 μm, and kMD2/kTD2 was 0.60.

Longitudinal-stretching prior sheets were cut from the intermediate sheet, and the extensibility test was performed. As a result, in three-time stretching, the stretching pass rate was 100%. The intermediate sheet was stretched three times in the MD direction at the temperature of 155° C. using the roll longitudinal stretching machine, and then, stretched three times in the TD direction at the temperature of 155° C. using tenter transverse stretching, and a two-kind three-layer co-extruded reflecting sheet was fabricated.

The thickness (surface layer portion/inner layer portion/surface layer portion), weighing, density, total reflection index and regular reflectance of the obtained two-kind three-layer reflecting sheet were respectively 21 μm/387 μm/19 μm, 203 g/m$^2$, 0.48 g/cm$^2$, 97.5%, and 7.4%. Further, the total reflection index of the surface layer portion was 22%. The incident direction where the reflected light relative intensity was the highest was the TD direction of the reflecting sheet, and L'1/L'2 was 2.14.

The reflecting sheet was installed in the backlight so that the MD direction was orthogonal to the direction of the cold-cathode tubes. Under the conditions that the DP-cold-cathode tube distance was 15 mm, 13 mm, 11 mm, 10 mm, and 9 mm in all sheets installation, lamp images were examined, and the results were 0.0023, 0.0020, 0.0015, 0.0017 and 0.0035. Further, when the DP-cold-cathode tube distance was 11 mm, only the diffuser was installed, and the lamp images were examined, the result was 0.0052 and thus low.

Example 22

As a surface layer portion, used were 5 percent by weight of zinc oxide (Sakai Chemical Industry Co., Ltd. Finex 50W, average particle size: 20 nm) as a UV absorbing agents, and 95 percent by weight of the polypropylene resin (Japan Polypropylene Corporation, EA7A), and an intermediate sheet was fabricated as in Example 19. The thickness (surface layer portion/inner layer portion/surface layer portion) of the obtained intermediate sheet was 165 μm/1717 μm/170 μm. Further, kMD1 and kTD1 were respectively 49.97 μm and 4.01 μm, kMD1/kTD1 was 12.48, kMD2 and kTD2 were respectively 6.18 μm and 12.12 μm, and kMD2/kTD2 was 0.51.

Longitudinal-stretching prior sheets were cut from the intermediate sheet, and the extensibility test was performed. As a result, in three-time stretching, the stretching pass rate was 100%. The intermediate sheet was stretched three times in the MD direction at the temperature of 155° C. using the roll longitudinal stretching machine, and then, stretched three times in the TD direction at the temperature of 155° C. using tenter transverse stretching, and a two-kind three-layer co-extruded reflecting sheet was fabricated.

The thickness (surface layer portion/inner layer portion/surface layer portion), weighing, density, total reflection index and regular reflectance of the obtained two-kind three-layer reflecting sheet were respectively 17 μm/411 μm/15 μm, 218 g/m$^2$, 0.49 g/cm$^3$, 97.3%, and 7.0%. Further, the total reflection index of the surface layer portion was 24%. The incident direction where the reflected light relative intensity was the highest was the TD direction of the reflecting sheet, and L'1/L'2 was 2.23.

The reflecting sheet was installed in the backlight so that the MD direction was orthogonal to the direction of the cold-cathode tubes. Under the conditions that the DP-cold-cathode tube distance was 15 mm, 13 mm, 11 mm, 10 mm, and 9 mm in all sheets installation, lamp images were examined, and the results were 0.0023, 0.0021, 0.0014, 0.0015 and 0.0039. Further, when the DP-cold-cathode tube distance was 11 mm, only the diffuser was installed, and the lamp images were examined, the result was 0.0051 and thus low.

Example 23

Used as an inner layer portion raw material was a raw-material resin of a mixture of 60 percent by weight of the polypropylene resin (Japan Polyethylene Corporation, EA7A) and 40 percent by weight of the polycarbonate resin (Mitsubishi Engineering-Plastics Corporation, E2000), used as a surface layer portion was 100 percent by weight of the polypropylene resin (Japan Polyethylene Corporation, EA7A), the resins were extruded as in Example 19, and an intermediate sheet was fabricated. The thickness (surface layer portion/inner layer portion/surface layer portion) of the obtained intermediate sheet was 153 μm/1580 μm/145 μm. Further, kMD1 and kTD1 were respectively 47.68 μm and 3.77 μm, kMD1/kTD1 was 12.63, kMD2 and kTD2 were respectively 5.02 μm and 11.95 μm, and kMD2/kTD2 was 0.42.

Longitudinal-stretching prior sheets were cut from the intermediate sheet, and the extensibility test was performed. As a result, in three-time stretching, the stretching pass rate was 100%. The intermediate sheet was stretched three times in the MD direction at the temperature of 155° C. using the roll longitudinal stretching machine, and then, stretched three times in the TD direction at the temperature of 155° C. using tenter transverse stretching, and a two-kind three-layer co-extruded reflecting sheet was fabricated.

The thickness (surface layer portion/inner layer portion/surface layer portion), weighing, density, total reflection index and regular reflectance of the obtained two-kind three-layer reflecting sheet were respectively 16 μm/368 μm/17 μm, 198 g/m$^2$, 0.49 g/cm$^2$, 97.1%, and 8.1%. Further, the total reflection index of the surface layer portion was 13%. The incident direction where the reflected light relative intensity was the highest was the TD direction of the reflecting sheet, and L'1/L'2 was 2.45.

The reflecting sheet was installed in the backlight so that the MD direction was orthogonal to the direction of the cold-cathode tubes. Under the conditions that the DP-cold-cathode tube distance was 15 mm, 13 mm, 11 mm, 10 mm, and 9 mm in all sheet installation, lamp images were examined, and the results were 0.0023, 0.0020, 0.0014, 0.0014 and 0.0036. Further, when the was installed, and the lamp images were examined, the result was 0.0051 and thus low.

Example 24

Used as an inner layer portion raw material was a raw-material resin of a mixture of 55 percent by weight of a polypropylene resin (Prime Polymer Co., Ltd. E-105GM) and 45 percent by weight of the polycarbonate resin (CHIMEI-ASAHI Corporation, WONDERLITE PC110), used as a surface layer portion was 100 percent by weight of the polypropylene resin (Prime Polymer Co., Ltd. E-105GM), and the resins were co-extruded in the same way as in Example 19 except that the cylinder temperature was 250° C. and that the extrusion temperature was 200° C. The viscosity v1 of the polypropylene resin (E-105GM) and the viscosity v2 of the polycarbonate resin (WONDERLITE PC110) at the extrusion temperature were respectively 5209 Pa·s and 49787 Pa·s and the viscosity ratio v2/v1 was 9.55. The extruded melted resin was received in a pair of cast rolls, the resin was cooled and solidified, and an intermediate sheet was fabricated. The thickness (surface layer portion/inner layer portion/surface layer portion) of the obtained intermediate sheet was 139 μm/1462 μm/141 μm. Further, kMD1 and kTD1 were respectively 43.58 μm and 4.24 μm, kMD1/kTD1 was 10.27, kMD2 and kTD2 were respectively 6.87 μm and 10.91 μm, and kMD2/kTD2 was 0.63.

Longitudinal-stretching prior sheets were cut from the intermediate sheet, and the extensibility test was performed. As a result, in three-time stretching, the stretching pass rate was 100%. The intermediate sheet was stretched three times in the MD direction at the temperature of 155° C. using the roll longitudinal stretching machine, and then, stretched three times in the TD direction at the temperature of 155° C. using tenter transverse stretching, and a two-kind three-layer co-extruded reflecting sheet was fabricated.

The thickness (surface layer portion/inner layer portion/surface layer portion), weighing, density, total reflection index and regular reflectance of the obtained two-kind three-layer reflecting sheet were respectively 14 μm/416 μm/13 μm, 218 g/m$^2$, 0.49 g/cm$^2$, 97.2%, and 7.7%. Further, the total reflection index of the surface layer portion was 15%. The incident direction where the reflected light relative intensity was the highest was the TD direction of the reflecting sheet, and L'1/L'2 was 1.76.

The reflecting sheet was installed in the backlight so that the MD direction was orthogonal to the direction of the cold-cathode tubes. Under the conditions that the DP-cold-cathode tube distance was 15 mm, 13 mm, 11 mm, 10 mm, and 9 mm in all sheets installation, lamp images were examined, and the results were 0.0016, 0.0016, 0.0015, 0.0024 and 0.0041. Further, when the DP-cold-cathode tube distance was 11 mm, only the diffuser was installed, and the lamp images were examined, the result was 0.0059 and thus low.

Example 25

An intermediate sheet was fabricated as in Example 21. At this point, the sheet was extruded at the extrusion speed s1 of 1.00 m/min, lip width of 400 mm and clearance of 1.9 mm. The extruded melted resin was received in a pair of cast rolls set for 80° C. at the receiving speed s2 of 3.03 m/min. and the draw ratio s2/s1 of 3.03, the resin was cooled and solidified while the melted resin was drawn in the MD direction, and an intermediate sheet with a thickness of 0.7 mm was fabricated.

The thickness (surface layer portion/inner layer portion/surface layer portion) of the obtained intermediate sheet was 72 μm/543 μm/64 μm. Further, kMD1 and kTD1 were respectively 53.30 μm and 1.30 μm, kMD1/kTD1 was 41.00, kMD2 and kTD2 were respectively 55.90 μm and 25.60 μm, and kMD2/kTD2 was 2.20.

Longitudinal-stretching prior sheets were cut from the obtained intermediate sheet, and the extensibility test was performed. As a result, in three-time stretching, the stretching pass rate was 40%. The intermediate sheet was stretched three times in the MD direction at the temperature of 155° C. using the roll longitudinal stretching machine, and then, stretched three times in the TD direction at the temperature of 155° C. using tenter transverse stretching, and a two-kind three-layer co-extruded reflecting sheet was fabricated.

The thickness (surface layer portion/inner layer portion/surface layer portion), weighing, density, total reflection index and regular reflectance of the obtained two-kind three-layer reflecting sheet were respectively 7 μm/102 μm/4 μm, 75 g/m$^2$, 0.66 g/cm$^3$, 93.8%, and 7.4%. Further, the total reflection index of the surface layer portion was 16%. The incident direction where the reflected light intensity in the 0-degree direction was the highest was the TD direction of the reflecting sheet, and L'1/L'2 was 2.51.

The reflecting sheet was installed in the backlight so that the MD direction was orthogonal to the direction of the cold-cathode tubes. Under the conditions that the DP-cold-cathode tube distance was 15 mm, 13 mm, 11 mm, 10 mm, and 9 mm in all sheets installation, lamp images were examined, and the results were 0.0020, 0.0018, 0.0016, 0.0017 and 0.0041. Further, when the DP-cold-cathode tube distance was 11 mm, only the diffuser was installed, and the lamp images were examined, the result was 0.0060.

Comparative Example 23

Used as an inner layer portion raw material was a raw-material resin of a mixture of 80 percent by weight of the polypropylene resin (Japan Polyethylene Corporation, EA7A) and 20 percent by weight of barium sulfate (Sakai Chemical Industry Co., B-1), used as a surface layer portion were 5 percent by weight of barium sulfate (Sakai Chemical Industry Co., B-1) and 95 percent by weight of the polypropylene resin (Japan Polyethylene Corporation, EA7A), the resins were extruded as in Example 19, and an intermediate sheet was fabricated. The thickness (surface layer portion/inner layer portion/surface layer portion) of the obtained intermediate sheet was 166 μm/1687 μm/158 μm. Longitudinal-stretching prior sheets were cut from the intermediate sheet, and the extensibility test was performed. As a result, in three-time stretching, the stretching pass rate was 100%.

The intermediate sheet was stretched three times in the MD direction at the temperature of 155° C. using the roll longitudinal stretching machine, and then, stretched three times in the TD direction at the temperature of 155° C. using tenter transverse stretching, and a two-kind three-layer co-extruded reflecting sheet was fabricated.

The thickness (surface layer portion/inner layer portion/surface layer portion), weighing, density, total reflection index and regular reflectance of the obtained two-kind three-layer reflecting sheet were respectively 23 μm/345 μm/25 μm, 340 g/m$^2$, 0.87 g/cm$^2$, 95.8%, and 4.3%. Further, the total reflection index of the surface layer portion was 41%. The incident direction A1 where the reflected light relative intensity was the highest was the TD direction of the reflecting sheet, and L'1/L'2 was 1.02.

The reflecting sheet was installed in the backlight so that the MD direction was orthogonal to the direction of the cold-cathode tubes. Under the conditions that the DP-cold-cathode tube distance was 15 mm, 13 mm, 11 mm, 10 mm, and 9 mm in all sheets installation, lamp images were examined, and the results were 0.0014, 0.0016, 0.0032, 0.0042 and 0.0061. Further, when the DP-cold-cathode tube distance was 11 mm, only the diffuser was installed, and the lamp images were examined, the result was 0.0121.

Comparative Example 24

As an inner layer portion raw material, used was a raw-material resin of a mixture of 55 percent by weight of a polypropylene resin (Japan Polyethylene Corporation, EA9) and 38 percent by volume (45 percent by weight) of the polycarbonate resin (Mitsubishi Engineering-Plastics Corporation, E2000). Further, as a surface layer portion, used were 5 percent by weight of zinc oxide (Sakai Chemical Industry Co., Ltd. Finex 50W, average particle size: 20 nm) as a UV absorbing agent, and 95 percent by weight of the polypropylene resin (Japan Polyethylene Corporation, EA9), and the resins were extruded in the same way as in Example 19 except that the cylinder temperature was 240° C. and that the extrusion temperature was 240° C. The viscosity v1 of the polypropylene resin (EA9) and the viscosity v2 of the polycarbonate resin (E2000) at the extrusion temperature were respectively 3372 Pa·s and 10083 Pa·s, and the viscosity ratio v2/v1 was 2.98.

Figure 65:
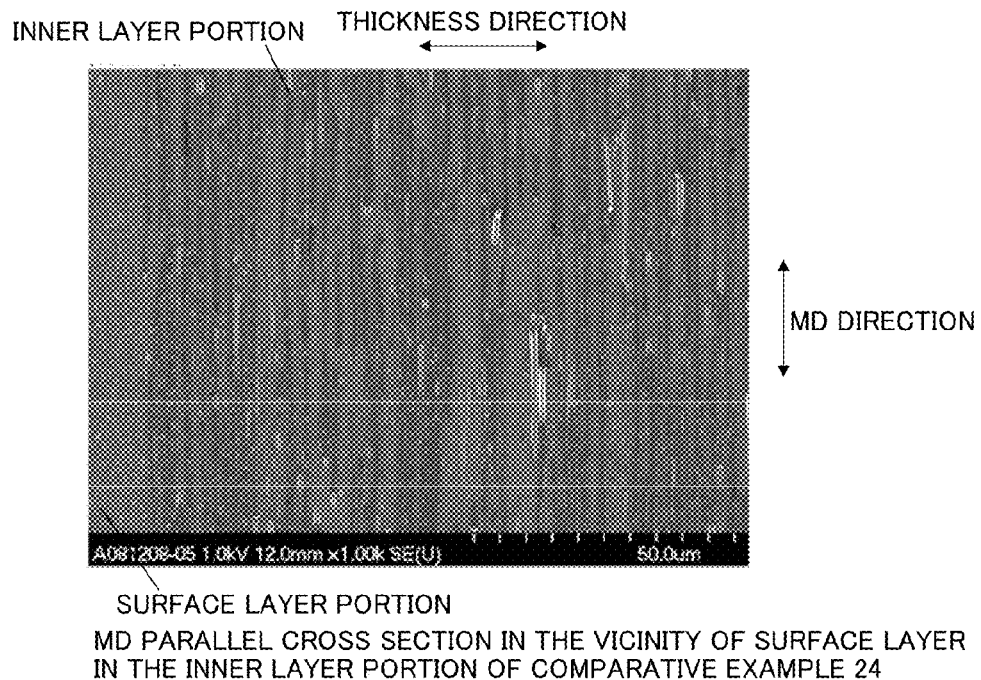
FIG. 65 is a SEM photograph of MD-direction parallel cross section in the vicinity of a surface layer portion in the inner layer portion of an intermediate sheet as described in Comparative Example 24.
Figure 66:
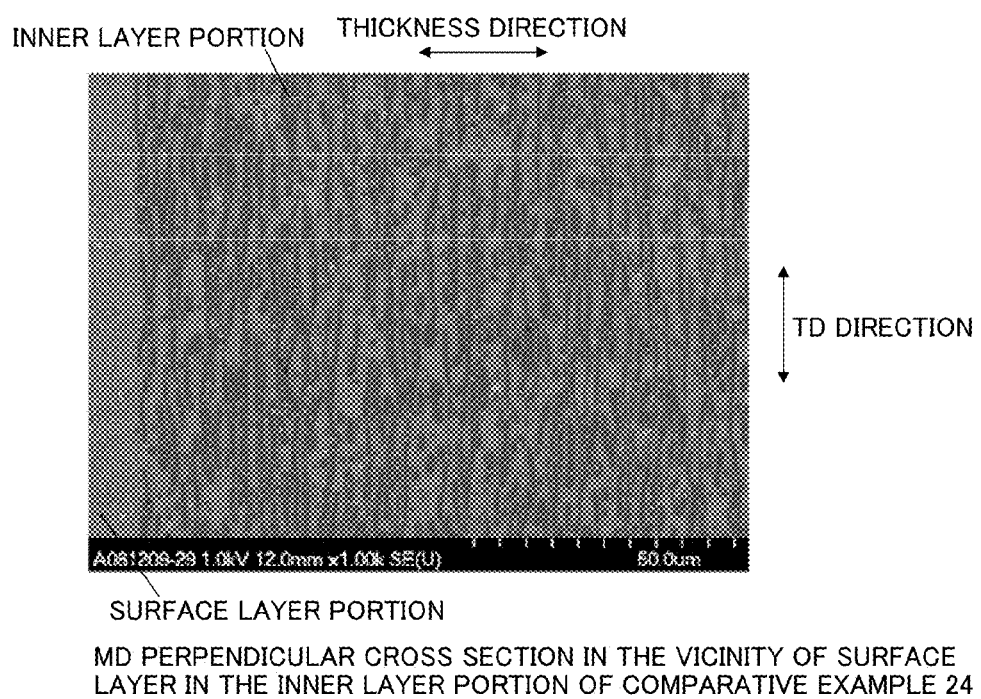
FIG. 66 is a SEM photograph of TD-direction parallel cross section in the vicinity of the surface layer portion in the inner layer portion of the intermediate sheet as described in Comparative Example 24.
Figure 67:
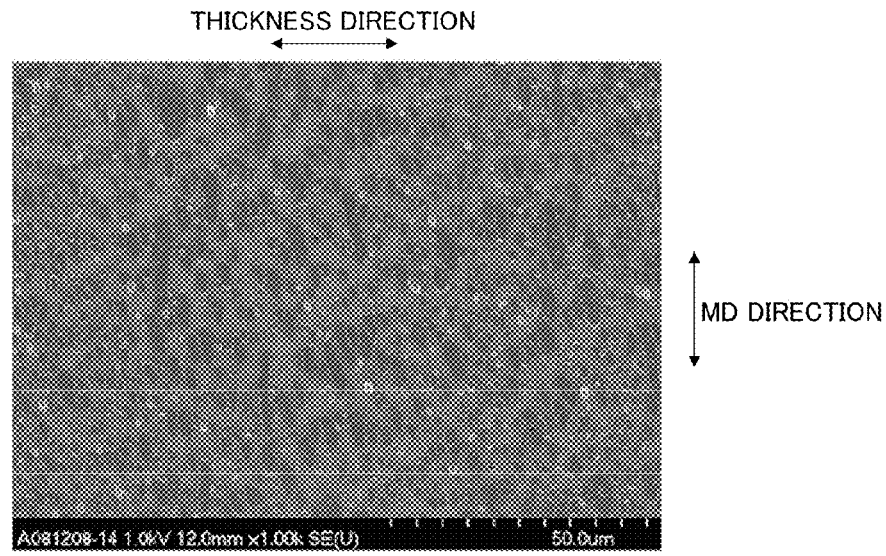
FIG. 67 is a SEM photograph of MD-direction parallel cross section in the center portion in the inner layer portion of the intermediate sheet as described in Comparative Example 24.
Figure 68:
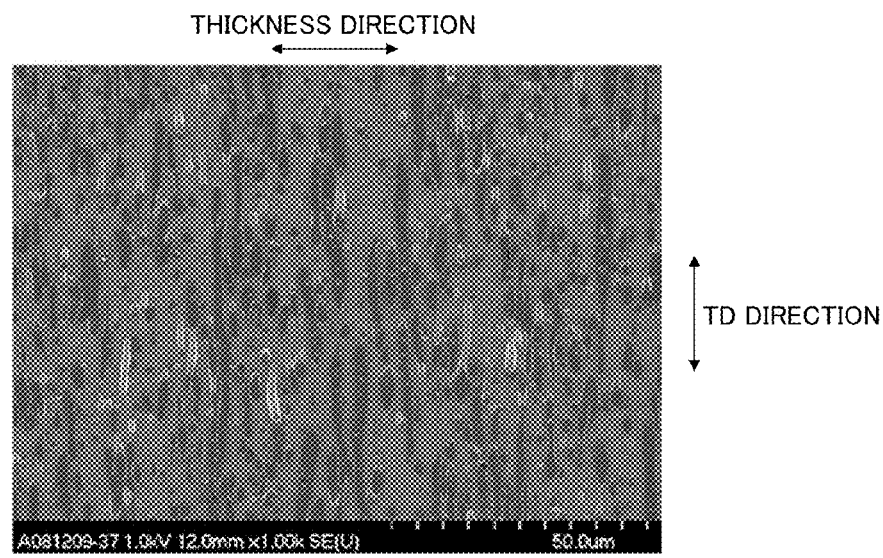
FIG. 68 is a SEM photograph of TD-direction parallel cross section in the center portion in the inner layer portion of the intermediate sheet as described in Comparative Example 24.

The thickness (surface layer portion/inner layer portion/surface layer portion) of the obtained intermediate sheet was 169 μm/1716 μm/159 μm. When the intermediate sheet (c)

was cut in the direction parallel and perpendicular to the MD, and the cross section was subjected to SEM observation, kMD1 and kTD1 were respectively 78.33 μm and 35.17 μm, kMD1/kTD1 was 2.23, kMD2 and kTD2 were respectively 3.92 μm and 10.53 μm, and kMD2/kTD2 was 0.32. It is understood that orientation in the MD direction of the resin (B) in the vicinity of the surface layer in the inner layer portion is smaller than that in Example 22. For reference, FIGS. 65 and 66 show SEM photographs of the cross section parallel to MD and the cross section parallel to TD in the vicinity of the surface layer portion in the inner layer portion, respectively. Further, for reference, FIGS. 67 and 68 show SEM photographs of the cross section parallel to MD and the cross section parallel to TD in the center portion in the inner layer portion, respectively.

Longitudinal-stretching prior sheets were cut from the obtained intermediate sheet, and the extensibility test was performed. As a result, in three-time stretching, the stretching pass rate was 100%. The intermediate sheet was stretched three times in the MD direction at the temperature of 155° C. using the roll longitudinal stretching machine, and then, stretched three times in the TD direction at the temperature of 155° C. using tenter transverse stretching, and a two-kind three-layer co-extruded reflecting sheet was fabricated.

The thickness (surface layer portion/inner layer portion/surface layer portion), weighing, density, total reflection index and regular reflectance of the obtained two-kind three-layer reflecting sheet were respectively 17 μm/369 μm/20 μm, 197 g/m², 0.49 g/cm³, 97.0%, and 6.8%. Further, the total reflection index of the surface layer portion was 23%. The incident direction where the reflected light relative intensity in the 0-degree was the highest was the TD direction of the reflecting sheet, and L'1/L'2 was 1.070.

The reflecting sheet was installed in the backlight so that the MD direction was orthogonal to the direction of the cold-cathode tubes. Under the conditions that the DP-cold-cathode tube distance was 15 mm, 13 mm, 11 mm, 10 mm, and 9 mm in all sheets installation, lamp images were examined, and the results were 0.0013, 0.0015, 0.0029, 0.0040 and 0.0059. Further, when the DP-cold-cathode tube distance was 11 mm, only the diffuser was installed, and the lamp images were examined, the result was 0.0097.

Comparative Example 25

An intermediate sheet was fabricated in the same way as in Example 19 except only the inner layer portion without the surface layer portion. At this point, the sheet was extruded at the extrusion speed s1 of 0.50 m/min, lip width of 400 mm and clearance of 1.5 mm. The extruded melted resin was received in a pair of cast rolls set for 80° C. at the receiving speed s2 of 0.51 m/min. and the draw ratio s2/s1 of 1.02, the resin was cooled and solidified while the melted resin was drawn in the MD direction, and an intermediate sheet with a thickness of 1.42 mm was fabricated. Further, kMD1 and kTD1 were respectively 50.52 μm and 3.96 μm, kMD1/kTD1 was 12.76, kMD2 and kTD2 were respectively 5.74 μm and 13.06 μm, and kMD2/kTD2 was 0.44.

Longitudinal-stretching prior sheets were cut from the obtained intermediate sheet, and the extensibility test was performed. As a result, in three-time stretching, the stretching pass rate was 20%. The intermediate sheet was stretched three times in the MD direction at the temperature of 155° C. using the roll longitudinal stretching machine, and then, stretched three times in the TD direction at the temperature of 155° C. using tenter transverse stretching, and a single-layer reflecting sheet with only the inner layer portion was fabricated.

The thickness, weighing, density, total reflection index and regular reflectance of the obtained single-layer reflecting sheet were respectively 372 μm, 193 g/m², 0.52 g/cm³, 97.5%, and 2.0%. The incident direction where the reflected light intensity in the 0-degree direction was the highest was the TD direction of the reflecting sheet, and L'1/L'2 was 1.28.

The reflecting sheet was installed in the backlight so that the MD direction was orthogonal to the direction of the cold-cathode tubes. Under the conditions that the DP-cold-cathode tube distance was 15 mm, 13 mm, 11 mm, 10 mm, and 9 mm in all sheets installation, lamp images were examined, and the results were 0.0014, 0.0016, 0.0031, 0.0043 and 0.0061. Further, when the DP-cold-cathode tube distance was 11 mm, only the diffuser was installed, and the lamp images were examined, the result was 0.0095.

Figure 69:
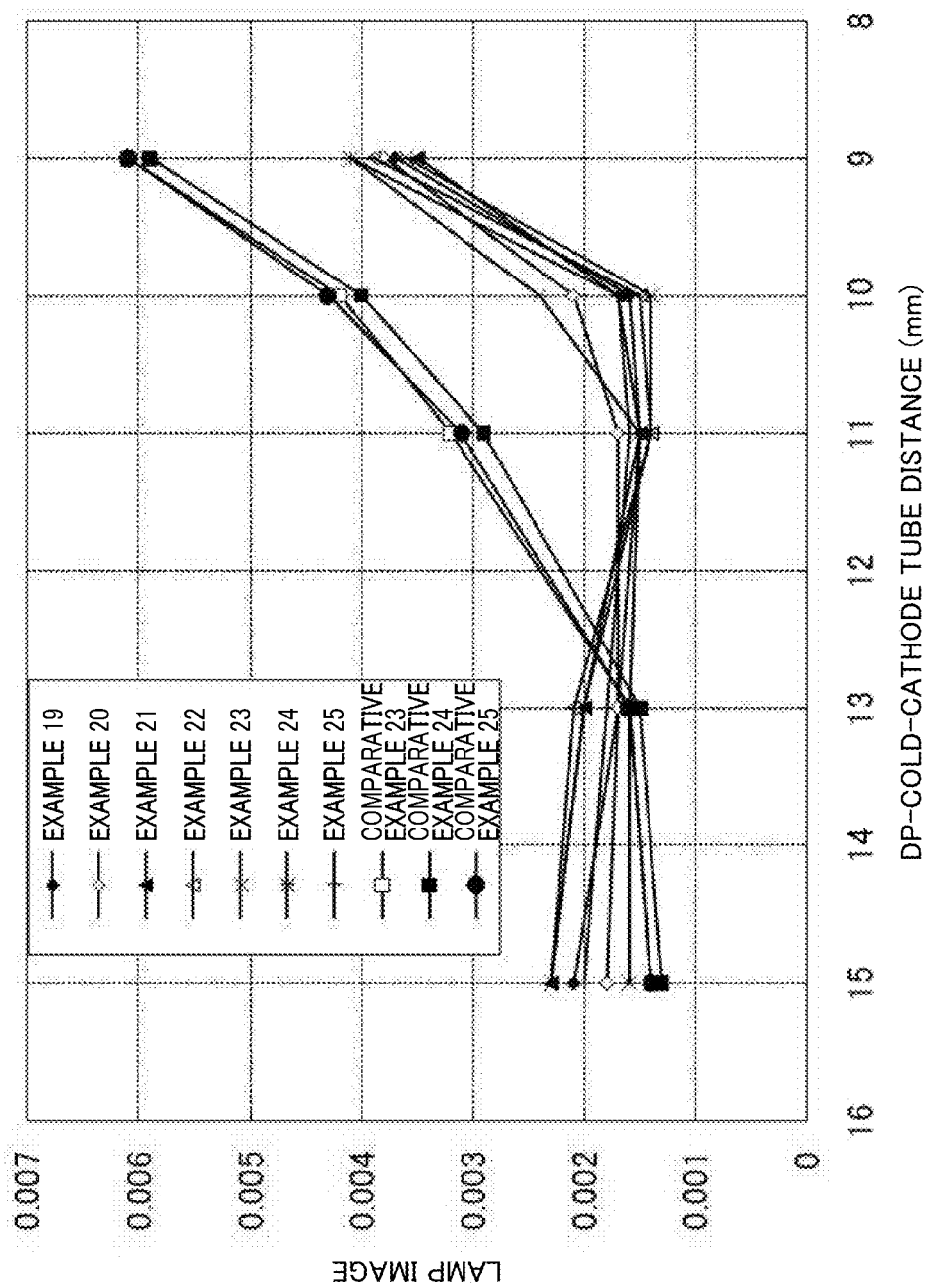
FIG. 69 is a graph illustrating the relationship between DP-cold-cathode tube distance and lamp image in all the samples as described in Examples 19 to 25 and Comparative Examples 23 to 25.

As a result of the foregoing, FIG. 69 shows a graph where a value of lamp images is platted in each DP-cold-cathode tube distance. It is understood that it is possible to suppress increases in the lamp image by suitably using the reflecting sheets as described in Examples 15 to 21. Further, Tables 5 and 6 show the obtained results together with the yellowing factor and average luminance. In addition, in Table 5, PP represents the polypropylene resin, and PC represents the polycarbonate resin. Further, with respect to each layer in Tables 5 and 6, for example, in the case of surface layer portion/inner layer portion/surface layer portion=13 μm/418 μm/14 μm, the thickness (μm) of the surface layer portion is indicated by 13/14.

TABLE 1

|  |  | Example 1 | Example 2 | Example 3 | Example 4 | Comparative Example 1 |
|---|---|---|---|---|---|---|
| Inner layer portion | Thickness (μm) | 418 | 431 | 371 | 362 | 358 |
|  | Composition (resin A/resin B) | PP/PC = 55/45 weight % | PP/PC = 55/45 weight % | PP/PC = 55/45 weight % | PP/PC = 55/45 weight % | PP/PC = 55/45 weight % |
| Surface layer portion (one side) | Thickness (μm) | 13/14 | 19/22 | 14/14 | 16/18 | — |
|  | Additive amount | None | ZnO(20 nm)/T234 | ZnO(20 nm) | ZnO(20 nm) | — |
| Whole | Thickness (μm) | 445 | 472 | 399 | 396 | 358 |
|  | Weighing (g/m²) | 208 | 227 | 191 | 195 | 194 |
|  | Density (g/cm³) | 0.47 | 0.48 | 0.48 | 0.49 | 0.54 |
| Length of resin (B) (near the surface layer portion) (μm) | Ds1 | 1.76 | 1.85 | 1.68 | — | 2.85 |
|  | Ds2 | 60.2 | 59.8 | 69.6 | — | 28.1 |
|  | Ds2/Ds1 | 34.2 | 32.3 | 41.4 | — | 9.86 |
| Length of resin (B) | Dc1 | 4.30 | 4.51 | 4.20 | — | 4.34 |
|  | Dc2 | 2.91 | 3.96 | 3.11 | — | 2.95 |

TABLE 1-continued

| | | | | | | |
|---|---|---|---|---|---|---|
| (center portion) (μm) | Dc2/Dc1 | 0.68 | 0.88 | 0.74 | — | 0.68 |
| Reflective performance | Average total reflection index (%) | 97.1 | 97.2 | 97.3 | 97.1 | 97.4 |
| | Maximum total reflection index (%) | 99.5 | 99.2 | 99.4 | 99.1 | 98.7 |
| | Minimum total reflection index (%) | 94.7 | 95.2 | 95.2 | 95.1 | 96.1 |
| Reflectance anisotropy (maximum − minimum, %) | | 4.8 | 4.0 | 4.2 | 4.0 | 2.6 |
| Regular reflectance (%) | | 8.0 | 7.1 | 6.4 | 7.0 | 2.2 |
| Total reflection index of the surface layer portion (%) | | 14 | 23 | 21 | 24 | — |
| Reflected light intensity in the 0-degree with incidence of 60 degrees (Cd/m$^2$) | L1 | 80.4 | 68.1 | — | — | 53.6 |
| | L2 | 34.3 | 41.8 | — | — | 40.4 |
| | L1/L2 | 2.34 | 1.63 | — | — | 1.33 |
| Reflected light relative intensity in the 0-degree with incidence of 60 degrees | L'1 | 126% | 121% | 142% | 152% | 108% |
| | L'2 | 69% | 64% | 55% | 60% | 79% |
| | L'1/L'2 | 1.83 | 1.89 | 2.58 | 2.53 | 1.37 |
| Light resistance test | Yellowing factor | 13 | 3 | 4 | 4 | 14 |

| | | | Comparative Example 3 | Comparative Example 4 | Comparative Example 5 | Comparative Example 6 |
|---|---|---|---|---|---|---|
| Inner layer portion | Thickness (μm) | | 316 | — | — | — |
| | Composition (resin A/resin B) | | PP/BaSO4 = 80/20 weight % | — | — | — |
| Surface layer portion (one side) | Thickness (μm) | | 27/26 | — | — | — |
| | Additive amount | | BaSO4 | — | — | — |
| Whole | Thickness (μm) | | 369 | 196 | 262 | 262 |
| | Weighing (g/m$^2$) | | 315 | 235 | 160 | 160 |
| | Density (g/cm$^3$) | | 0.85 | 1.20 | 0.61 | 0.61 |
| Length of resin (B) (near the surface layer portion) (μm) | Ds1 | | 0.72 | 0.72 | 2.05 | 2.12 |
| | Ds2 | | 0.74 | 0.73 | 2.14 | 2.12 |
| | Ds2/Ds1 | | 1.03 | 1.01 | 1.04 | 1.00 |
| Length of resin (B) (center portion) (μm) | Dc1 | | 0.70 | 0.67 | 2.03 | 2.03 |
| | Dc2 | | 0.71 | 0.70 | 2.16 | 2.16 |
| | Dc2/Dc1 | | 1.01 | 1.04 | 1.06 | 1.06 |
| Reflective performance | Average total reflection index (%) | | 95.6 | 96.9 | 96.5 | 97.0 |
| | Maximum total reflection index (%) | | 95.6 | 97.2 | 96.5 | 97.1 |
| | Minimum total reflection index (%) | | 95.5 | 96.7 | 96.5 | 96.9 |
| Reflectance anisotropy (maximum − minimum, %) | | | 0.1 | 0.5 | 0 | 0.2 |
| Regular reflectance (%) | | | 4.5 | 4.5 | 4.4 | 8.4 |
| Total reflection index of the surface layer portion (%) | | | 51 | 57 | 22 | 17 |
| Reflected light intensity in the 0-degree with incidence of 60 degrees (Cd/m$^2$) | L1 | | 54.8 | 52.1 | — | — |
| | L2 | | 49.9 | 50.7 | — | — |
| | L1/L2 | | 1.10 | 1.03 | — | — |
| Reflected light relative intensity in the 0-degree with incidence of 60 degrees | L'1 | | 93% | 89% | 81% | 81% |
| | L'2 | | 92% | 88% | 81% | 81% |
| | L'1/L'2 | | 1.01 | 1.01 | 1.00 | 1.00 |
| Light resistance test | Yellowing factor | | 1 | 5 | 4 | 8 |

TABLE 2

| | | Example 5 | Example 6 | Example 7 | Example 8 | Example 9 | Example 10 | Comparative Example 7 | Comparative Example 8 |
|---|---|---|---|---|---|---|---|---|---|
| Reflecting sheet | | Described in Example 1 | | Described in Example 2 | | Described in Example 3 | Described in Example 4 | Described in Comparative Example 1 | |
| Backlight implementation evaluation (all sheets installation) | Backlight installation (Orthogonal to cold-cathode tubes) | A2 is orthogonal | A1 is orthogonal | A2 is orthogonal | A1 is orthogonal | A'2 is orthogonal | A'2 is orthogonal | A2 is orthogonal | A1 is orthogonal |
| | Luminance between cold-cathode tubes (cd/m²) | 1093 | 1429 | 1110 | 1443 | — | — | — | — |
| | Average luminance (cd/m², 15.0) | 6144 | 6116 | 6122 | 6128 | — | — | 5816 | — |
| | Lamp image (15.0) | 0.0015 | 0.0009 | 0.0015 | 0.0010 | 0.0028 | 0.0024 | 0.0013 | 0.0012 |
| | Lamp image (13.0) | 0.0015 | 0.0015 | 0.0016 | 0.0014 | 0.0022 | 0.0021 | 0.0016 | 0.0014 |
| | Lamp image (11.0) | 0.0014 | 0.0023 | 0.0016 | 0.0024 | 0.0017 | 0.0014 | 0.0030 | 0.0032 |
| | Lamp image (10.0) | 0.0019 | 0.0034 | 0.0021 | 0.0038 | 0.0017 | 0.0015 | 0.0041 | 0.0044 |
| | Lamp image (9.0) | 0.0039 | 0.0056 | 0.0041 | 0.0057 | 0.0032 | 0.0036 | 0.0064 | 0.0068 |
| Backlight implementation evaluation (only DP) | Lamp image (11.0) | 0.0055 | 0.0097 | 0.0059 | 0.0101 | 0.0058 | 0.0048 | 0.0101 | 0.0118 |
| | Area between adjacent cold-cathode tubes | Two maximum values | No maximum value | Two maximum values | No maximum value | Two maximum values | Two maximum values | No maximum value | No maximum value |
| | Immediately above cold-cathode tubes | Minimum value | Maximum value | Minimum value | Maximum value | Minimum value | Minimum value | Maximum value | Maximum value |

| | | Comparative Example 9 | Comparative Example 10 | Comparative Example 11 | Comparative Example 12 | Comparative Example 13 | Comparative Example 14 |
|---|---|---|---|---|---|---|---|
| Reflecting sheet | | Described in Comparative Example 3 | | Described in Comparative Example 4 | | Described in Comparative Example 5 | Described in Comparative Example 6 |
| Backlight implementation evaluation (all sheets installation) | Backlight installation (Orthogonal to cold-cathode tubes) | A2 is orthogonal | A1 is orthogonal | A2 is orthogonal | A1 is orthogonal | | |
| | Luminance between cold-cathode tubes (cd/m²) | 1232 | 1214 | — | — | — | — |
| | Average luminance (cd/m², 15.0) | 5868 | 5842 | 6032 | 6020 | 6065 | 6049 |
| | Lamp image (15.0) | 0.0013 | 0.0013 | 0.0011 | 0.0011 | 0.0008 | 0.0009 |
| | Lamp image (13.0) | 0.0018 | 0.0019 | 0.0014 | 0.0015 | 0.0013 | 0.0013 |
| | Lamp image (11.0) | 0.0031 | 0.0032 | 0.0028 | 0.0029 | 0.0026 | 0.0023 |
| | Lamp image (10.0) | 0.0043 | 0.0043 | 0.0036 | 0.0037 | 0.0034 | 0.0031 |
| | Lamp image (9.0) | 0.0062 | 0.0060 | 0.0052 | 0.0057 | 0.0054 | 0.0054 |
| Backlight implementation evaluation (only DP) | Lamp image (11.0) | 0.0113 | 0.0122 | 0.0108 | 0.0112 | 0.0096 | 0.0080 |
| | Area between adjacent cold-cathode tubes | No maximum value | No maximum value | No maximum value | No maximum value | No maximum value | No maximum value |
| | Immediately above cold-cathode tubes | Maximum value | Maximum value | Maximum value | Maximum value | Maximum value | Maximum value |

Numerals in parentheses in lamp image are distances (mm) between the center of the cold-cathode tube and diffuser panel lower surface

TABLE 3

| | | Example 11 | Example 12 | Example 13 | Example 14 | Comparative Example 15 |
|---|---|---|---|---|---|---|
| Reflecting sheet | | Described in Example 1 | Described in Example 2 | Described in Example 3 | Described in Example 4 | Described in Comparative Example 1 |
| Reflected light relative intensity in the 0-degree with incidence 60 degrees (relative intensity to standard white plate) | | 69% | 64% | 55% | 60% | 79% |
| | Incident direction | MD direction | MD direction | MD direction | MD direction | MD direction |
| | Average luminance (cd/m², 15.0) | 6144 | 6122 | — | — | 5816 |
| | Lamp image (15.0) | 0.0015 | 0.0015 | 0.0028 | 0.0024 | 0.0013 |
| | Lamp image (13.0) | 0.0015 | 0.0016 | 0.0022 | 0.0021 | 0.0016 |
| | Lamp image (11.0) | 0.0014 | 0.0016 | 0.0017 | 0.0014 | 0.0030 |
| | Lamp image (10.0) | 0.0019 | 0.0021 | 0.0017 | 0.0015 | 0.0041 |
| | Lamp image (9.0) | 0.0039 | 0.0041 | 0.0032 | 0.0036 | 0.0064 |
| Backlight implementation evaluation (only DP) | Lamp image (11.0) | 0.0055 | 0.0059 | 0.0058 | 0.0048 | 0.0101 |
| | Area between adjacent cold-cathode tubes | Two maximum values | Two maximum values | Two maximum values | Two maximum values | No maximum value |
| | Immediately above | Minimum | Minimum | Minimum | Minimum | Maximum |

TABLE 3-continued

|  | cold-cathode tubes | value | value | value | value | value |
|---|---|---|---|---|---|---|
|  |  | Comparative Example 16 | Comparative Example 17 | Comparative Example 18 | Comparative Example 19 |  |
|  | Reflecting sheet | Described in Comparative Example 3 | Described in Comparative Example 4 | Described in Comparative Example 5 | Described in Comparative Example 6 |  |
|  | Reflected light relative intensity in the 0-degree with incidence 60 degrees (relative intensity to standard white plate) | 92% | 88% | 81% | 81% |  |
|  | Incident direction | MD direction | — | — | — |  |
|  | Average luminance (cd/m², 15.0) | 5868 | 6032 | 6065 | 6049 |  |
|  | Lamp image (15.0) | 0.0013 | 0.0011 | 0.0008 | 0.0009 |  |
|  | Lamp image (13.0) | 0.0018 | 0.0014 | 0.0013 | 0.0013 |  |
|  | Lamp image (11.0) | 0.0031 | 0.0028 | 0.0026 | 0.0023 |  |
|  | Lamp image (10.0) | 0.0043 | 0.0036 | 0.0034 | 0.0031 |  |
|  | Lamp image (9.0) | 0.0062 | 0.0052 | 0.0054 | 0.0054 |  |
| Backlight implementation evaluation (only DP) | Lamp image (11.0) | 0.0113 | 0.0108 | 0.0096 | 0.0080 |  |
|  | Area between adjacent cold-cathode tubes | No maximum value | No maximum value | No maximum value | No maximum value |  |
|  | Immediately above cold-cathode tubes | Maximum value | Maximum value | Maximum value | Maximum value |  |

Numerals in parentheses in lamp image are distances (mm) between the center of the cold-cathode tube and diffuser panel lower surface

TABLE 4

|  |  | Example 15 | Example 16 | Example 17 | Example 18 | Comparative Example 20 | Comparative Example 21 | Comparative Example 22 |
|---|---|---|---|---|---|---|---|---|
| Reflecting sheet |  | Described in Example 1 | Described in Example 2 | Described in Example 3 | Described in Example 4 | Described in Comparative Example 1 | Described in Comparative Example 3 | Commercially available product |
| Whole | Thickness (μm) | 445 | 472 | 399 | 396 | 358 | 369 | 225 |
|  | Weighing (g/m²) | 208 | 227 | 191 | 195 | 194 | 315 | 140 |
|  | Density (g/cm³) | 0.47 | 0.48 | 0.48 | 0.49 | 0.54 | 0.85 | 0.62 |
| Reflective performance | Average total reflection index (%) | 97.1 | 97.2 | 97.3 | 97.1 | 97.4 | 95.6 | 96.3 |
|  | Regular reflectance (%) | 8.0 | 7.1 | 6.4 | 7.0 | 2.2 | 4.6 | 4.8 |
| Reflected light relative intensity in the 0-degree with incidence 60 degrees (relative intensity to standard white plate) |  | 126% | 121% | 142% | 152% | 108% | 93% | 95% |
|  | Incident direction | TD direction | TD direction | TD direction | TD direction | TD direction | TD direction | — |
| Lamp-saving backlight implementation evaluation (all sheets installation) | Lamp image (40.0) | 0.0012 | 0.0013 | 0.0012 | 0.0012 | 0.0014 | 0.0024 | 0.0019 |
|  | Lamp image (42.5) | 0.0023 | 0.0023 | 0.0022 | 0.0017 | 0.0027 | 0.0042 | 0.0033 |
|  | Lamp image (45.0) | 0.0039 | 0.0039 | 0.0037 | 0.0030 | 0.0044 | 0.0059 | 0.0049 |
|  | Lamp image (47.5) | 0.0059 | 0.0061 | 0.0059 | 0.0051 | 0.0068 | 0.0080 | 0.0076 |

Numerals in parentheses in lamp image are distances (mm) between the center of the adjacent cold-cathode tube

TABLE 5

|  |  |  | Example 19 | Example 20 | Example 21 | Example 22 | Example 23 | Example 24 |
|---|---|---|---|---|---|---|---|---|
| Manufacturing conditions of intermediate sheet (c) | Inner layer portion composition |  | PP/PC = 55/45 weight % | PP/PC = 55/45 weight % | PP/PC = 55/45 weight % | PP/PC = 55/45 weight % | PP/PC = 60/40 weight % | PP/PC = 55/45 weight % |
|  | Surface layer portion composition |  | PP | PP/ZnO/T234 | PP/ZnO | PP/ZnO | PP | PP |
|  | Extrusion temperature (° C.) |  | 220 | 220 | 220 | 220 | 220 | 200 |
|  | Viscosity at extrusion temperature (Pa · s) | v1 | 3346 | 3346 | 3346 | 3346 | 3346 | 5209 |
|  |  | v2 | 27127 | 27127 | 27127 | 27127 | 27127 | 49787 |
|  |  | v2/v1 | 8.11 | 8.11 | 8.11 | 8.11 | 8.11 | 9.55 |
|  | Draw ratio | s1 | 1.00 | 1.00 | 1.00 | 1.00 | 1.00 | 1.00 |
|  |  | s2 | 1.01 | 1.01 | 1.01 | 1.01 | 1.01 | 1.01 |
|  |  | s2/s1 | 1.01 | 1.01 | 1.01 | 0.74 | 1.01 | 1.01 |
| Intermediate sheet (c) | Inner layer portion | Thickness (μm) | 1737 | 1699 | 1716 | 1717 | 1580 | 1462 |
|  | Surface layer portion | Thickness (μm) | 150/148 | 168/173 | 164/166 | 165/170 | 153/145 | 139/141 |
|  | Whole | Thickness (μm) | 2035 | 2040 | 2046 | 2052 | 1878 | 1742 |

TABLE 5-continued

| | | | | | | | |
|---|---|---|---|---|---|---|---|
| Measured value of length of resin (B) (μm) | kMD1 | 53.32 | 51.30 | 50.04 | 49.97 | 47.68 | 43.58 |
| | kTD1 | 3.75 | 3.91 | 3.91 | 4.01 | 3.77 | 4.24 |
| | kMD1/kTD1 | 14.21 | 13.11 | 12.79 | 12.48 | 12.63 | 10.27 |
| | kMD2 | 5.57 | 6.02 | 7.33 | 6.18 | 5.02 | 6.87 |
| | kTD2 | 13.92 | 12.50 | 12.31 | 12.12 | 11.95 | 10.91 |
| | kMD2/kTD2 | 0.40 | 0.48 | 0.60 | 0.51 | 0.42 | 0.63 |

| | | | Example 25 | Comparative Example 23 | Comparative Example 24 | Comparative Example 25 |
|---|---|---|---|---|---|---|
| Manufacturing conditions of intermediate sheet (c) | Inner layer portion composition | | PP/PC = 55/45 weight % | PP/BaSO4 = 80/20 weight % | PP/PC = 55/45 weight % | PP/PC = 55/45 weight % |
| | Surface layer portion composition | | PP/ZnO | PP/BaSO4 | PP/ZnO | None |
| | Extrusion temperature (° C.) | | 220 | 220 | 240 | 220 |
| | Viscosity at extrusion temperature (Pa · s) | v1 | 3346 | 3346 | 3372 | 3346 |
| | | v2 | 27127 | — | 10083 | 27127 |
| | | v2/v1 | 8.11 | — | 2.98 | 8.11 |
| | Draw ratio | s1 | 1.00 | 1.00 | 1.00 | 0.50 |
| | | s2 | 3.03 | 1.01 | 1.01 | 0.51 |
| | | s2/s1 | 3.03 | 1.01 | 1.01 | 1.02 |
| Intermediate sheet (c) | Inner layer portion | Thickness (μm) | 543 | 1687 | 1716 | 1424 |
| | Surface layer portion | Thickness (μm) | 72/64 | 166/158 | 169/159 | — |
| | Whole | Thickness (μm) | 679 | 2011 | 2044 | 1424 |
| | Measured value of length of resin (B) (μm) | kMD1 | 53.30 | 0.82 | 78.33 | 50.52 |
| | | kTD1 | 1.30 | 0.81 | 35.17 | 3.96 |
| | | kMD1/kTD1 | 41.00 | 1.01 | 2.23 | 12.76 |
| | | kMD2 | 55.90 | 0.80 | 3.92 | 5.74 |
| | | kTD2 | 25.60 | 0.77 | 10.53 | 13.06 |
| | | kMD2/kTD2 | 2.20 | 1.04 | 0.32 | 0.44 |

TABLE 6

| | | | Example 19 | Example 20 | Example 21 | Example 22 | Example 23 | Example 24 |
|---|---|---|---|---|---|---|---|---|
| Stretching | Stretch ratio | Longitudinal Stretching | 3 | 3 | 3 | 3 | 3 | 3 |
| | | Transverse Stretching | 3 | 3 | 3 | 3 | 3 | 3 |
| | Longitudinal Stretchng pass rate | | 100 | 100 | 100 | 100 | 100 | 100 |
| Reflecting sheet | Inner layer portion thickness (μm) | | 427 | 421 | 387 | 411 | 368 | 416 |
| | Surface layer portion thickness (μm) | | 14/14 | 14/16 | 21/19 | 17/15 | 16/17 | 14/13 |
| | Whole | Thickness (μm) | 455 | 451 | 427 | 443 | 401 | 443 |
| | | Weighing (g/m²) | 215 | 218 | 203 | 218 | 198 | 218 |
| | | Density (g/cm³) | 0.47 | 0.48 | 0.48 | 0.49 | 0.49 | 0.49 |
| Reflective performance | Average total reflection index (%) | | 97.3 | 97.5 | 97.5 | 97.3 | 97.1 | 97.2 |
| | Regular reflectance (%) | | 7.8 | 7.5 | 7.4 | 7.0 | 8.1 | 7.7 |
| | Total reflection index of surface layer portion (%) | | 16 | 22 | 22 | 24 | 13 | 15 |
| Reflected light relative intensity in the 0-degree with incidence of 60 degrees (%) | L'1 | | 122 | 121 | 125 | 145 | 119 | 120 |
| | L'2 | | 51 | 64 | 59 | 65 | 49 | 68 |
| | L'1/L'2 | | 2.40 | 1.89 | 2.14 | 2.23 | 2.45 | 1.76 |
| | Yellowing factor | | 13 | 4 | 4 | 4 | 15 | 16 |
| Backlight implementation evaluation (all sheets installation) | Average luminance (cd/m²) | | 6142 | 6120 | 6128 | 6130 | 6135 | 6118 |
| | Lamp image (15.0) | | 0.0021 | 0.0018 | 0.0023 | 0.0023 | 0.0023 | 0.0016 |
| | Lamp image (13.0) | | 0.0017 | 0.0017 | 0.0020 | 0.0021 | 0.0020 | 0.0016 |
| | Lamp image (11.0) | | 0.0015 | 0.0017 | 0.0015 | 0.0014 | 0.0014 | 0.0015 |
| | Lamp image (10.0) | | 0.0016 | 0.0021 | 0.0017 | 0.0015 | 0.0014 | 0.0024 |
| | Lamp image (9.0) | | 0.0037 | 0.0038 | 0.0035 | 0.0039 | 0.0036 | 0.0041 |
| Backlight implementation evaluation (only DP) | Lamp image (11.0) | | 0.0050 | 0.0055 | 0.0052 | 0.0051 | 0.0051 | 0.0059 |

| | | | Example 25 | Comparative Example 23 | Comparative Example 24 | Comparative Example 25 |
|---|---|---|---|---|---|---|
| Stretching | Stretch ratio | Longitudinal Stretching | 3 | 3 | 3 | 3 |
| | | Transverse Stretching | 3 | 3 | 3 | 3 |
| | Longitudinal Stretchng pass rate | | 40 | 100 | 100 | 20 |

TABLE 6-continued

| | | | | | | |
|---|---|---|---|---|---|---|
| Reflecting sheet | Inner layer portion thickness (μm) | | 102 | 345 | 369 | 372 |
| | Surface layer portion thickness (μm) | | 7/4 | 23/25 | 17/20 | — |
| | Whole | Thickness (μm) | 113 | 393 | 406 | 372 |
| | | Weighing (g/m$^2$) | 75 | 340 | 197 | 193 |
| | | Density (g/cm$^3$) | 0.66 | 0.87 | 0.49 | 0.52 |
| | Reflective performance | Average total reflection index (%) | 93.8 | 95.8 | 97.0 | 97.5 |
| | | Regular reflectance (%) | 7.4 | 4.3 | 6.8 | 2.0 |
| | | Total reflection index of surface layer portion (%) | 16 | 41 | 23 | — |
| | Reflected light relative intensity in the 0-degree with incidence of 60 degrees (%) | L'1 | 132 | 94 | 87 | 104 |
| | | L'2 | 53 | 92 | 81 | 81 |
| | | L'1/L'2 | 2.51 | 1.02 | 1.07 | 1.28 |
| | Yellowing factor | | 5 | 1 | 4 | 18 |
| | Backlight implementation evaluation (all sheets installation) | Average luminance (cd/m$^2$) | 5876 | 5867 | 6102 | 5939 |
| | | Lamp image (15.0) | 0.0020 | 0.0014 | 0.0013 | 0.0014 |
| | | Lamp image (13.0) | 0.0018 | 0.0016 | 0.0015 | 0.0016 |
| | | Lamp image (11.0) | 0.0016 | 0.0032 | 0.0029 | 0.0031 |
| | | Lamp image (10.0) | 0.0017 | 0.0042 | 0.0040 | 0.0043 |
| | | Lamp image (9.0) | 0.0041 | 0.0061 | 0.0059 | 0.0061 |
| | Backlight implementation evaluation (only DP) | Lamp image (11.0) | 0.0060 | 0.0121 | 0.0097 | 0.0095 |

The present invention is not limited to the above-mentioned Embodiments, and is capable of being carried into practice with various modifications thereof. For example, the materials, dimensions, processing procedures and the like in the above-mentioned Embodiments are not limited thereto, and are capable of being carried into practice with modifications thereof as appropriate. Moreover, the invention is capable of being carried into practice with modifications thereof as appropriate without departing from the scope of the invention.

INDUSTRIAL APPLICABILITY

The reflecting sheet of the invention has a difference in the reflected light intensity in the 0-degree direction by the incident direction, and is thereby capable of significantly reducing lamp images of the backlight, and is suitably used in backlights of liquid crystal display devices.

The invention claimed is:

1. A reflecting sheet comprised of at least two, a surface layer portion and an inner layer portion, or more layers,
   wherein the surface layer portion contains at least a thermoplastic resin (C), the inner layer portion contains a thermoplastic resin (A), and at least one kind of thermoplastic resin (B) incompatible with the thermoplastic resin (A),
   wherein reflected light intensity in a vertical direction has anisotropy by an incident direction when light is incident at an incident angle of 60 degrees with respect to the vertical direction of a plane of the reflecting sheet in the entire reflecting sheet including the surface layer portion and the inner layer portion, and
   wherein a ratio L1/L2 is 1.2 or more, the ratio being a ratio of reflected light intensity L1 in the vertical direction in an incident direction A1 where the reflected light intensity in the vertical direction is the highest to reflected light intensity L2 in the vertical direction in an incident direction A2 orthogonal to the incident direction A1.

2. The reflecting sheet according to claim 1, wherein the ratio L1/L2 of the reflected light intensity L1 to the reflected light intensity L2 is 1.4 or more.

3. A reflecting sheet comprised of at least two, a surface layer portion and an inner layer portion, or more layers,
   wherein the surface layer portion contains at least a thermoplastic resin (C), the inner layer portion contains a thermoplastic resin (A), and at least one kind of thermoplastic resin (B) incompatible with the thermoplastic resin (A), and
   wherein the reflecting sheet has an incident direction where reflected light relative intensity L'1 in a vertical direction ranges from 110% to 200% when light is incident at an incident angle of 60 degrees with respect to the vertical direction of a plane of the reflecting sheet in the entire reflecting sheet including the surface layer portion and the inner layer portion.

4. A reflecting sheet comprised of at least two, a surface layer portion and an inner layer portion, or more layers,
   wherein the surface layer portion contains at least a thermoplastic resin (C), the inner layer portion contains a thermoplastic resin (A), and at least one kind of thermoplastic resin (B) incompatible with the thermoplastic resin (A), and
   wherein the reflecting sheet has an incident direction where reflected light relative intensity L'2 in a vertical direction ranges from 20% to 75% when light is incident at an incident angle of 60 degrees with respect to the vertical direction of a plane of the reflecting sheet in the entire reflecting sheet including the surface layer portion and the inner layer portion.

5. The reflecting sheet according to claim 1, wherein the inner layer portion contains voids.

6. The reflecting sheet according to claim 1, wherein an average total reflection index is 90% or more when light with a wavelength of 550 nm is applied.

7. The reflecting sheet according to claim 1, wherein a total reflection index of the surface layer portion is 50% or less.

8. The reflecting sheet according to claim 1, wherein the sheet contains a polypropylene resin as the thermoplastic (A) and the thermoplastic resin (C).

9. The reflecting sheet according to claim 1, wherein the sheet contains a polycarbonate resin as the thermoplastic resin (B).

10. The reflecting sheet claim 1, wherein regular reflectance is 5% or more.

11. The reflecting sheet according to claim 1, wherein a thickness of the entire reflecting sheet ranges from 70 μm to 1000 μm.

12. The reflecting sheet according to claim 1, wherein a density of the entire reflecting sheet ranges from 0.1 g/cm$^3$ to 0.75 g/cm$^3$.

13. The reflecting sheet according to claim 1, wherein the surface layer portion contains a UV absorbing agent in an amount ranging from 0.01 g/m$^2$ to 5 g/m$^2$.

14. The reflecting sheet according to claim 1, wherein the inner layer portion and the surface layer portion are fabricated by co-extrusion film forming.

15. The reflecting sheet according to claim 1, wherein anisotropy of the total reflection index by the incident direction when light with a wavelength of 550 nm is applied is 2% or more.

16. The reflecting sheet according to claim 1, wherein the incident direction A1 where the reflected light intensity in the vertical direction is the highest is an extrusion transverse direction (TD) of the reflecting sheet, and A2 is an extrusion direction (MD).

17. The reflecting sheet according to claim 1, wherein the total reflection index when light is incident from the extrusion direction (MD) of the reflecting sheet is higher than the total reflection index when light is incident from the extrusion transverse direction (TD) by 2%.

18. A reflecting sheet used in a direct type backlight using cold-cathode tubes, wherein when luminance is measured with the reflecting sheet, the cold-cathode tubes, and a diffuser installed, the reflecting sheet has two or more maximum values of luminance in between adjacent cold-cathode tubes.

19. The reflecting sheet according to claim 18, wherein the reflecting sheet has minimum values of luminance immediately above the cold-cathode tubes.

20. A backlight unit comprising:
a light source;
the reflecting sheet according to claim 18 for reflecting light from the light source; and
a diffuser disposed on the opposite side to the reflecting sheet with the light source therebetween.

21. A backlight unit comprising:
a light source;
the reflecting sheet according to claim 1 for reflecting light from the light source; and
a diffuser disposed on the opposite side to the reflecting sheet with the light source therebetween,
wherein the reflecting sheet is installed so that the direction A2 is orthogonal to the cold-cathode tubes.

22. A backlight unit comprising:
a light source;
the reflecting sheet according to claim 4 for reflecting light from the light source; and
a diffuser disposed on the opposite side to the reflecting sheet with the light source therebetween,
wherein the reflecting sheet is disposed so that the incident direction, where the reflected light relative intensity L'2 in the vertical direction ranges from 20% to 75% when light is incident at an incident angle of 60 degrees with respect to the vertical direction of the plane of the reflecting sheet, is orthogonal to the cold-cathode tubes of the backlight unit.

23. The backlight unit according to claim 20, wherein a distance between an upper plane of the reflecting sheet and a lower surface of the diffuser of the backlight unit is 20 mm or less.

24. A backlight unit,
wherein the reflecting sheet according to claim 1 is installed, so that the incident direction A1 where the reflected light intensity in the vertical direction is the highest is orthogonal to the cold-cathode tubes.

25. A backlight unit comprising:
a light source;
the reflecting sheet according to claim 3 for reflecting light from the light source; and
a diffuser disposed on the opposite side to the reflecting sheet with the light source therebetween,
wherein the reflecting sheet is disposed so that the incident direction, where the reflected light relative intensity L'1 in the vertical direction ranges from 110% to 200% when light is incident at an incident angle of 60 degrees with respect to the vertical direction of the plane of the reflecting sheet, is orthogonal to the cold-cathode tubes of the backlight unit.

26. The backlight unit according to claim 24, wherein a shortest distance between the reflecting sheet and the diffuser ranges from 20 mm to 60 mm, and a distance between the cold-cathode tubes ranges from 25 mm to 80 mm.

27. A reflecting sheet comprised of at least two, a surface layer portion and an inner layer portion, or more layers,
wherein the surface layer portion contains at least a thermoplastic resin (C), the inner layer portion contains a thermoplastic resin (A), and at least one kind of thermoplastic resin (B) incompatible with the thermoplastic resin (A),
wherein the resin (B) in the vicinity of the surface layer portion in the inner layer portion is oriented on one direction in the shape of a rod, and a ratio Ds2/Ds1 is 3 or more, the ratio being a ratio of a length Ds2 in a direction B2 where the length of the resin (B) is the maximum to a length Ds1 in a direction B1 orthogonal to the direction B2 in a plane of the reflecting sheet.

28. The reflecting sheet according claim 27, wherein in the resin (B) in a center portion in a thickness direction of the inner layer portion, a ratio Dc2/Dc1 ranges from 0.4 to 2.5, the ratio being a ratio of a length Dc2 in the direction B2 to a length Dc1 in the direction B1.

29. The reflecting sheet according to claim 27, wherein an average total reflection index is 90% or more when light with a wavelength of 550 nm is applied.

30. The reflecting sheet according to claim 27, wherein a thickness of the entire reflecting sheet ranges from 70 μm to 1000 μm.

31. The reflecting sheet according to claim 27, wherein a density of the entire reflecting sheet ranges from 0.1 g/cm$^3$ to 0.75 g/cm$^3$.

32. The reflecting sheet according to claim 27, wherein the sheet contains a polypropylene resin as the thermoplastic (A) and the thermoplastic resin (C).

33. The reflecting sheet according to claim 27, wherein the sheet contains a polycarbonate resin as the thermoplastic resin (B) incompatible with the thermoplastic resin (A).

34. The reflecting sheet according to claim 27, wherein a rate of the thermoplastic resin (A) in the inner layer portion ranges from 30 percent to 80 percent by weight, and a rate of the resin (B) ranges from 20 percent to 70 percent by weight.

35. The reflecting sheet according to claim 27, wherein the reflecting sheet is an extruded formed reflecting sheet, the direction B2 where the length of the resin (B) is the maximum is an extrusion direction (MD) of the reflecting sheet, and the direction B1 orthogonal to the direction B2 in the plane of the reflecting sheet is an extrusion transverse direction (TD).

36. The reflecting sheet according to claim 27, wherein a total reflection index of the surface layer portion is 50% or less.

37. The reflecting sheet according to claim 27, wherein the inner layer portion and the surface layer portion are fabricated by co-extrusion film forming.

38. The reflecting sheet according to claim 27, wherein reflected light intensity in a vertical direction has anisotropy by an incident direction when light is incident at an incident angle of 60 degrees with respect to the vertical direction of a plane of the reflecting sheet,
wherein the reflected light intensity in the vertical direction is the highest when light is incident from the direction B1, and
wherein a ratio L'1/L'2 is 1.2 or more, the ratio being a ratio of reflected light relative intensity L'1 when the light is incident from the direction B1 to reflected light relative intensity L'2 when the light is incident from the direction B2 orthogonal to the incident direction B1 in the plane of the reflecting sheet.

39. A manufacturing method of a reflecting sheet comprised of at least two, a surface layer portion and an inner layer portion, or more layers, comprising:
a step (i) of co-extruding a resin composition (a) containing a thermoplastic resin (A) and at least one kind of resin (B) incompatible with the thermoplastic resin (A) at an extrusion temperature of the thermoplastic resin (A) as the inner layer, and a resin composition (b) containing at least a thermoplastic resin (C) as the surface layer portion, receiving the compositions in cast rolls, and obtaining an intermediate sheet (c); and
a step (ii) of performing two-way stretching on the intermediate sheet (c) obtained in the step (i),
wherein a ratio (hereinafter, viscosity ratio) v2/v1 ranges from 3 to 20, the viscosity ratio being a ratio of a viscosity v2 of the resin (B) to a viscosity v1 of the thermoplastic resin (A) at the extrusion temperature.

40. The manufacturing method of a reflecting sheet according to claim 39, wherein the resin (B) is oriented in an extrusion direction in the vicinity of the surface layer portion in the inner layer portion of the intermediate sheet (c), and a ratio kMD1/kTD1 is 3 or more, the ratio being a ratio of a length kMD1 in the extrusion direction of the resin (B) to a length kTD1 in an extrusion transverse direction of the resin (B).

41. The manufacturing method of a reflecting sheet according to claim 39, wherein a ratio kMD2/kTD2 ranges from 0.1 to 3, the ratio being a ratio of a length kMD2 in the extrusion direction of the resin (B) to a length kTD2 in the extrusion transverse direction of the resin (B).

42. The manufacturing method of a reflecting sheet according to claim 39, wherein 30 percent to 80 percent by weight of the resin composition (a) is the thermoplastic resin (A).

43. The manufacturing method of a reflecting sheet according to claim 39, wherein an extrusion speed s1 for co-extruding the resin composition (a) and the resin composition (b) ranges from 0.3 m/min, to 20 m/min, and a ratio (hereinafter, draw ratio) s2/s1 ranges from 1 to 5, the draw ratio being a ratio of the extrusion speed s1 to a speed s2 for receiving in the cast rolls.

44. The manufacturing method of a reflecting sheet according to any on claim 39, wherein in the intermediate sheet (c), a thickness of the surface layer portion ranges from 10 μm to 400 μm, and a thickness of the inner layer portion ranges from 150 μm to 4000 μm.

45. The manufacturing method of a reflecting sheet according to claim 39, wherein a polypropylene resin is used as the thermoplastic (A).

46. The manufacturing method of a reflecting sheet according to claim 39, wherein a polycarbonate resin is used as the thermoplastic resin (B).

47. The manufacturing method of a reflecting sheet according to claim 39, wherein the surface layer portion of the reflecting sheet contains a UV absorbing agent in an amount ranging from 0.01 g/m$^2$ to 5 g/m$^2$.

48. The manufacturing method of a reflecting sheet according to claim 39, wherein the stretch ratio of the two-way stretching is 1.5 time or more in each of the MD direction and the TD direction, and the area stretch ratio ranges from 3 times to 50 times.

49. A reflecting sheet obtained by the manufacturing method according to claim 39.

* * * * *